US012638714B2

(12) United States Patent
Terashita et al.

(10) Patent No.: US 12,638,714 B2
(45) Date of Patent: May 26, 2026

(54) LIQUID CRYSTAL DISPLAY DEVICE

(71) Applicant: Sharp Display Technology Corporation, Kameyama City (JP)

(72) Inventors: Shinichi Terashita, Kameyama City (JP); Kouichi Watanabe, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 18/899,016

(22) Filed: Sep. 27, 2024

(65) Prior Publication Data

US 2025/0138361 A1     May 1, 2025

(30) Foreign Application Priority Data

Oct. 26, 2023     (JP) ................................. 2023-184016

(51) Int. Cl.
| *G02F 1/1335* | (2006.01) |
| *G02F 1/1333* | (2006.01) |
| *G02F 1/1343* | (2006.01) |

(52) U.S. Cl.
CPC .... *G02F 1/133531* (2021.01); *G02F 1/13338* (2013.01); *G02F 1/133553* (2013.01); *G02F 1/1343* (2013.01)

(58) Field of Classification Search
CPC ........... G02F 1/133531; G02F 1/13338; G02F 1/133553; G02F 1/1343
See application file for complete search history.

(56) References Cited

U.S. PATENT DOCUMENTS

| 6,791,640 B1 * | 9/2004 | Okamoto .......... G02F 1/133528 349/119 |
| 2014/0192308 A1 | 7/2014 | Furukawa et al. |
| 2018/0348553 A1 * | 12/2018 | Koide ................... G02F 1/1396 |

FOREIGN PATENT DOCUMENTS

JP          5756860 B2      7/2015

* cited by examiner

*Primary Examiner* — David Y Chung
(74) *Attorney, Agent, or Firm* — ScienBiziP, P.C.

(57)          ABSTRACT

Provided is a liquid crystal display device with sufficiently reduced or prevented alignment defect generation and useful as an in-cell touch panel capable of providing display in the reflective mode. The liquid crystal display device includes first and second substrates and a liquid crystal layer. The first substrate includes a reflective layer reflecting light, first and second electrodes capable of generating a transverse electric field in the liquid crystal layer, and a first horizontal alignment film. At least one of the first electrode or the second electrode includes strip portions and a slit between adjacent two strip portions among the strip portions. The second substrate includes a second horizontal alignment film in contact with the liquid crystal layer. The liquid crystal layer includes liquid crystal molecules having a positive anisotropy of dielectric constant and is in a twist alignment during no voltage application.

16 Claims, 40 Drawing Sheets

(Observation surface side)

(Back surface side)

(Observation surface side)

(Back surface side)

FIG. 27

| | Test Example 2-1 | Test Example 2-2 | Test Example 2-3 | Test Example 2-4 | Test Example 2-5 | Test Example 2-6 |
|---|---|---|---|---|---|---|
| Slit angle | SPa : −10° SPb : +4° | SPa : −7° SPb : +7° | SPa : −4° SPb : +10° | SPa : −2° SPb : +12° | SPa : 0° SPb : +14° | SPa : +2° SPb : +16° |
| Liquid crystal alignment diagram | 21A 21B SPa / SPb | 21A 21B SPa / SPb | 21A 21B SPa / SPb | 21A 21B SPa / SPb | 21A 21B SPa / SPb | 21A 21B SPa / SPb |
| Polarization direction | 80° / −3° | 83° / 0° | 86° / 3° | 88° / 5° | 90° / 7° | 92° / 9° |

SPa : −7°

SPb : +7°

21A
21B
21C
21C'

De

SPa : −7°

SPb : +7°

| | Test Example 4-1 | Test Example 4-2 | Test Example 4-3 | Test Example 4-4 | Test Example 4-5 | Test Example 4-6 |
|---|---|---|---|---|---|---|
| SPa (Slit angle) | −10° | −7° | −4° | −2° | 0° | +2° |
| SPa (Flow-induced misalignment) | × | × | × | × | ○ | ○ |
| | −10° / +4° | −7° / +7° | −4° / +10° | −2° / +12° | 0° / +14° | +2° / +16° |
| SPb (Slit angle) | +4° | +7° | +11° | +12° | +14° | +16° |
| SPb (Flow-induced misalignment) | ○ | ○ | ○ | ○ | ○ | ○ |

2100

PE

21

CE

2100

(Observation surface side)

300 } 30
CE 20
21

PE } 10
100

A        (Back surface side)        A (Observation surface side)

2000

(Back surface side)

LIQUID CRYSTAL DISPLAY DEVICE

CROSS-REFERENCE TO RELATED APPLICATIONS

The present application claims priority under 35 U.S.C. § 119 to Japanese Patent Application No. 2023-184016 filed on Oct. 26, 2023, the contents of which are incorporated herein by reference in their entirety.

BACKGROUND OF THE INVENTION

Field of the Invention

The following disclosure relates to liquid crystal display devices.

Description of Related Art

Liquid crystal display devices are display devices that use a liquid crystal material to provide display and generally roughly divided into transmissive liquid crystal display devices and reflective liquid crystal display devices according to their display method. Transmissive liquid crystal display devices provide display in a transmissive mode which uses transmitted light derived from backlight illumination from behind the screen back surface. Reflective liquid crystal display devices provide display in a reflective mode which uses external light (ambient light) instead of backlight illumination. Transflective liquid crystal display devices in which each pixel includes a region providing display in the reflective mode and a transmissive region providing display in the transmissive mode have been suggested as display devices combining the above features.

Liquid crystal display devices can also be roughly classified according to their liquid crystal driving method. For example, known liquid crystal display devices include those in a vertical electric field mode of providing display by driving the liquid crystal layer using an electric field generated in a direction substantially perpendicular to the substrate surface, and those in a transverse electric field mode of providing display by driving the liquid crystal layer using an electric field substantially parallel to the substrate surface. Examples of the vertical electric field mode include the twisted nematic (TN) mode and the multi-domain vertical alignment (MVA) mode. Examples of the transverse electric field mode include the in-plane switching (IPS) mode and the fringe field switching (FFS) mode. For example, JP 5756860 B discloses a liquid crystal display suitable as a liquid crystal display device in a transverse electric field mode. This liquid crystal display is capable of reducing or preventing defects due to process variations and of improving display performance, and is useful particularly as a transmissive liquid crystal display device.

BRIEF SUMMARY OF THE INVENTION

Recent liquid crystal display devices used for devices such as smartphones and tablet computers typically have a touch sensor function. Known touch sensor modes include various modes such as the resistive film mode, the capacitive mode, and the optical mode. Liquid crystal display devices having a touch sensor (such devices are also referred to as touch panels) include those in a mode in which a touch sensor is externally attached (external touch panels) and those in a mode in which a touch sensor is built in (built-in touch panels). Built-in touch panels are more advantageous than external touch panels in, for example, narrowing the frame and reducing the thickness and weight, and also have an advantageous capability of increasing the light transmittance.

Built-in touch panels include on-cell touch panels and in-cell touch panels. A cell means a display panel including an active matrix substrate represented by a thin-film transistor (TFT) substrate, a counter substrate opposing the TFT substrate, and a liquid crystal layer held between these substrates (such a display panel is also referred to as a liquid crystal panel). An in-cell touch panel usually includes a layer that is responsible for the touch sensor function and provided in the display panel. An on-cell touch panel usually includes a layer responsible for the touch sensor function between the display panel and a polarizing plate disposed on the observation surface side of the display panel. An in-cell touch panel can theoretically achieve the thinnest, lightest touch panel. Also, liquid crystal display devices capable of providing display in the reflective mode are suitable for outdoor uses. Thus, in-cell touch panels capable of providing display in the reflective mode have been desired, but such touch panels have not yet emerged.

Such touch panels have not emerged presumably because in the existing reflective liquid crystal display devices, one of the pair of electrodes (counter electrode or common electrode) for application of voltage to the liquid crystal layer is disposed in the counter substrate. The present inventors thus explored the possibilities that a touch panel in a transverse electric field mode such as the FFS mode, which includes both of the pair of electrodes only in the active matrix substrate, can achieve an in-cell touch panel capable of providing display in the reflective mode.

The present inventors thus further examined FFS mode devices which provide display in, for example, the normally black mode. For example, they examined devices in which a positive liquid crystal material was used in the liquid crystal layer and at least one of the pair of electrodes had a slit aperture. The examination revealed that in some cases, applying voltage (5V or higher) on a state with no voltage applied (0V) immediately destabilizes the liquid crystal alignment to cause alignment defects (also referred to as misalignment) where the liquid crystal alignment is discontinuous (see, e.g., Test Example 4 below). Alignment defects lead to issues including slow liquid crystal response, decrease in reflective mode efficiency, decrease in transmissive mode efficiency, and fuzziness during oblique observation. In particular, devices with a non-uniform and unstable liquid crystal alignment are not suitable for practical use as liquid crystal display devices for displaying moving images.

In response to the above issues, an object of the present invention is to provide a liquid crystal display device with sufficiently reduced or prevented alignment defect generation and useful as an in-cell touch panel capable of providing display in the reflective mode.

(1) One embodiment of the present invention is directed to a liquid crystal display device including a first substrate, a second substrate opposing the first substrate, and a liquid crystal layer between the first substrate and the second substrate. The liquid crystal display device includes multiple pixels. The first substrate includes a reflective layer which reflects light, a first electrode and a second electrode which are capable of generating a transverse electric field in the liquid crystal layer, and a first horizontal alignment film in contact with the liquid crystal layer. At least one of the first electrode or the second electrode includes multiple strip portions and a slit between adjacent two strip portions among the multiple strip portions. The multiple strip portions, in each of the pixels, linearly extend substantially parallel to one another in identical directions and include no bent portion. The second substrate includes a second horizontal alignment film in contact with the liquid crystal layer. The liquid crystal layer includes liquid crystal molecules having a positive anisotropy of dielectric constant and is in a twist alignment during no voltage application. An alignment direction of liquid crystal molecules near the first substrate during no voltage application lies at 0° or greater and 16° or smaller when the directions in which the multiple strip portions extend are set as a reference direction at 0°.

(2) In an embodiment of the present invention, the liquid crystal display device includes the structure (1), and the multiple strip portions include no cutout.

(3) In an embodiment of the present invention, the liquid crystal display device includes the structure (1) or (2), and the directions in which the multiple strip portions extend are identical at least in adjacent pixels or in a display region.

(4) In an embodiment of the present invention, the liquid crystal display device includes the structure (1), (2), or (3), the liquid crystal display device includes a first polarizing plate, a first phase difference layer, the first substrate, the liquid crystal layer, the second substrate, a second phase difference layer, and a second polarizing plate in the stated order from a back surface side, the first phase difference layer includes a first λ/2 plate and a first λ/4 plate, the second phase difference layer includes a second λ/2 plate and a second λ/4 plate, and at least one of the first phase difference layer or the second phase difference layer further includes a positive C plate.

(5) In an embodiment of the present invention, the liquid crystal display device includes the structure (4), the second phase difference layer includes one positive C plate, and the first phase difference layer includes no positive C plate or two positive C plates.

(6) In an embodiment of the present invention, the liquid crystal display device includes the structure (4) or (5), the first λ/2 plate and the first λ/4 plate are positioned in the stated order from the back surface side, the second λ/2 plate and the second λ/4 plate are positioned in the stated order from an observation surface side, the first λ/2 plate and the second λ/2 plate provide substantially the same in-plane phase difference Re, and the first λ/4 plate and the second λ/4 plate provide substantially the same in-plane phase difference Re.

(7) In an embodiment of the present invention, the liquid crystal display device includes the structure (4), (5), or (6), and the positive C plate is positioned at least one of between the first λ/2 plate and the first λ/4 plate or between the second λ/2 plate and the second λ/4 plate.

(8) In an embodiment of the present invention, the liquid crystal display device includes the structure (1), (2), (3), (4), (5), (6), or (7), and a twist angle of the liquid crystal layer during no voltage application is 58.3° or greater and 89.9° or smaller.

(9) In an embodiment of the present invention, the liquid crystal display device includes the structure (1), (2), (3), (4), (5), (6), (7), or (8), and the multiple strip portions have a ratio L/S of from 0.4/1 to 0.7/1 where L represents a width per strip portion in a plan view and S represents a width per slit in a plan view.

(10) In an embodiment of the present invention, the liquid crystal display device includes the structure (1), (2), (3), (4), (5), (6), (7), (8), or (9), and the liquid crystal layer is in a single domain alignment.

(11) In an embodiment of the present invention, the liquid crystal display device includes the structure (1), (2), (3), (4), (5), (6), (7), (8), (9), or (10) and provides display in a normally black mode.

(12) In an embodiment of the present invention, the liquid crystal display device includes the structure (1), (2), (3), (4), (5), (6), (7), (8), (9), (10), or (11), one of the first electrode and the second electrode corresponds to pixel electrodes provided in the respective multiple pixels while the other of the first electrode and the second electrode corresponds to a common electrode including multiple segments each being capable of functioning as a touch sensor electrode, and the first substrate includes multiple touch lines each being connected to a corresponding one of the touch sensor electrodes.

(13) In an embodiment of the present invention, the liquid crystal display device includes the structure (1), (2), (3), (4), (5), (6), (7), (8), (9), (10), (11), or (12) and further includes a light source.

(14) In an embodiment of the present invention, the liquid crystal display device includes the structure (1), (2), (3), (4), (5), (6), (7), (8), (9), (10), (11), (12), or (13), and each of the pixels includes a reflective region of providing display by reflecting light using the reflective layer and a transmissive region of providing display by transmitting light.

The present invention can provide a liquid crystal display device with sufficiently reduced or prevented alignment defect generation and useful as an in-cell touch panel capable of providing display in the reflective mode.

BRIEF DESCRIPTION OF THE DRAWINGS

FIG. 27 shows the results of Test Example 2.

FIG. 30 shows the results of Test Example 4.

DETAILED DESCRIPTION OF THE INVENTION

Definition of Terms

Figure 1:
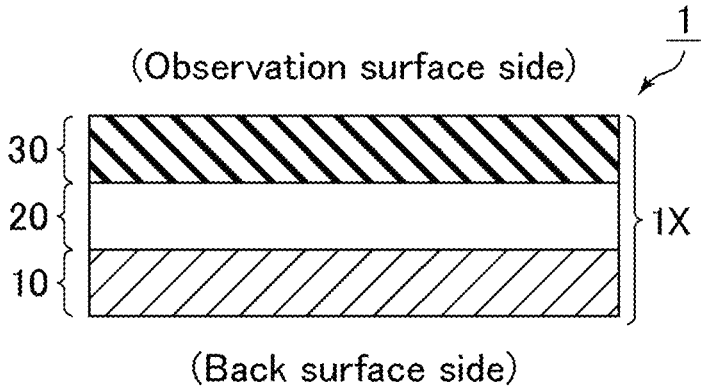
FIG. 1 is a schematic cross-sectional view of a liquid crystal display device 1.

Herein, the observation surface side means the side closer to the screen (display surface) of the liquid crystal display device, and the back surface side means the side farther from the screen (display surface) of the liquid crystal display device.

A state with no voltage applied means a state where the voltage applied to the liquid crystal layer is lower than the threshold voltage (including application of no voltage). A state with voltage applied means a state where the voltage applied to the liquid crystal layer is equal to or higher than the threshold voltage. Herein, the state with no voltage applied is also referred to as "during no voltage application", and the state with voltage applied is also referred to as "during voltage application".

A polar angle means an angle formed between the direction in question (e.g., measurement direction) and the direction normal to the screen of the liquid crystal panel.

An azimuth means the direction in question in a view projected onto the screen of the liquid crystal panel and is expressed as an angle (azimuthal angle) formed with the reference azimuth.

Here, the reference azimuth (0°) is set to the right in the horizontal direction of the screen of the liquid crystal panel, unless otherwise specified. The angle and the azimuthal angle are measured as positive in the counterclockwise direction from the reference azimuth and as negative in the clockwise direction from the reference azimuth. The counterclockwise and clockwise directions are rotational directions when the screen of the liquid crystal panel is observed from the observation surface side (front). The angle is a value measured in a plan view of the screen of the liquid crystal panel, and means an acute angle, unless the rotational direction or other conditions are specified.

The axis azimuth of an optical film means the azimuth at which the polarization axis lies in the case of a polarizing plate and means the azimuth at which the slow axis lies in the case of a phase difference layer. The polarization axis of a polarizing plate means the absorption axis in the case of an absorptive polarizing plate and means the reflection axis in the case of a reflective polarizing plate. The axis azimuth of a phase difference layer means, unless otherwise specified, the azimuth at which an in-plane slow axis of the phase difference layer lies.

A phase difference layer means a layer providing at least one of an in-plane retardation (also referred to as an in-plane phase difference) Re or a thickness direction retardation (also referred to as a thickness direction phase difference) Rth of 10 nm or more, preferably 20 nm or more. Numerical values denoted herein as Re or Rth are each an absolute value, unless otherwise specified.

The in-plane phase difference Re is defined by the formula: $Re=(nx-ny)\times d$.

The thickness direction phase difference Rth is defined by the formula: $Rth=\{nz-(nx+ny)/2\}\times d$.

nx represents a principal refractive index in an in-plane slow axis direction of each phase difference layer.

ny represents a principal refractive index in an in-plane fast axis direction of each phase difference layer.

nz represents a principal refractive index in a direction perpendicular to a surface of each phase difference layer.

A slow axis direction is at an azimuth where the refractive index becomes maximum. A fast axis direction is at an azimuth where the refractive index becomes minimum. d represents the thickness of a phase difference layer.

An A plate is a phase difference plate that satisfies the relationship "$nx>ny\approx nz$".

The measurement wavelength for optical parameters such as a refractive index and a phase difference herein is 550 nm unless otherwise specified.

The expression "substantially parallel" means that the angle (absolute value) formed between two objects falls within the range of 0°±10°. This angle preferably falls within the range of 0°±5° and is more preferably 0° (which means parallel in a narrow sense). The expression "substantially orthogonal (or substantially perpendicular)" means that the angle (absolute value) formed between two objects falls within the range of 90°±10°. This angle preferably falls within the range of 90°±5° and is more preferably 90° (which means orthogonal or perpendicular in a narrow sense).

Hereinafter, liquid crystal display devices according to embodiments of the present invention are described. The present invention is not limited to the following embodiments, and the design of the present invention can be modified as appropriate within the range satisfying the configuration of the present invention.

Embodiment 1

Figure 2:
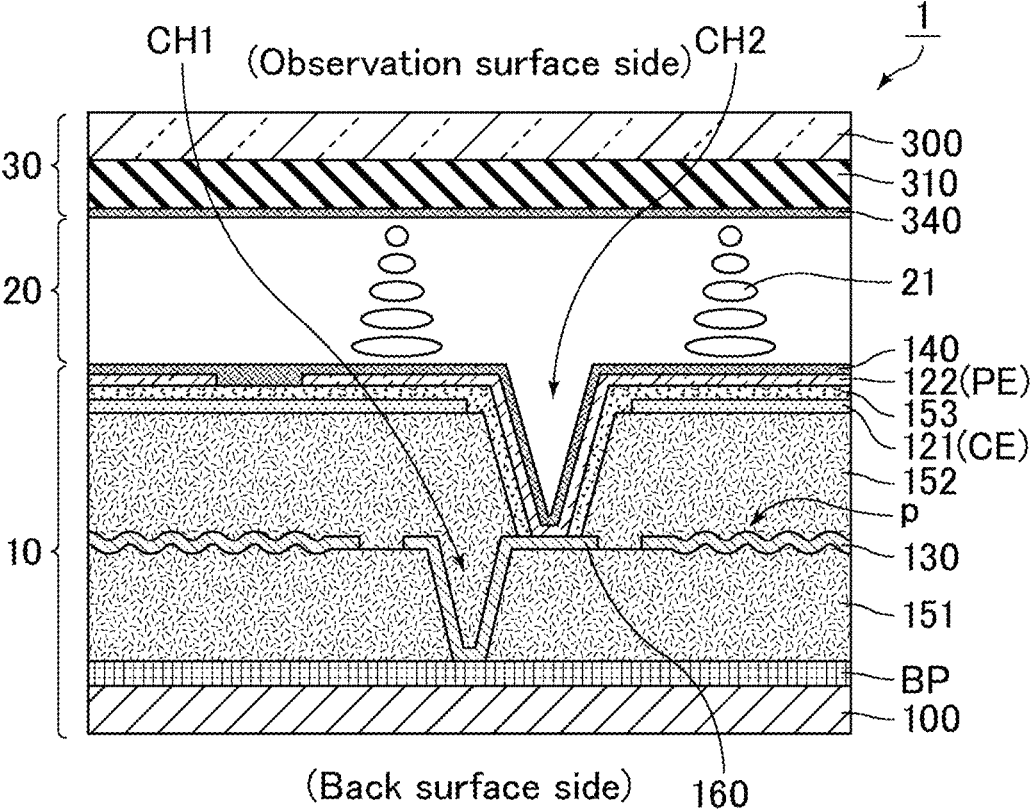
FIG. 2 is a more detailed schematic cross-sectional view of the liquid crystal display device 1.
Figure 3:
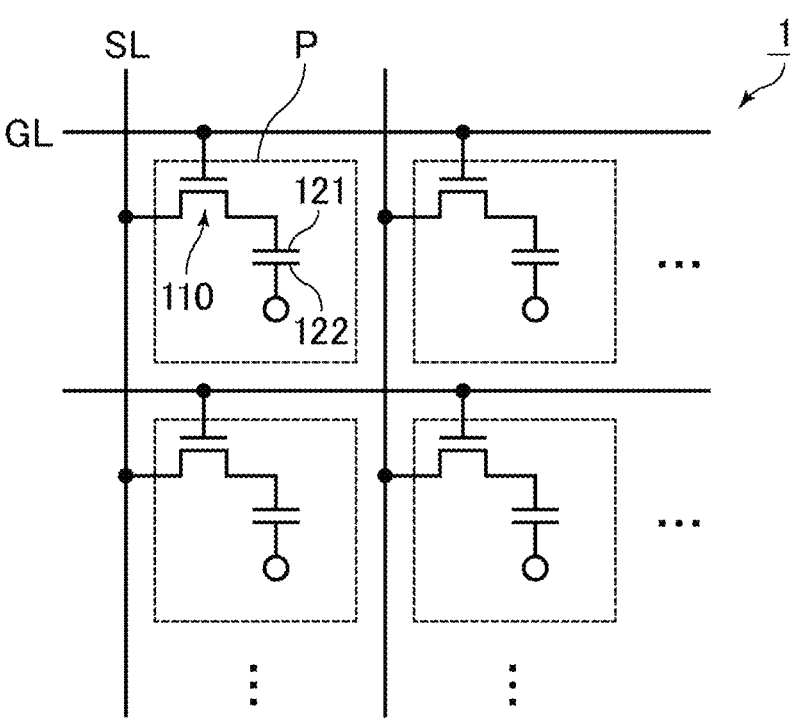
FIG. 3 is a schematic plan view when the whole liquid crystal display device 1 is viewed from the observation surface side.

FIG. 1 is a schematic cross-sectional view of a liquid crystal display device 1. FIG. 2 is a more detailed schematic cross-sectional view of the liquid crystal display device 1. FIG. 3 is a schematic plan view when the whole liquid crystal display device 1 is viewed from the observation surface side. As shown in FIG. 1, a liquid crystal display device 1 includes, in order from the back surface side, a first substrate 10, a liquid crystal layer 20, and a second substrate 30. In the present embodiment, a TFT substrate is used as the first substrate 10. A portion or structure in which the liquid crystal layer 20 is held between the first substrate 10 and the second substrate 30 is also referred to as a liquid crystal panel 1X.

The liquid crystal display device 1 includes pixels P. The pixels P are preferably arranged in a matrix pattern as shown in FIG. 3. The pixels P typically include three types of pixels, namely red pixels, green pixels, and blue pixels. The types of pixels may be two or less or four or more. Each pixel P includes a thin-film transistor (TFT) 110, and a first electrode 121 and a second electrode 122 which are capable of generating a transverse electric field in the liquid crystal layer 20. The gate electrode of the TFT 110 is electrically connected to a corresponding gate line (also referred to as scanning line) GL. The source electrode of the TFT 110 is electrically connected to a corresponding source line (also referred to as signal line) SL. The drain electrode of the TFT 110 is electrically connected to the second electrode 122.

<First Substrate>

The first substrate 10 includes, as shown in FIG. 2, in order from the back surface side to the observation surface side, a reflective layer 130 which reflects light, a first electrode 121, a second electrode 122, and a first horizontal alignment film 140 which is in contact with the liquid crystal layer 20. The first substrate 10 preferably further includes, on the back surface side of the reflective layer 130, a supporting substrate 100 and a backplane circuit BP. An insulating layer (also referred to as insulating film) is disposed between components such as layers as appropriate. For example, a first interlayer insulating layer 151 covers the backplane circuit BP, a second interlayer insulating layer 152 is disposed on the first interlayer insulating layer 151 with the reflective layer 130 in between, and a dielectric layer (also referred to as third interlayer insulating layer) 153 is disposed between the first electrode 121 and the second electrode 122.

The supporting substrate 100 is preferably a transparent, insulating one. Examples of the supporting substrate 100 include glass substrates and plastic substrates.

The backplane circuit BP is disposed on the supporting substrate 100. The backplane circuit BP is a circuit for driving the pixels P and includes TFTs 110, gate lines GL, and source lines SL, for example. The backplane circuit BP usually includes a gate insulator 150G as well.

The TFTs 110 are disposed in the respective pixels P. TFTs 110 are preferably those including an oxide semiconductor layer as an active layer (such TFTs are also referred to as oxide semiconductor TFTs). The oxide semiconductor contained in such an oxide semiconductor layer has recently been gathering attention as an active layer material alternative to amorphous silicon and polycrystalline silicon and has a higher mobility than amorphous silicon. Oxide semiconductor TFTs thus can operate at higher speed than amorphous silicon TFTs. Also being formed through a simpler process than polycrystalline silicon layers, oxide semiconductor layers are applicable to a device that requires a large area.

Oxide semiconductor TFTs also have excellent off-leak characteristics, and thus can be driven in a mode where display is provided with a lower image rewriting frequency. For example, during display of a still image, driving is possible that makes the oxide semiconductor TFTs rewrite the image data at a frequency of once a second. Such a driving mode is called pause driving or low-frequency driving and can significantly reduce the power consumed by the liquid crystal display device. Employing the pause driving and allowing touch detection during no image rewriting enable reduction of a decrease in sensitivity to touch operations due to noises from the drive circuits, thus making the S/N ratio (signal-to-noise ratio) about 10 times the conventional ratio, for example.

Oxide semiconductor TFTs are also advantageous in downscaling of TFTs, and can also be suitable for achieving a configuration in which memory circuits are disposed in the respective pixels P (also referred to as a memory-in-pixel (MIP) configuration).

The oxide semiconductor may be an amorphous oxide semiconductor or a crystalline oxide semiconductor including a crystalline portion. Examples of the crystalline oxide semiconductor include polycrystalline oxide semiconductors, microcrystalline oxide semiconductors, and crystalline oxide semiconductors in which the c-axes are aligned roughly perpendicularly to the surface of the layer.

The oxide semiconductor layer may be a single-layer structure or a laminate structure of two or more layers. An oxide semiconductor layer having a laminate structure may include an amorphous oxide semiconductor layer and a crystalline oxide semiconductor layer, may include a crystalline oxide semiconductor layers with different crystal structures, or may include amorphous oxide semiconductor layers. When the oxide semiconductor layer includes a two-layer structure including an upper layer and a lower layer, the energy gap of the oxide semiconductor in the lower layer may differ from that of the oxide semiconductor in the upper layer.

The material, structure, and film formation method of the amorphous oxide semiconductors and the crystalline oxide semiconductors and the configuration of oxide semiconductor layers having a laminate structure are described in, for example, JP 2014-007399 A. For reference, the contents of JP 2014-007399 A are incorporated herein by reference in their entirety.

Specific suitable examples of the oxide semiconductor layer include those containing at least one metal element selected from indium (In), gallium (Ga), and zinc (Zn). In particular, oxide semiconductor films containing ternary oxides of In, Ga, and Zn are more preferred. Preferred examples of ternary oxides of In, Ga, and Zn include the indium gallium zinc oxide. A semiconductor containing ternary oxides of In, Ga, and Zn are called In—Ga—Zn—O-based semiconductors. In such semiconductors, the ratio (composition ratio) of In, Ga, and Zn is not limited and may be, for example, In:Ga:Zn=2:2:1, In:Ga:Zn=1:1:1, or In:Ga:Zn=1:1:2.

The In—Ga—Zn—O-based semiconductors may be amorphous ones or crystalline ones. Crystalline In—Ga—Zn—O-based semiconductors are preferably those in which c-axes are aligned roughly perpendicularly to the surface of the layer.

The crystal structures of crystalline In—Ga—Zn—O-based semiconductors are disclosed in, for example, JP 2014-007399 A, JP 2012-134475 A, and JP 2014-209727 A. For reference, the contents of JP 2012-134475 A and JP 2014-209727 A are incorporated herein by reference in their entirety. TFTS having an In—Ga—Zn—O-based semiconductor layer exhibit high mobility (more than 20 times that of a-Si TFTs) and low leak current (less than 1/100 of that of a-Si TFTs) and thus are suitable as driving TFTs (e.g., TFTs included in a drive circuit which is disposed around the display region including pixels and in the same substrate as the TFTs in the display region) and pixel TFTs (TFTs disposed in pixels).

The oxide semiconductor layer may contain an oxide semiconductor other than an In—Ga—Zn—O-based semiconductor. Examples thereof include ternary oxides of In, Sn (tin), and Zn. Preferred examples thereof include $In_2O_3$—$SnO_2$—ZnO (it is also referred to as InSnZnO). Semiconductors containing ternary oxides of In, Sn, and Zn are also referred to as In—Sn—Zn—O-based semiconductors. The oxide semiconductor layer may also contain an In—Al—Zn—O-based semiconductor, an In—Al—Sn—Zn—O-based semiconductor, a Zn—O-based semiconductor, an In—Zn—O-based semiconductor, a Zn—Ti—O-based semiconductor, a Cd—Ge—O-based semiconductor, a Cd—Pb—O-based semiconductor, a cadmium oxide (CdO) semiconductor, a Mg—Zn—O-based semiconductor, an In—Ga—Sn—O-based semiconductor, an In—Ga—O-based semiconductor, a Zr—In—Zn—O-based semiconductor, a Hf—In—Zn—O-based semiconductor, an Al—Ga—Zn—O-based semiconductor, a Ga—Zn—O-based semiconductor, or an In—Ga—Zn—Sn—O-based semiconductor, for example.

The first interlayer insulating layer 151 covers the backplane circuit BP. The reflective layer 130 side surface of the first interlayer insulating layer 151 preferably has an irregular shape (also referred to as irregular surface structure). This can make the reflective layer 130 have an irregular surface structure reflecting the irregular shape. The first interlayer insulating layer 151 having an irregular surface structure can be suitably formed using a photosensitive resin as described in JP 3394926 B, for example.

The reflective layer (also referred to as reflective film) 130 is disposed on the first interlayer insulating layer 151. The reflective layer 130 is formed from a material that reflects light. Particularly preferred materials include metal materials having a high reflectance. Examples of the material of the reflective layer 130 include silver alloys and aluminum alloys.

The reflective layer 130 preferably has an irregular shape reflecting the irregular surface structure that the first interlayer insulating layer 151 preferably has. In other words, the reflective layer 130 also preferably has an irregular surface structure. The irregular surface structure is also referred to as a micro reflective structure (MRS) and is disposed to diffusively reflect ambient light to achieve white display close to that with a paper-white reflectance. The irregular surface structure, for example, is preferably defined by protrusions p randomly arranged with the center-to-center distance between adjacent protrusions p being 5 μm or more and 50 μm or less. The center-to-center distance between adjacent protrusions p is more preferably 10 μm or more and 20 μm or less. Suitably, the shape of the protrusions p is substantially circular or substantially polygonal when the protrusions p are viewed from the direction normal to the supporting substrate. The protrusions preferably occupy, for example, about 20% to 40% of the area of the corresponding pixel P. The height of each protrusion p is preferably, for example, 1 μm or more and 5 μm or less.

The liquid crystal display device 1 can convert polarized lights in a way characteristic of reflective liquid crystal display devices (e.g., conversion between circularly polarized light and linearly polarized light) in the case of including the reflective layer 130 and a broadband λ/4 phase difference layer, thus sufficiently reducing loss of light. The broadband λ/4 phase difference is a condition that can produce polarized light close to circularly polarized light in a broadband within the visible spectrum.

The second interlayer insulating layer 152 is disposed over the first interlayer insulating layer 151 by covering the reflective layer 130. In other words, the reflective layer 130 is disposed between the first interlayer insulating layer 151 and the second interlayer insulating layer 152.

The first interlayer insulating layer 151 and the second interlayer insulating layer 152 are preferably formed from an organic insulating material or an inorganic insulating material. Examples of organic insulating films formed from an organic insulating material include organic films (relative dielectric constant $\zeta$=2 to 5) formed from an acrylic resin, a polyimide resin, or a novolac resin, and laminates of such organic films. The film thickness of the organic insulating film is not limited and is 2 μm or greater and 4 μm or smaller, for example. Examples of inorganic insulating films formed from an inorganic insulating material include inorganic films (relative dielectric constant $\zeta$=5 to 7) formed from silicon nitride (SiNx) or silicon oxide ($SiO_2$), and laminates of such inorganic films. The film thickness of the inorganic insulating film is not limited and is 1500 Å or more and 3500 Å or less, for example. Alternatively, a laminate of an organic insulating film and an inorganic insulating film may be used. A particularly suitable case is where the first interlayer insulating layer 151 and the second interlayer insulating layer 152 are organic insulating films.

From a manufacturing perspective, the interlayer insulating layers 151 and 152 preferably have high transparency, and are preferably formed from the identical material having a high transmittance. The first interlayer insulating layer 151, which is farther from the observation surface side than the reflective layer 130 is, may have a low transmittance or may be opaque. The second interlayer insulating layer 152 may be highly transparent in terms of light use efficiency, and may be formed from a material that is different from the material of the first interlayer insulating layer 151 and has a high transmittance.

The first electrode 121 is disposed on the reflective layer 130 with the second interlayer insulating layer 152 in between. A dielectric layer 153 is disposed between the first electrode 121 and the second electrode 122. Thus, the reflective layer 130 is disposed opposite to the liquid crystal layer 20 across the first electrode 121 and the second electrode 122 (i.e., closer to the back surface side than the first electrode 121 and the second electrode 122 are). The first electrode 121 and the second electrode 122 in the present embodiment are disposed such that the second electrode 122 is relatively closer to the observation surface side and the first electrode 121 is relatively closer to the back surface side. The electrode relatively closer to the observation surface side is also referred to as an upper layer electrode. The electrode relatively closer to the back surface side is also referred to as a lower layer electrode.

One of the first electrode 121 and the second electrode 122 corresponds to pixel electrodes PE, and the other corresponds to a common electrode CE. The pixel electrodes are disposed in the respective pixels P. The pixel electrodes are electrically connected to the backplane circuit BP. In the present embodiment, the first electrode 121 (lower layer electrode) corresponds to the common electrode CE, and the second electrode 122 (upper layer electrode) corresponds to the pixel electrodes PE.

At least one of the first electrode 121 or the second electrode 122 includes multiple strip portions SP and a slit S1 between adjacent two strip portions among the multiple strip portions. A strip portion SP corresponds to an electrode portion. A slit S1 corresponds to an aperture portion. An electrode with these portions is also referred to as a slit electrode or a finger electrode. For easy generation of a transverse electric field, at least the upper layer electrode (pixel electrodes PE in the present embodiment) is suitably a slit electrode. In this case, the lower layer electrode (common electrode CE in the present embodiment) may be a planar electrode, i.e., what is called a solid electrode, or may be a slit electrode.

In each pixel P, the multiple strip portions SP constituting a slit electrode (second electrode 122 which corresponds to pixel electrodes PE in the present embodiment) linearly extend substantially parallel to one another in the identical directions and include no bent portion. This makes the alignment of liquid crystal molecules uniform, sufficiently reducing or preventing generation of alignment defects.

The expression that the strip portions SP "linearly extending and including no bent portion" means that the centerline, not the outer edge, of each strip portion SP is linear without bending. The centerline of a strip portion SP means a line that halves the strip portion SP in a width direction. The width direction means a direction substantially perpendicular to the directions in which the strip portions SP extend in a plan view. Thus, even when the outer edges of the tips of strip portions SP are circular, the strip portions SP are still considered to be encompassed by the strip portions SP "linearly extending and including no bent portion" as long as the centerlines of the strip portions SP are linear without bending.

The strip portions SP also preferably include no cutout. This can further reduce or prevent generation of misalignment. The expression "strip portions SP include no cutout" means that a strip portion SP is not partially cut out or removed.

The directions in which the multiple strip portions SP extend (also referred to as extension directions of multiple strip portions SP) in each pixel P are substantially parallel to one another. Also, the extension directions of the multiple strip portions SP may differ from pixel to pixel, but are preferably identical in adjacent two or more pixels. In particular, the extension directions of the multiple strip portions SP are more preferably identical in at least adjacent pixels in terms of image quality and manufacture. The later-described FIG. 6A to FIG. 6F each show an example in which the extension directions of the multiple strip portions SP are identical in adjacent pixels. More suitably, the extension directions of the multiple strip portions SP are identical in the display region.

The width L of each strip portion SP is preferably from 0.3 to 10 μm, for example, depending on the conditions such as the application voltage. The width L is more preferably from 1 to 5 μm. The pitch between adjacent two strip portions SP (i.e., the pitch between the centerlines of the strip portions) is preferably from 0.3 to 10 μm, for example, depending on the conditions such as the application voltage. The pitch is more preferably from 1 to 5 μm.

The ratio L/S between the width L per strip portion in a plan view and the width S per slit in a plan view (also referred to as an L/S condition) is preferably from 0.4/1 to 0.7/1. This increases the reflectance during white display (also referred to as white reflectance), thus further increasing the contrast ratio (also simply referred to as "contrast"). The L/S condition is, for example, 1.6/3 (i.e., 0.533/1), L/S=2.2/4.1 (i.e., 0.537/1), or L/S=3/5 (i.e., 0.6/1).

The alignment direction of liquid crystal molecules 21 near the first substrate 10 during no voltage application (i.e., the alignment direction of liquid crystal molecules 21A defined by the first horizontal alignment film 140) is 0° or greater and 16° or smaller, with the extension directions of the multiple strip portions SP set as the reference (0°). This angle, i.e., the angle of the alignment direction of liquid crystal molecules 21 near the first substrate 10 during no voltage application with the extension directions of the multiple strip portions SP set as the reference (0°) is referred to as a slit angle. The slit angle is measured as a positive angle (+) in the case of clockwise rotation and measured as a negative angle (−) in the case of counterclockwise rotation. The definition of a slit angle is now described with reference to FIG. 4.

Figure 4:
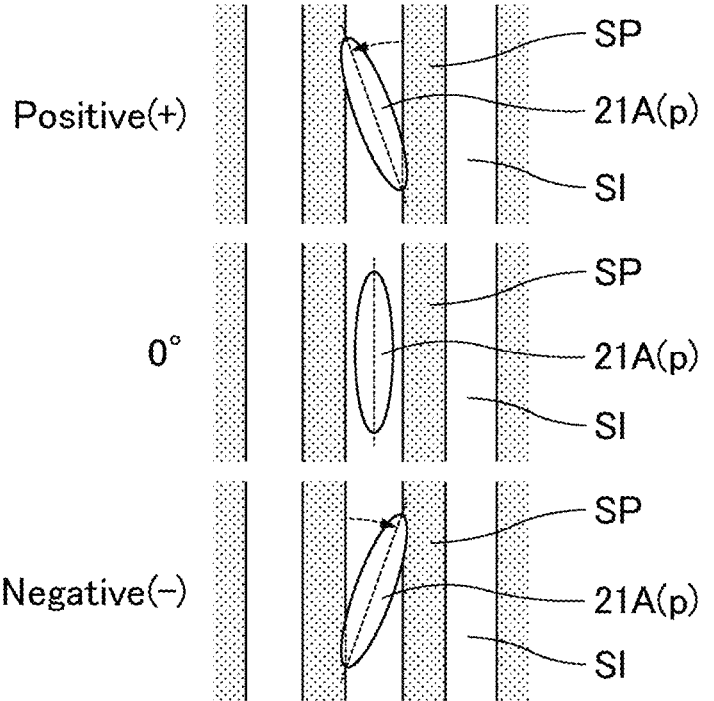
FIG. 4 illustrates slit angles of liquid crystal molecules.

FIG. 4 illustrates slit angles of positive liquid crystal molecules. The "(p)" at the end of the reference sign of the liquid crystal molecules means a positive type. Herein, liquid crystal molecules 21 near the first horizontal alignment film 140 (i.e., first substrate 10 side liquid crystal molecules) are also referred to as liquid crystal molecules 21A. Liquid crystal molecules 21 near a second horizontal alignment film 340 (i.e., second substrate 30 side liquid crystal molecules) are also referred to as liquid crystal molecules 21B.

In the case of positive liquid crystal molecules, the alignment direction of the first substrate 10 side liquid crystal molecules 21A during no voltage application corresponds to the long axis direction of the liquid crystal molecules 21A. When the long axis direction of the liquid crystal molecules 21A is parallel to the extension directions of the multiple strip portions SP, the slit angle is 0° (see the "0" part in FIG. 4). When the extension directions of the multiple strip portions SP rotate clockwise with the long axis direction of the liquid crystal molecules 21A set as the reference (0°), the slit angle is measured as a positive angle (+) (see the "Positive (+)" part in FIG. 4). When the extension directions of the multiple strip portions SP rotate counterclockwise with the long axis direction of the liquid crystal molecules 21A set as the reference (0°), the slit angle is measured as a negative angle (−) (see the "Negative (−)" part in FIG. 4).

The slit angle is thus also regarded as an angle between the extension directions of the multiple strip portions set as the reference (0°) and an axis direction of the first substrate 10 side liquid crystal molecules 21A with a greater absolute value of dielectric constant during no voltage application.

In the present embodiment, the slit angle is 0° or greater and 16° or smaller. With the slit angle falling within the above range, the rotation direction of the first substrate 10 side liquid crystal molecules 21A matches the rotation direction of the second substrate 30 side liquid crystal molecules 21B, which sufficiently reduces or prevents generation of alignment defects. In particular, in order to reduce or prevent generation of alignment defects and further increase the transmission efficiency, the slit angle is preferably 0° or greater and 14° or smaller, more preferably 0° or greater and 12° or smaller, still more preferably 0° or greater and 10° or smaller, particularly preferably 0° or greater and 7° or smaller, most preferably 0° or greater and 4° or smaller.

Figure 5:
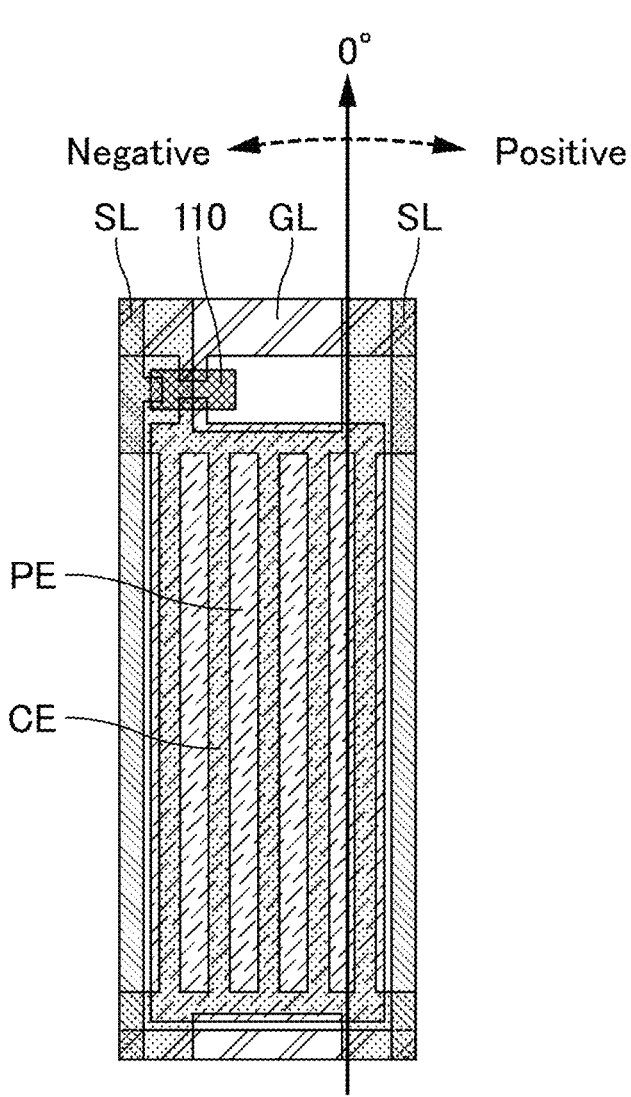
FIG. 5 is a schematic plan view of a pixel structure example (angle X is 0°).
Figure 6A:
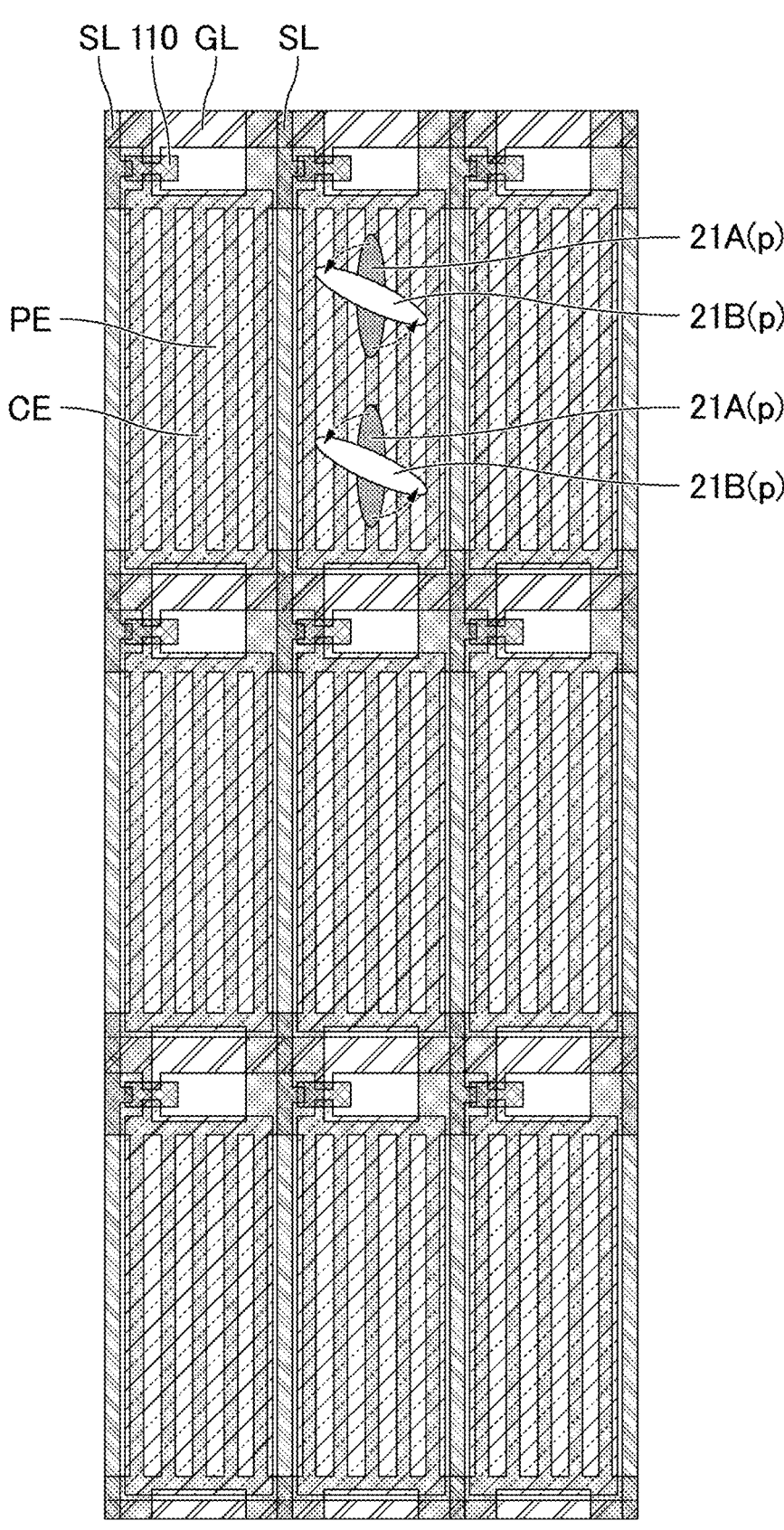
FIG. 6A is a schematic plan view showing a pixel arrangement example (angle X is 0°).
Figure 6B:
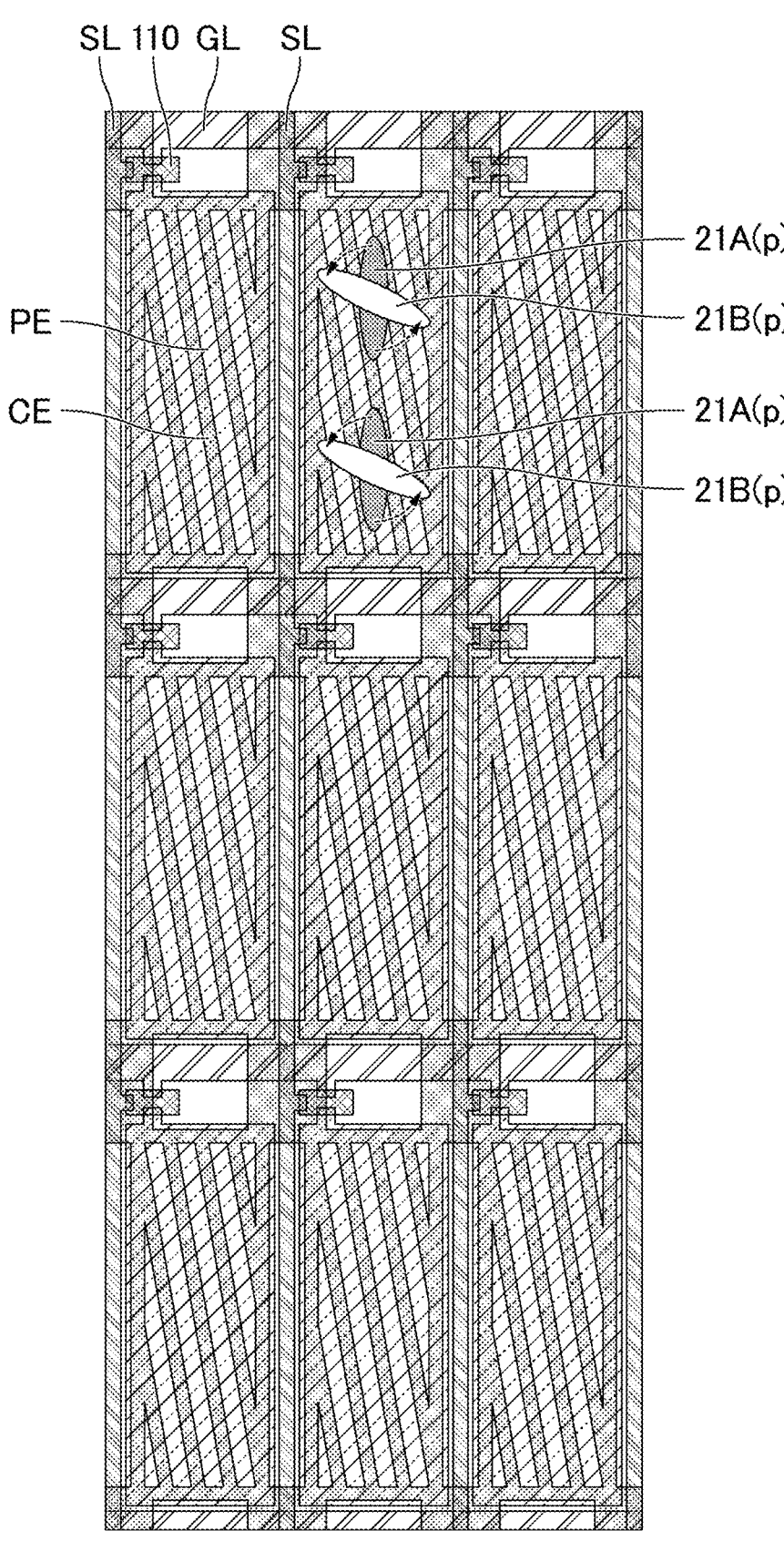
FIG. 6B is a schematic plan view showing a pixel arrangement example (angle X is −10°).
Figure 6C:
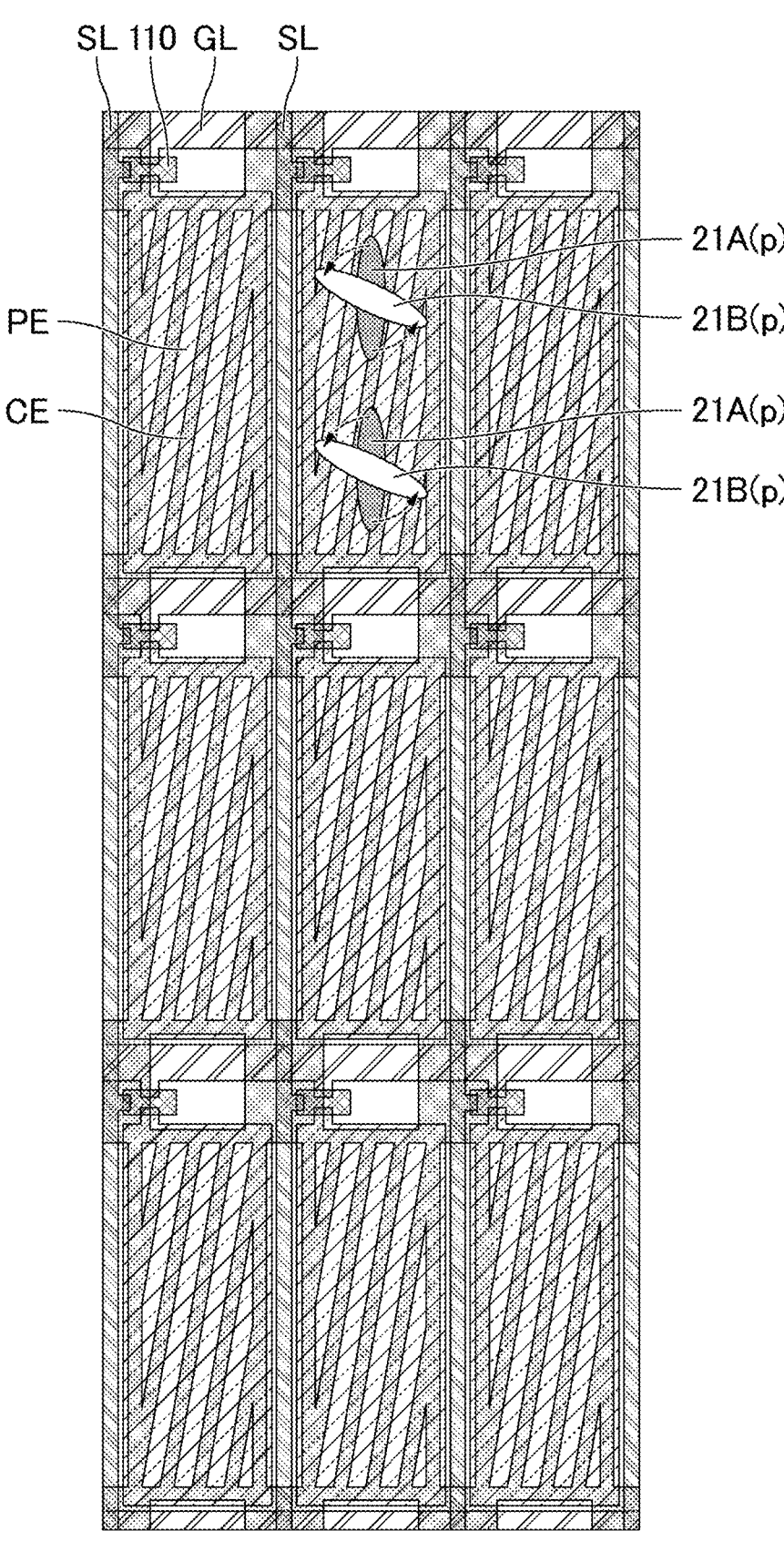
FIG. 6C is a schematic plan view showing a pixel arrangement example (angle X is +10°).
Figure 6D:
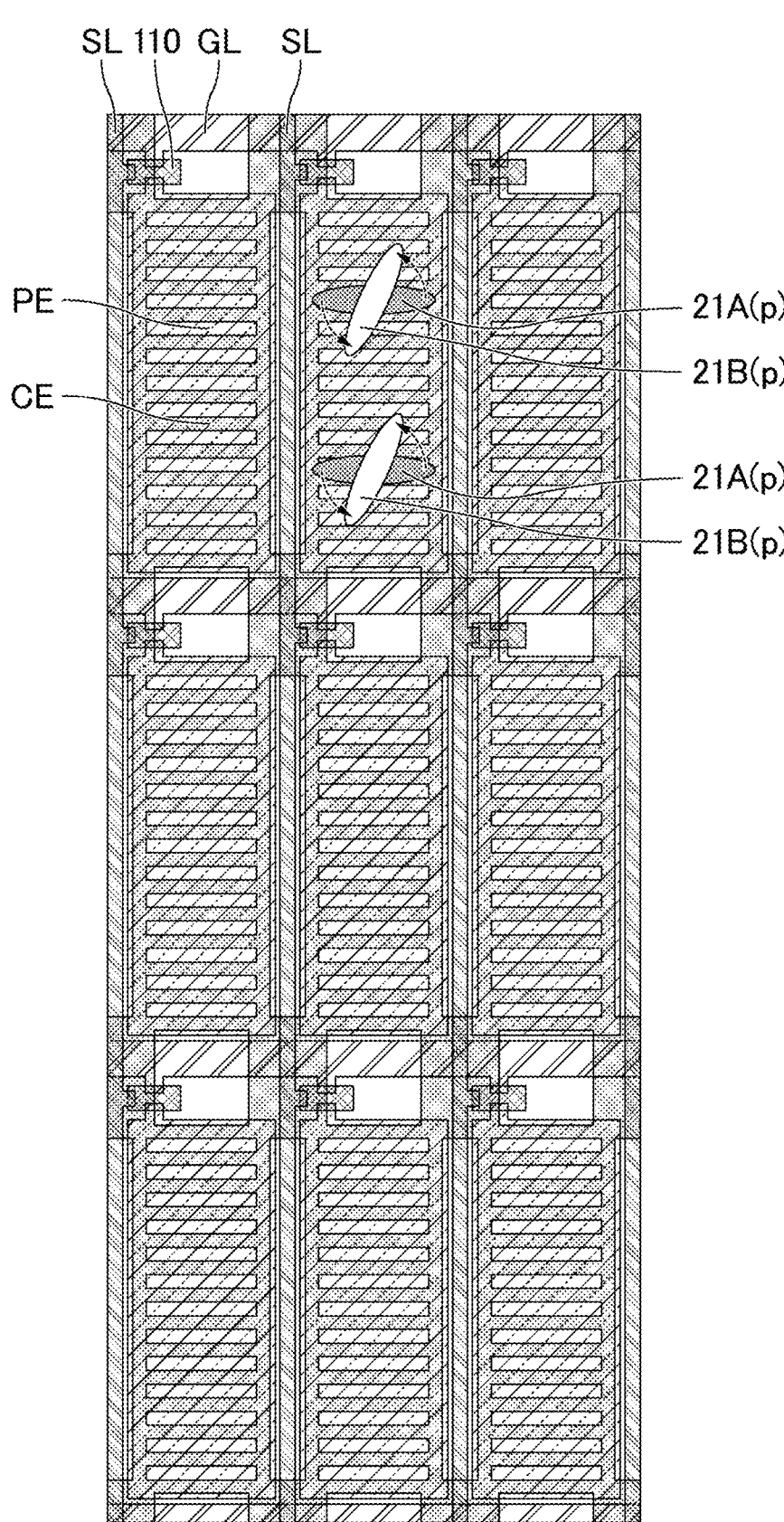
FIG. 6D is a schematic plan view showing a pixel arrangement example (angle X is −90°).
Figure 6E:
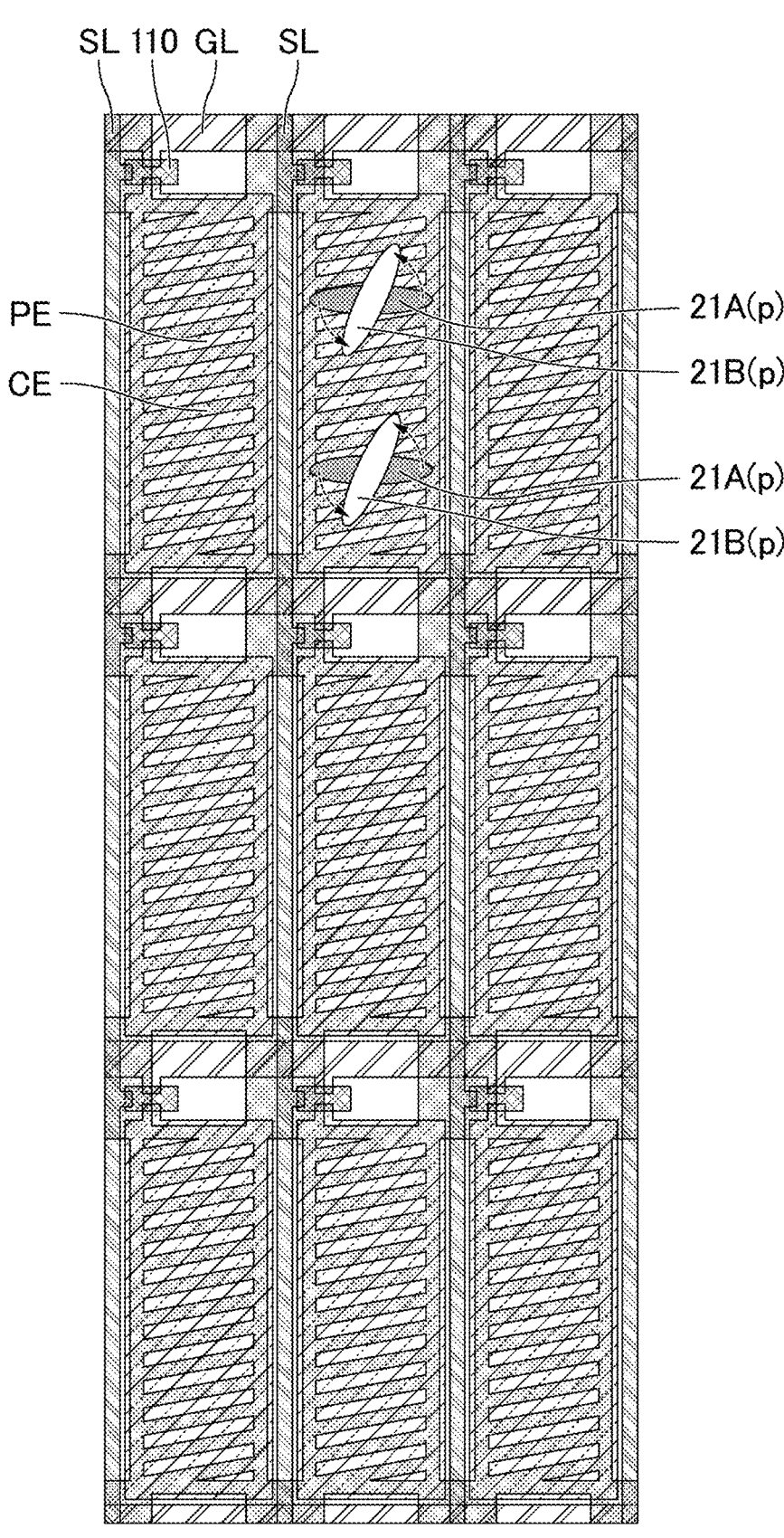
FIG. 6E is a schematic plan view showing a pixel arrangement example (angle X is −100°).
Figure 6F:
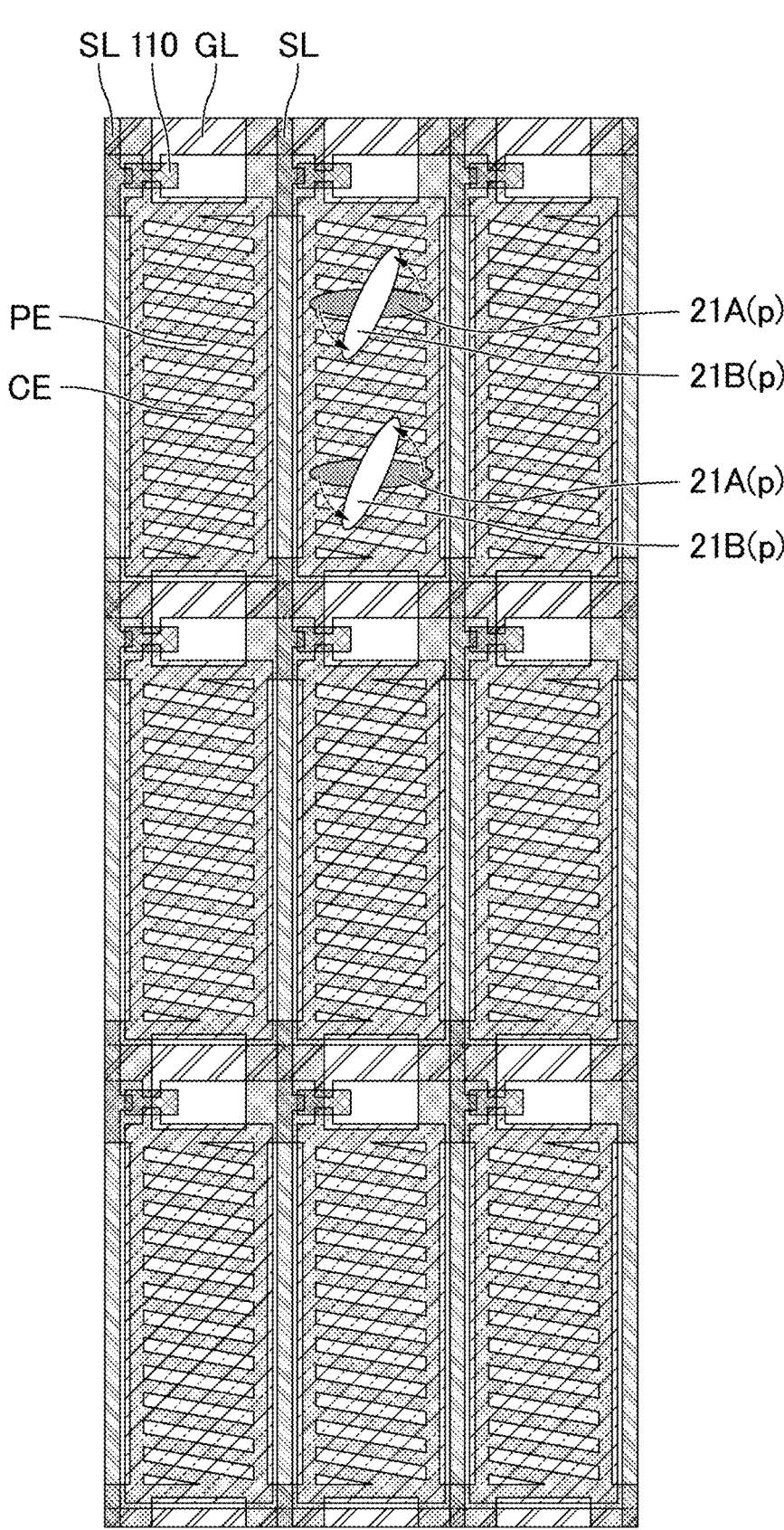
FIG. 6F is a schematic plan view showing a pixel arrangement example (angle X is −80°).

FIG. 5 and FIG. 6A each show an example in which the extension directions of the multiple strip portions SP (the angle thereof is referred to as an angle X) are 0° when a clockwise rotation angle is measured as a positive angle (+) and a counterclockwise rotation angle is measured as a negative angle (−) with the extension directions of the source lines SL set as the reference (0°). The examples in which the angles X are −10°, +10°, −90°, −100°, and −80° are respectively shown as FIG. 6B, FIG. 6C, FIG. 6D, FIG. 6E, and FIG. 6F. A mode where the angle X is 0° (see FIG. 5 and FIG. 6A) corresponds to a mode where the extension directions of the multiple strip portions SP are parallel to the extension directions of the source lines SL. A mode where the angle X is −90° (see FIG. 6D) corresponds to a mode where the extension directions of the multiple strip portion SP are parallel to the extension directions of the gate lines GL. FIG. 5 and FIG. 6A to FIG. 6F are each a schematic plan view schematically showing a specific example of pixels. FIG. 5 is a schematic plan view showing pixel structure examples, and FIG. 6A to FIG. 6F are schematic plan views showing pixel arrangement examples. FIG. 6A to FIG. 6F also show a twist alignment of the liquid crystal molecules 21.

The first electrode 121 and the second electrode 122 are each preferably formed from a transparent conductive material. The transparent conductive material can be, for example, indium tin oxide (ITO), indium zinc oxide (IZO®), or a mixture thereof.

In the mode shown in FIG. 2, a pixel electrode PE (second electrode 122 in the present embodiment) is electrically connected to the backplane circuit (specifically, drain electrode of a corresponding TFT 110) via a corresponding contact electrode 160. The contact electrode 160 is formed in the same layer as the reflective layer 130 from the same material as the reflective layer 130 (e.g., metal film). In the first interlayer insulating layer 151, a first contact hole CH1 is formed in which part of the backplane circuit BP (specifically, at least part of the drain electrode of the TFT 110) is exposed. The contact electrode 160 is connected to the backplane circuit BP in the first contact hole CH1. In the second interlayer insulating layer 152, a second contact hole CH2 is formed in which part of the contact electrode 160 is exposed. The pixel electrode PE (second electrode 122 in the present embodiment) is connected to the contact electrode 160 in the second contact hole CH2.

The dielectric layer 153 covers the first electrode 121. Preferably, the dielectric layer 153 is formed from an inorganic insulating material. An inorganic insulating film formed from an inorganic insulating material is as described above.

The first horizontal alignment film 140 is formed on the second electrode 122 and in contact with the liquid crystal layer 20. Thus, the first electrode 121 and the second electrode 122 are regarded as being disposed between the second interlayer insulating layer 152 and the first horizontal alignment film 140.

The first horizontal alignment film 140 and the later-described second horizontal alignment film 340 have each been subjected to an alignment treatment, and define the alignment azimuth (also referred to as alignment direction) of the liquid crystal molecules 21 in the liquid crystal layer 20. For example, photoalignment treatment or rubbing treatment is preferably performed as the alignment treatment. The photoalignment treatment can be performed using a photolytic photoalignment film material. The rubbing treatment is preferably performed using an alignment film material such as polyimide.

The first horizontal alignment film 140 and the second horizontal alignment film 340 are each a horizontal alignment film which, in a state where voltage is not applied to the liquid crystal layer 20, aligns the liquid crystal molecules 21 in a direction horizontal to the first substrate 10 and the second substrate 30. In other words, the liquid crystal molecules 21 are horizontally aligned in a state where voltage is not applied to the liquid crystal layer 20. The pre-tilt angle is substantially 0°.

The alignment azimuth of the liquid crystal molecules 21 defined by the first horizontal alignment film 140 and the alignment azimuth of the liquid crystal molecules 21 defined by the second horizontal alignment film 340 are different from each other. Thus, the liquid crystal layer 20 is in a twist alignment during no voltage application (see FIG. 2). When voltage is applied to the liquid crystal layer 20, i.e., when the first electrode 121 and the second electrode 122 generate a transverse electric field in the liquid crystal layer 20, the transverse electric field (fringe electric field) changes the alignment state of the liquid crystal layer 20.

In the present embodiment, a configuration is described in which the pixel electrodes PE are disposed above the common electrode CE. In a relatively large liquid crystal display device, i.e., a liquid crystal display device with a relatively large area of the pixels P, the pixel electrodes PE are preferably disposed above the common electrode CE. This configuration (also referred to as a V2 structure) requires no formation of slits in the common electrode CE to be the lower layer electrode, so that an increase in resistivity (surface resistivity) of the common electrode CE is more reduced than in a configuration in which the common electrode CE is disposed above the pixel electrodes PE (also referred to as a V3 structure), whereby the weakening of the fringe electric field generated in the liquid crystal layer 20 is reduced. In this configuration (V2 structure), when the pixel electrodes PE are slit electrodes, although the resistivity of the pixel electrodes PE increases, externally input voltage is applied to the pixel electrodes PE, so that the influence of the increase in resistivity (i.e., weakening of the fringe electric field) is more easily reduced. In order to reduce an increase in resistivity of the common electrode CE, a low-resistance line formed from a metal material can possibly be used (for example, low-resistance line is connected to the common electrode). Such a configuration, however, may have adverse effects (e.g., glare, rainbow diffraction, interference pattern) in display due to specular reflection and the like by the low-resistance line. This requires light blocking using the black matrix or other components, leading to an insufficient increase in reflective aperture ratio.

In addition, in a configuration in which the pixel electrodes PE are disposed above the common electrode CE, the common electrode CE is absent in the region where the second contact hole CH2 is formed. This makes the region not contribute to reflective display, and thus may decrease the reflectance than a configuration in which the common electrode CE is disposed above the pixel electrodes PE. A certain amount of area of regions not contributing to reflective display, such as the contact holes, is required regardless of the size of the area of the pixels P. This means that the smaller the area of a pixel P (i.e., the higher the resolution), the higher the proportion of the region not contributing to reflective display in the pixel P, and the larger the decrease in reflectance. Conversely, in a relatively large liquid crystal display device, the proportion of a region not contributing to reflective display in each pixel P can be more easily reduced, so that the decrease in reflectance can be easily reduced. For these reasons, in a relatively large liquid crystal display device, a configuration in which the pixel electrodes PE are disposed above the common electrode CE is advantageous.

Meanwhile, the smaller the area of a pixel P (i.e., the higher the resolution), the larger the decrease in reflectance caused by the region with the second contact hole CH2 formed therein not contributing to reflective display as described above. Thus, in a comparatively high-resolution liquid crystal display device, i.e., in a liquid crystal display device in which the area of each pixel P is comparatively small, the common electrode CE is preferably disposed above the pixel electrodes PE (see Modified Example 1 of Embodiment 1 described below).

<Liquid Crystal Layer>

The liquid crystal layer 20 is positioned between the first substrate 10 and the second substrate 30 and contains a liquid crystal material. In the present embodiment, the liquid crystal layer 20 contains positive liquid crystal molecules. In other words, the liquid crystal material constituting the liquid crystal layer 20 is a liquid crystal material having a positive anisotropy of dielectric constant (which means a nematic liquid crystal material whose anisotropy of dielectric constant $\Delta\varepsilon$ is positive). A negative liquid crystal material means a liquid crystal material having a negative anisotropy of dielectric constant, i.e., a nematic liquid crystal material whose anisotropy of dielectric constant $\Delta\varepsilon$ is negative. The anisotropy of dielectric constant $\Delta\varepsilon$ is a difference between the dielectric constant $\varepsilon_{//}$ in the long axis direction of the liquid crystal molecules 21 and the dielectric constant $\varepsilon_{\perp}$ in the short axis direction (i.e., $\varepsilon_{//}$-$\varepsilon_{195}$).

From the viewpoints of manufacturing (e.g., yield), the thickness d (also referred to as cell gap or cell thickness) of the liquid crystal layer 20 is preferably 2 μm or greater, and the birefringence $\Delta n$ of the liquid crystal material (i.e., positive liquid crystal material) is preferably 0.123 or less. From the viewpoints of response, the cell thickness d is preferably 3 μm or smaller, and the birefringence $\Delta n$ of the liquid crystal material is preferably 0.082 or less. From the viewpoints of increase in reflectance, the birefringence $\Delta n$ of the liquid crystal material is preferably 0.08 or less, more preferably 0.07 or less. The anisotropy of dielectric constant $\Delta\varepsilon$ of the liquid crystal material is preferably 10 or more in order to keep the maximum voltage in the voltage-reflectance characteristics and the voltage-transmittance characteristics to 6 V or lower.

The liquid crystal layer 20 may also further contain a chiral dopant as needed.

The liquid crystal layer 20 can be formed by, for example, one drop filling.

Suitably, the liquid crystal layer 20 is in a single domain alignment (also referred to as monodomain alignment) from the viewpoints of misalignment reduction.

<Second Substrate>

The second substrate 30 opposes the first substrate 10 with the liquid crystal layer 20 in between and includes the second horizontal alignment film 340 which is in contact with the liquid crystal layer 20. The second substrate 30 preferably further includes a supporting substrate 300 and a color filter layer 310. For example, as shown in FIG. 2, the second substrate 30 includes, in order from the liquid crystal layer 20 side, the second horizontal alignment film 340, the color filter layer 310, and the supporting substrate 300. The second substrate 30 also preferably includes multiple columnar spacers (not shown). Alternatively, the first substrate 10 may include the multiple columnar spacers.

The supporting substrate 300 is preferably transparent and insulating. Examples of the supporting substrate 300 include glass substrates and plastic substrates. On the surface of the supporting substrate 300 opposite to the liquid crystal layer 20 (e.g., in FIG. 2, the phase difference layer 40 side surface of the supporting substrate 300), a high-resistance transparent conductive film may be formed for countermeasures for image sticking due to static electricity in the liquid crystal cell. This high-resistance transparent conductive film may have a multi-layer structure for reduction or prevention of a decrease in transmittance or increase in reflectance.

The color filter layer 310 typically includes a red color filter disposed in a region corresponding to a red pixel and transmits red light, a green color filter disposed in a region corresponding to a green pixel and transmits green light, and a blue color filter disposed in a region corresponding to a blue pixel and transmits blue light. The types of the color filters may be two or less or four or more. When color display is not provided, the color filter layer 310 is omitted.

An overcoat layer (also referred to as a planarization layer) that covers the color filter layer 310 may be disposed as appropriate. Depending on the material used to form the electrodes (e.g., transparent conductive material), the material used to form an interlayer insulating layer or a dielectric layer, and the material used to form an alignment film, white display appears yellowish in some cases. In such a case, the chromaticity during white display may be brought closer to the chromaticity of the illuminant D65, for example, by forming the overcoat layer using a blue resist to perform chromaticity adjustment (i.e., blue shift). The illuminant D65 is the CIE standard illuminant D65.

<Other Configurations>

The liquid crystal display device 1 of the present embodiment provides display in a transverse electric field mode in which the liquid crystal layer 20 is in a twist alignment during no voltage application. This can increase the cell gap and narrow the contrast variation range relative to the cell gap variation. As a result, occurrence of display unevenness can be sufficiently reduced or prevented, which leads to a favorable contrast during reflective display. The twist angle $\theta_1$ of the liquid crystal layer 20 during no voltage application is preferably 58.3° or greater and 89.9° or smaller. The more preferred range is described later.

The twist angle $\theta_1$ of the liquid crystal layer 20 is an angle formed between the alignment azimuth of the liquid crystal molecules 21 defined by the first horizontal alignment film 140 and the alignment azimuth of the liquid crystal molecules 21 defined by the second horizontal alignment film 340. In other words, it is the angle formed between the long axis direction of liquid crystal molecules 21A near the first horizontal alignment film 140 (also referred to as first substrate 10 side liquid crystal molecules 21A during no voltage application) and the long axis direction of the liquid crystal molecules 21B near the second horizontal alignment film 340 (also referred to as second substrate 30 side liquid crystal molecules 21B during voltage application).

The liquid crystal display device 1 is preferably in the normally black mode in terms of a further increase in the contrast ratio. The normally black mode is a display mode that provides black display with no voltage applied and provides white display with voltage applied.

The liquid crystal display panel 1 has a structure including, as well as the components described above, components including external circuits such as a tape-carrier package (TCP) and a printed circuit board (PCB); optical films such as a viewing angle-increasing film and a luminance-increasing film; and a bezel (frame). Some components may be incorporated into another component. These components are not limited and can be those commonly used in the field of liquid crystal display devices. Thus, description of these components is omitted.

APPLICATION EXAMPLES

The liquid crystal display device 1 of the present embodiment is suitable for various applications. In particular, the liquid crystal display device 1 is preferably applicable to touch panels. The liquid crystal display device 1 is useful because, either when applied to an external touch panel or when applied to a built-in touch panel, it is less expensive than conventional touch panels and can increase the contrast ratio. In particular, it is suitable for built-in touch panels and particularly preferably applicable to in-cell touch panels. As described above, the liquid crystal display device 1 of the present embodiment can suitably achieve an in-cell touch panel capable of providing display in the reflective mode.

An in-cell touch panel capable of providing display in the reflective mode, for example, eliminates the need for a frame wiring region which is required in an external touch panel, thus narrowing down the frame. Also, such an in-cell touch panel can be equipped with the touch panel function without cover glass, and thus can contribute to reduction in thickness and weight. The touch function and the display function are time-divisionally driven, so that the touch panel is not affected by the liquid crystal display (LCD) noise which can be the largest source of noise in touch panels. In other words, no killer pattern occurs, which facilitates tuning (adjustment) of the touch signals. In addition, loss of reflected light is sufficiently small, and pen-writing can be more comfortably performed and achieve display without any discomfort. Furthermore, the total cost can be reduced from the user's perspective as compared with external touch panels. Input using a finger and pen input in the electromagnetic resonance (EMR) system can be combined, which can achieve high-resolution pen-writing.

An example is further described in which the liquid crystal display device 1 is used for an in-cell touch panel.

Figure 7:
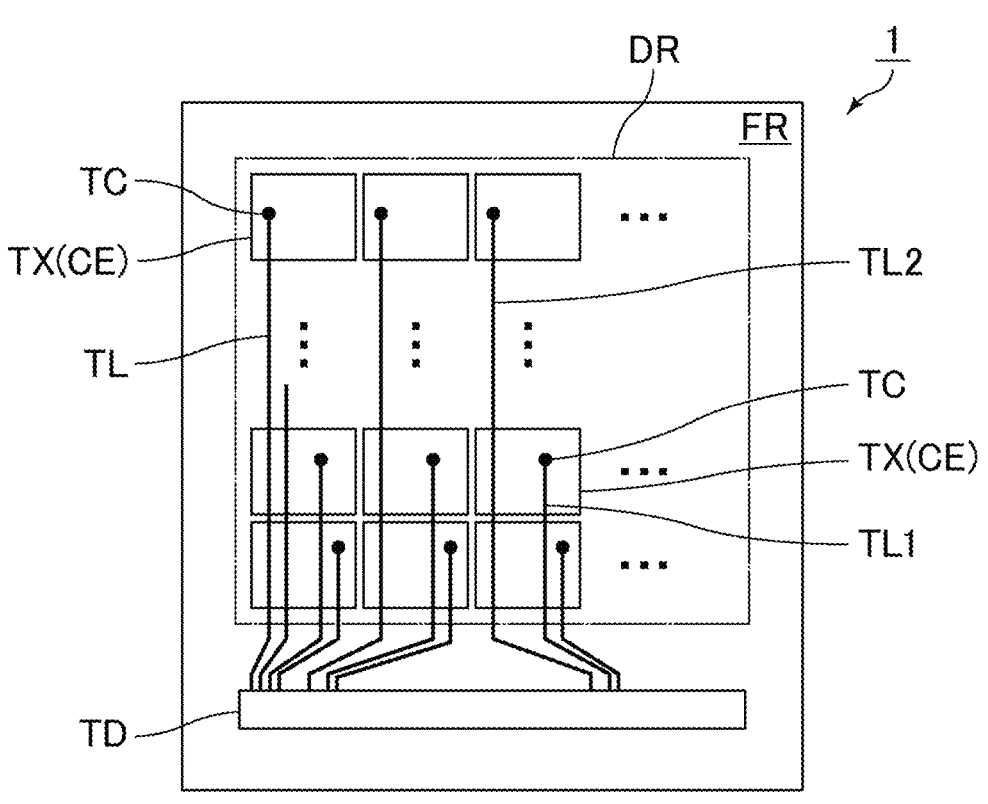
FIG. 7 is a schematic plan view of an example of the arrangement relationship between touch sensor electrodes TX and touch lines TL in the liquid crystal display device 1.

FIG. 7 is a schematic plan view of an example of the arrangement relationship between touch sensor electrodes TX and touch lines TL in the liquid crystal display device 1. As shown in FIG. 7, the liquid crystal display device 1 includes a display region DR and a non-display region FR. The display region DR is defined by the multiple pixels P (e.g., see FIG. 3) arranged in a matrix pattern. The non-display region FR surrounds the display region DR and is also referred to as a surrounding region or frame region.

In the display region DR, the common electrode CE is divided into multiple segments TX. The segments (common electrode parts) TX function as touch sensor electrodes. In the example shown in FIG. 7, each touch sensor electrode TX is provided correspondingly to two or more pixels P.

The liquid crystal display device 1 (specifically, first substrate 10) includes multiple touch lines TL. Each touch sensor electrode TX is electrically connected to a corresponding touch line TL. A connection portion TC between a touch sensor electrode TX and a touch line TL is also referred to as a touch line contact portion TC.

Each touch line TL is connected to a touch driver TD disposed in the non-display region FR. The touch driver TD is configured, for example, to time-divisionally switch between a display mode of causing the multiple touch sensor electrodes TX to function as the common electrode CE and a touch detection mode of causing the touch sensor electrodes TX to function as the touch sensor electrodes TX. The touch driver TD, for example, supplies a common signal to the touch sensor electrodes TX (common electrode CE) through touch lines TL in the display mode. In the touch detection mode, the touch driver TD supplies touch driving signals to the touch sensor electrodes TX through the touch lines TL.

In FIG. 7, the touch lines TL extend in the column direction (the same direction as the source lines SL). Some touch lines TL extend to their corresponding touch sensor electrodes TX across one or more other touch sensor electrodes TX.

Looking at one of the touch sensor electrodes TX, a first touch line TL1 for supplying a signal to the touch sensor electrode TX extends to the corresponding touch line contact portion TC and, across the above touch sensor electrode TX, a second touch line TL2 for supplying a signal to another touch sensor electrode TX extends. The second touch line TL2 and the touch sensor electrode TX overlap via an insulating layer. Depending on the position of a touch sensor electrode TX, two or more touch lines TL may extend across the touch sensor electrode TX or no touch line TL may extend across the touch sensor electrode TX.

In the non-display region FR, in addition to the touch driver TD, peripheral circuits (not shown) including drive circuits are disposed, such as a gate driver which supplies gate signals to gate bus lines (gate lines) GL and a source driver which supplies source signals to source bus lines (source lines) SL. These drive circuits may be, for example, mounted on the first substrate (TFT substrate) 10 or may be integrally (monolithically) formed in the first substrate 10. In the non-display region FR, semiconductor chips including at least one of or all of the drive circuits may be loaded.

In an in-cell touch panel, the TFTs 110 are particularly preferably formed using an In—Ga—Zn—O-based semiconductor.

Modified Example 1 of Embodiment 1

In Embodiment 1, the case was described in which the first electrode 121, which was the lower layer electrode, served as the common electrode CE and the second electrode 122, which was the upper layer electrode, served as the pixel electrodes PE. Conversely, the second electrode 122 may serve as the common electrode CE and the first electrode 121 may serve as the pixel electrodes PE. In the present example, the second electrode 122 (upper layer electrode) serves as the common electrode CE and the first electrode 121 (lower layer electrode) serves as the pixel electrodes PE (see FIG. 8).

Figure 8:
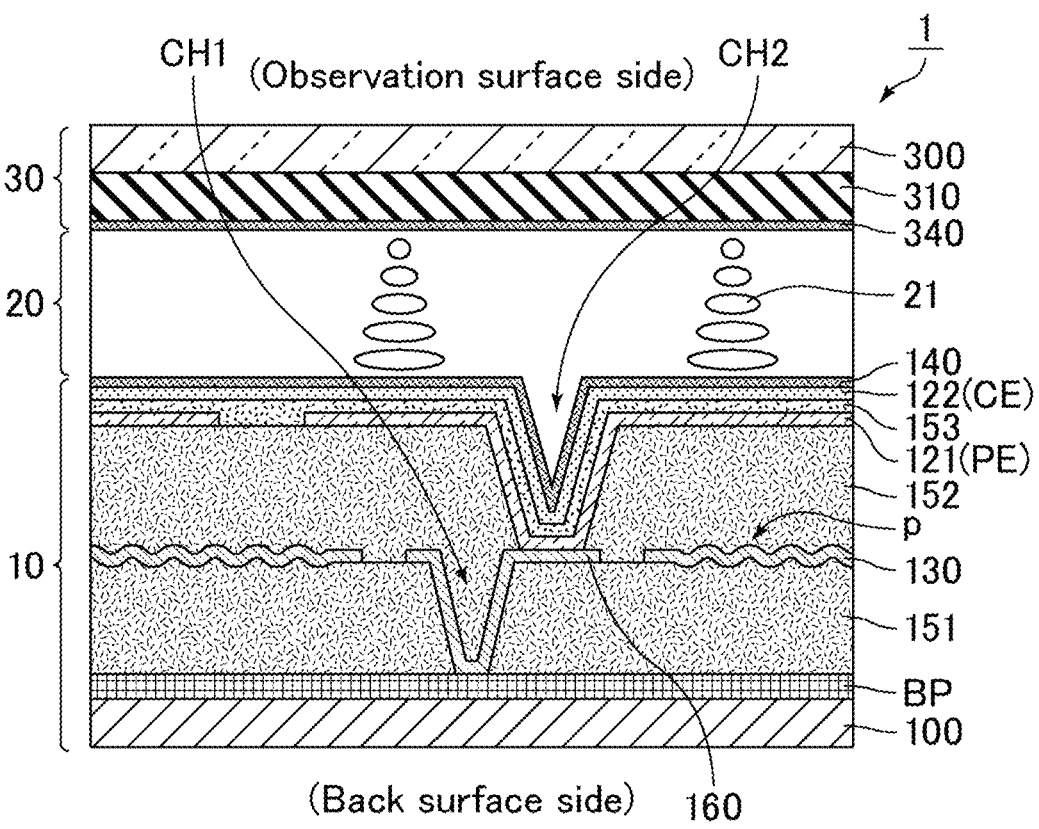
FIG. 8 is a schematic cross-sectional view of the liquid crystal display device 1.

FIG. 8 is a schematic cross-sectional view of the liquid crystal display device 1 of the present example. Also in the present example, for easy generation of a transverse electric field, at least the upper layer electrode (common electrode CE in the present example) is preferably a slit electrode. The lower layer electrode (pixel electrodes PE in the present example) may be a planar electrode, i.e., what is called a solid electrode, or may be a slit electrode. A liquid crystal display device 1 of the present modified example is particularly suitable as a comparatively high-resolution liquid crystal display device, i.e., a liquid crystal display device in which the area of each pixel P is comparatively small, as described above.

Modified Example 2 of Embodiment 1

In Embodiment 1, the FFS mode liquid crystal display device was described. Yet, an IPS mode liquid crystal display device may also be used (here, the liquid crystal layer 20 is in a twist alignment during no voltage application). The present modified example employs an IPS mode liquid crystal display device. In the present modified example, the first electrode 121 and the second electrode 122 are disposed in the same layer, and both the first electrode 121 and the second electrode 122 are preferably slit electrodes.

Embodiment 2

In the present embodiment, features unique to the present embodiment are mainly described, and the same features as those in Embodiment 1 are not described again. The liquid crystal display device of the present embodiment differs from the liquid crystal display device of Embodiment 1 mainly in that each surface of the liquid crystal panel 1X is provided with a phase difference layer and a polarizing plate, and the light source is closer to the back surface side than the liquid crystal layer 20 is.

Figure 9:
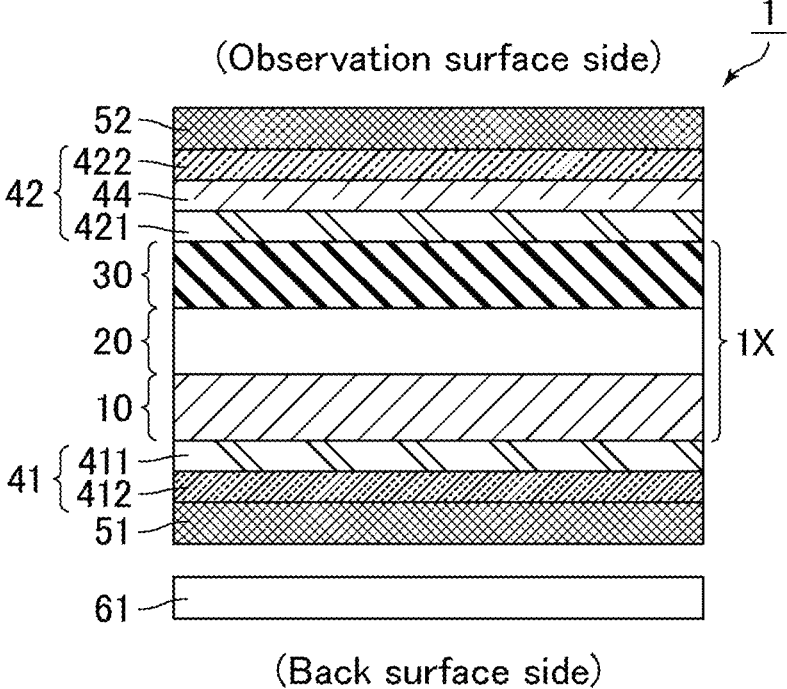
FIG. 9 is a schematic cross-sectional view of the liquid crystal display device 1.
Figure 10:
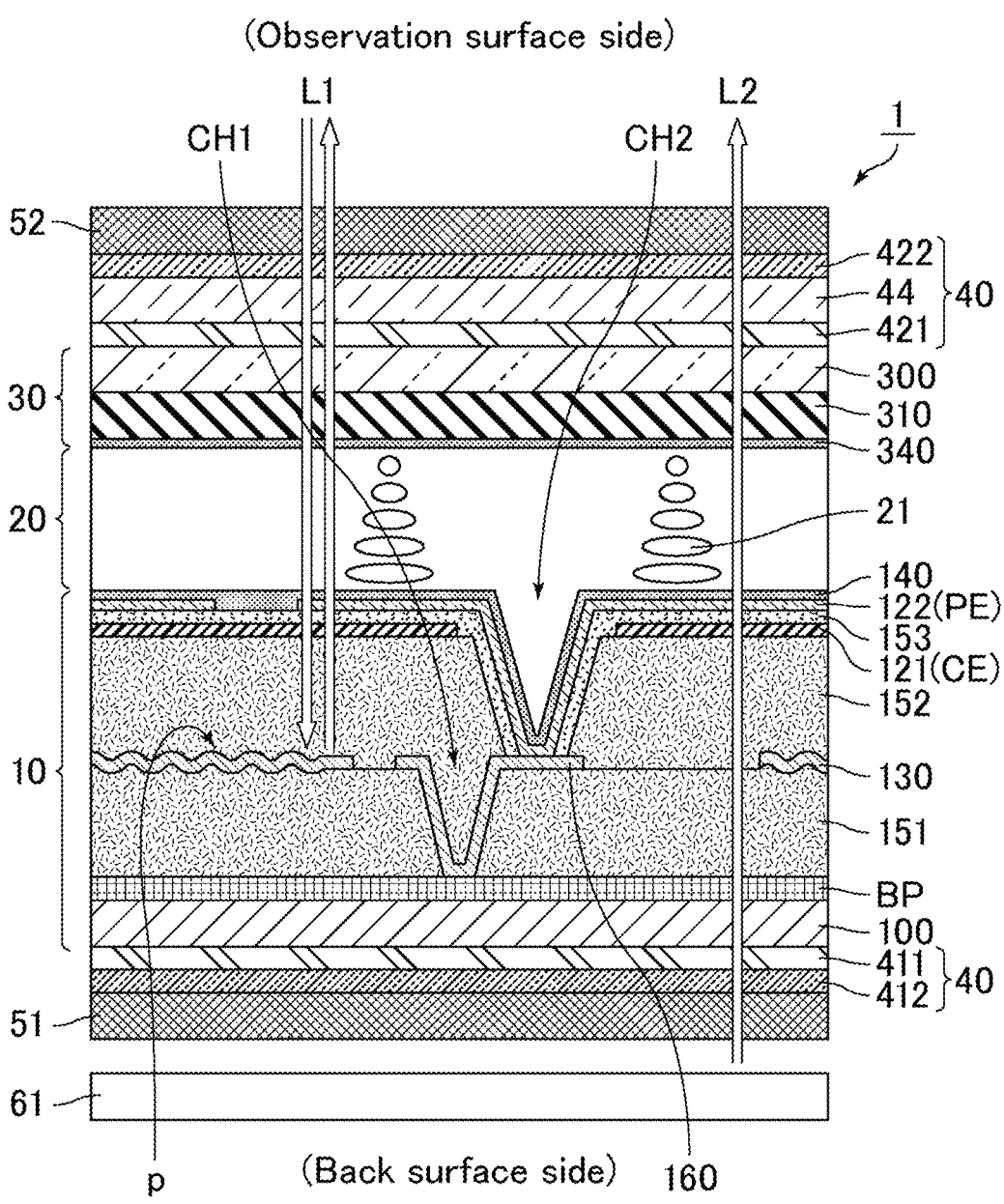
FIG. 10 is a more detailed schematic cross-sectional view of the liquid crystal display device 1.

FIG. 9 is a schematic cross-sectional view of the liquid crystal display device 1 of an example of the present embodiment. FIG. 10 is a more detailed schematic cross-sectional view of the liquid crystal display device 1 of the example of the present embodiment. As shown in FIG. 9, the liquid crystal display device 1 includes, in order from the back surface side toward the observation surface side, a first polarizing plate 51, a first phase difference layer 41, a first substrate 10, a liquid crystal layer 20, a second substrate 30, a second phase difference layer 42, and a second polarizing plate 52. The first phase difference layer 41 includes a first $\lambda/2$ plate 412 and a first $\lambda/4$ plate 411. The second phase difference layer 42 includes a first $\lambda/2$ plate 422 and a first $\lambda/4$ plate 421. At least one of the first phase difference layer 41 or the second phase difference layer further includes a positive C plate 44. FIG. 9 and FIG. 10 show as an example of the present embodiment, an example in which the second phase difference layer further includes the positive C plate 44.

Figure 11:
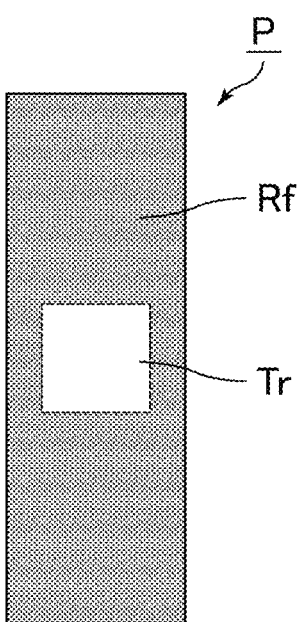
FIG. 11 is a schematic plan view conceptually showing that each pixel P includes a reflective region Rf and a transmissive region Tr.

In the liquid crystal display device 1 of the present embodiment, each pixel P includes a reflective region Rf providing display by reflecting light (i.e., region providing display in the reflective mode) and a transmissive region Tr of providing display by transmitting light (region providing display in the transmissive mode) (see FIG. 11). Such a liquid crystal display device 1 can exhibit favorable viewability in a variety of environments. Thus, the liquid crystal display device 1 of the present embodiment is a transflective liquid crystal display device. FIG. 11 is a schematic plan view conceptually showing that each pixel P includes a reflective region Rf and a transmissive region Tr.

A reflective layer 130 is disposed in the reflective region Rf. For example, light L1 (e.g., external light) from the observation surface side enters the liquid crystal display device 1, is reflected by the reflective layer 130, and is then emitted from the observation surface side (see FIG. 10). In contrast, the reflective layer 130 is not disposed in the transmissive region Tr (see FIG. 11). For example, when a backlight 61 is disposed on the back surface side, light L2 from the backlight 61 is transmitted through a region with no reflective layer 130 (transmissive region Tr) and then emitted from the observation surface side (see FIG. 10).

The proportion (aperture ratio) of the area of the transmissive region Tr in each pixel P can appropriately be set according to the application and other conditions, and is preferably 5% or higher and 95% or lower, for example, with the area of a single pixel P being taken as 100%. The position and shape of the transmissive region Tr in the pixel P can also appropriately be set according to the application and other conditions.

Figure 12:
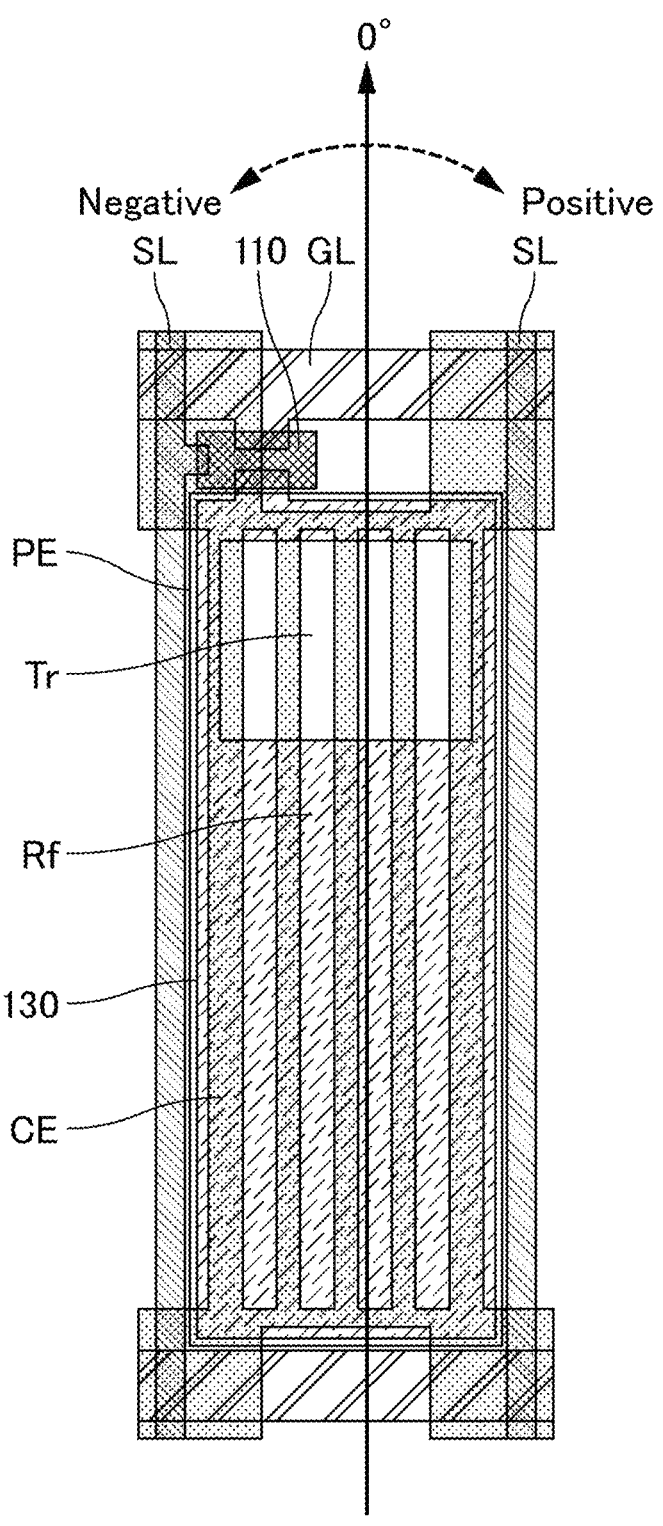
FIG. 12 is a schematic plan view showing a pixel structure example (angle X is 0°).
Figure 13A:
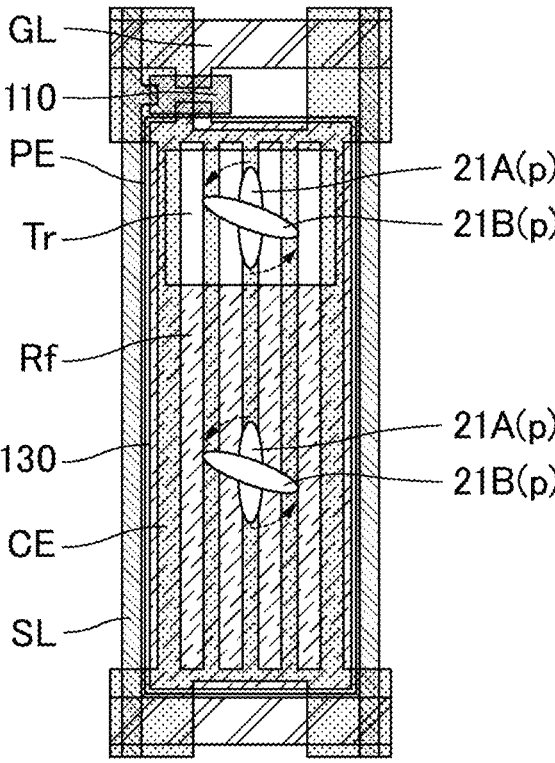
FIG. 13A is a schematic plan view showing a pixel arrangement example (angle X is 0°).
Figure 13B:
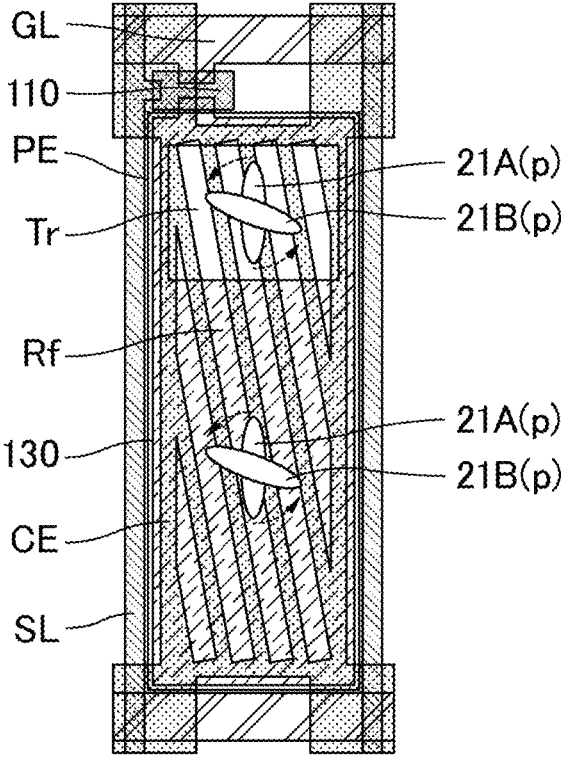
FIG. 13B is a schematic plan view showing a pixel arrangement example (angle X is –10°).
Figure 13C:
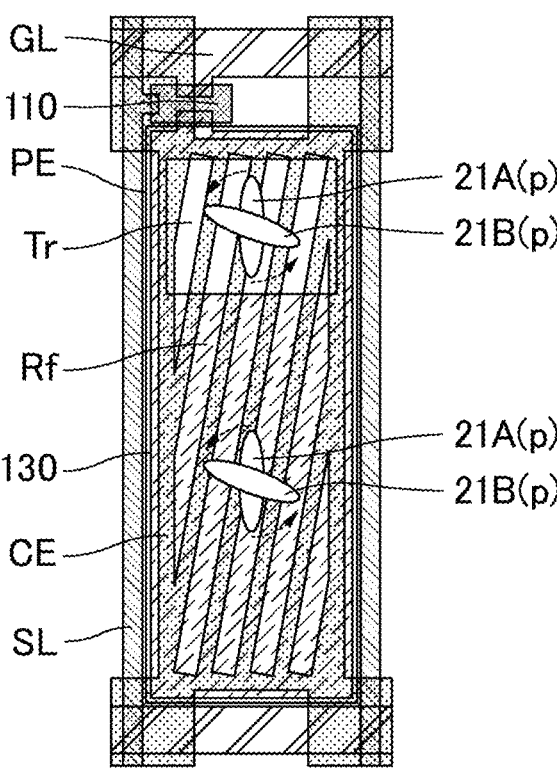
FIG. 13C is a schematic plan view showing a pixel arrangement example (angle X is +10°).
Figure 13D:
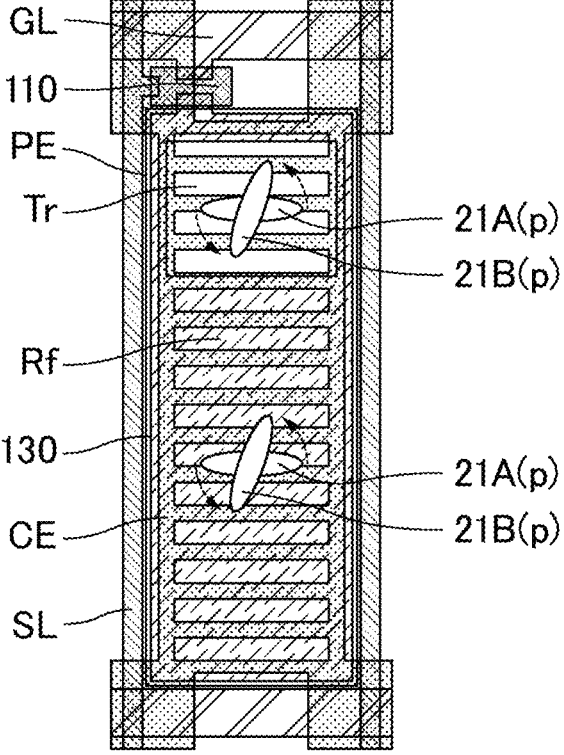
FIG. 13D is a schematic plan view showing a pixel arrangement example (angle X is –90°).
Figure 13E:
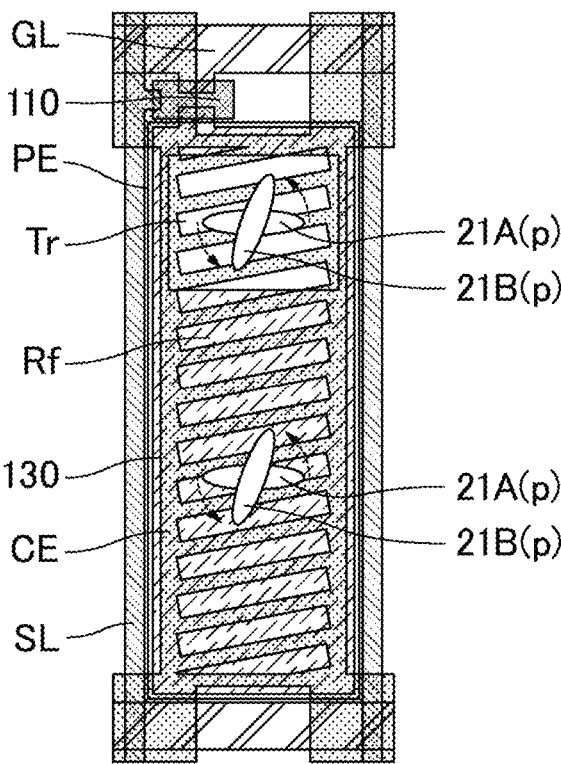
FIG. 13E is a schematic plan view showing a pixel arrangement example (angle X is –100°).
Figure 13F:
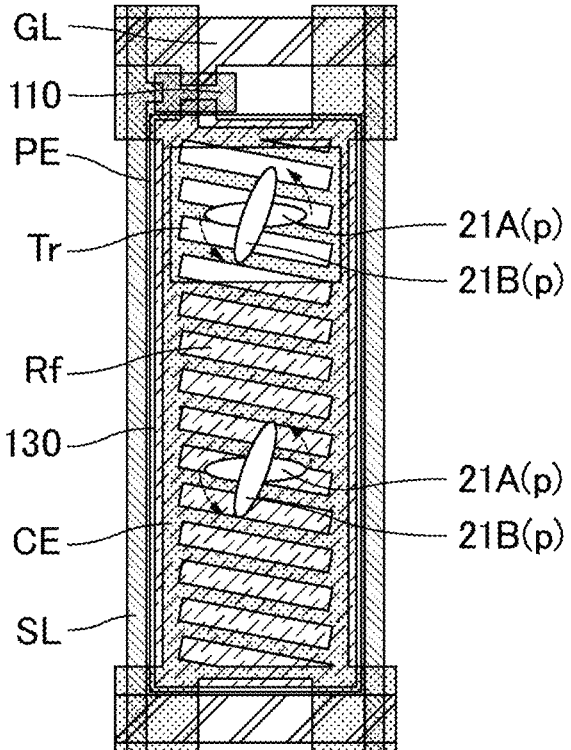
FIG. 13F is a schematic plan view showing a pixel arrangement example (angle X is –80°).

FIG. 12 and FIG. 13A show an example in which the extension directions (angle X) of the multiple strip portions SP are 0° with the extension directions of the source lines SL set as the reference (0°) and the angle of rotation is measured as positive (+) in the case of clockwise rotation and as negative (−) in the case of counterclockwise rotation. Also, examples in which the angles X are −10°, +10°, −90°, −100°, and −80° are shown respectively in FIG. 13B, FIG. 13C, FIG. 13D, FIG. 13E, and FIG. 13F. The mode in which the angle X is 0° (see FIG. 12 and FIG. 13A) corresponds to a mode in which the extension directions of the multiple strip portions SP are parallel to the extension directions of the source lines SL. The mode in which the angle X is −90° (see FIG. 13D) corresponds to a mode in which the extension directions of the multiple strip portions SP are parallel to the extension directions of the gate lines GL. FIG. 12 and FIG. 13A to FIG. 13F are each a schematic plan view schematically showing a specific example of pixels in the present embodiment. FIG. 12 is a schematic plan view showing a pixel structure example. FIG. 13A to FIG. 13F are each a schematic plan view showing a pixel arrangement example. FIG. 13A to FIG. 13F also show the twist alignment of liquid crystal molecules 21.

<Phase Difference Layer>

The first phase difference layer 41 is positioned between the first substrate 10 and the first polarizing plate 51 and includes the $\lambda/4$ plate 411 and the $\lambda/2$ plate 412. The second phase difference layer 42 is positioned between the second substrate 30 and the second polarizing plate 52 and includes the $\lambda/4$ plate 421, the $\lambda/2$ plate 422, and the positive C plate 44. The positional relationship between the $\lambda/4$ plate and the $\lambda/2$ plate in each phase difference layer is preferably in the order of the $\lambda/2$ plate 412 and the $\lambda/4$ plate 411 from the back surface side in the first phase difference layer 41, and preferably in the order of the $\lambda/2$ plate 422 and the $\lambda/4$ plate 421 from the observation surface side in the second phase difference layer 42.

A $\lambda/4$ plate means a phase difference plate that introduces an in-plane phase difference of a quarter of a wavelength to incident light having a wavelength A, and is also referred to as a $\lambda/4$ waveplate or a quarter-wave plate (QWP). Specifically, a $\lambda/4$ plate can convert linearly polarized light to circularly polarized light, or convert circularly polarized light to linearly polarized light. For example, linearly polarized light incident on the $\lambda/4$ plate is emitted as circularly polarized light.

A $\lambda/2$ plate means a phase difference plate that introduces an in-plane phase difference of a half of a wavelength to incident light having a wavelength A, and is also referred to as a $\lambda/2$ waveplate, a half-wavelength plate, or a half-wave plate (HWP). Specifically, a $\lambda/2$ plate can rotate the vibration direction of incident light approximately 90°. For example, circularly polarized light incident on the $\lambda/2$ plate is emitted as circularly polarized light rotating in the opposite direction.

The first $\lambda/4$ plate 411 and the second $\lambda/4$ plate 421 preferably introduce substantially the same in-plane phase difference Re. The expression "substantially the same" means that the difference in in-plane phase difference Re between them is less than 5 nm. The difference in in-plane phase difference Re between them is preferably less than 1 nm.

The first $\lambda/2$ plate 412 and the second $\lambda/2$ plate 422 preferably introduce substantially the same in-plane phase differences Re. The expression "substantially the same" means that the difference in in-plane phase difference Re between them is less than 5 nm. The difference in in-plane phase difference Re between them is preferably less than 1 nm.

The $\lambda/4$ plates 411 and 421 and the $\lambda/2$ plates 412 and 422 can be general-purpose phase difference plates. Specifically, for example, phase difference plates generally available as circularly polarizing plates for anti-reflective films are suitable. In the present invention, preferably, the optical axis settings of each optical film are controlled within the predetermined ranges described later. This allows an increase in contrast ratio and viewing angle even in a transverse electric field mode transflective liquid crystal display device when general-purpose phase difference plates, not any special phase difference plates, are used as the $\lambda/4$ plate and the $\lambda/2$ plate. Also, the liquid crystal display device 1 can be useful as an in-cell touch panel, thus achieving cost reduction. In particular, from the user's perspective, the liquid crystal display device 1 is very useful because the total cost can be reduced. The liquid crystal display device of the present invention can achieve cost reduction not only when it is used as a built-in touch panel such as an in-cell touch panel but also when it is used as an external touch panel.

Specifically, the $\lambda/4$ plates 411 and 421 and the $\lambda/2$ plates 412 and 422 are each preferably a uniaxial A plate.

As described above, in the present embodiment, the phase difference layers 41 and 42 each include a $\lambda/4$ plate and a $\lambda/2$ plate, and at least one of the phase difference layer 41 or the phase difference layer 42 further includes a positive C plate. In this case, the resulting liquid crystal display device exhibits excellent viewing angle characteristics and can achieves a high contrast. In particular, an increase in luminance (also referred to as a decrease in black level) during black display is sufficiently reduced, which widens the viewing angle during black display. In order to improve the effect, the positive C plate is preferably positioned between the $\lambda/4$ plate and the $\lambda/2$ plate. In particular, when the phase difference layer includes one positive C plate, this arrangement is preferred. In the present embodiment, only the second phase difference layer 42 includes one positive C plate 44. In this case, in order from the liquid crystal layer 20 (and the second substrate 30) side, the $\lambda/4$ plate 421, the positive C plate 44, and the $\lambda/2$ plate 422 are preferably disposed (see FIG. 10).

The positive C plate 44 (and the later-described positive C plates 43 and 45, for example) may be a single film or may be a laminate of two or more phase difference films.

Herein, a portion (structure) that is sandwiched between layers other than a positive C plate and functions as a positive C plate is counted as "one positive C plate". In such a case, the positive C plate may or may not be a laminate. Thus, for example, a phase difference layer including a $\lambda/4$ plate, a positive C plate having a multi-layer structure, and a $\lambda/2$ plate in the stated order is referred to as a "phase difference layer including one positive C plate". A phase difference layer including a $\lambda/4$ plate, two commercially available positive C plates, and a $\lambda/2$ plate in the stated order is also referred to as a "phase difference layer including one positive C plate". A phase difference layer including a $\lambda/4$ plate, a first positive C plate (which may or may not be a laminate), a $\lambda/2$ plate, and a second positive C plate (which may or may not be a laminate) in the stated order is referred to as a "phase difference layer including two positive C plates".

The positive C plate 44 (and the later-described positive C plates 43 and 45) is preferably, for example, a film obtained by biaxially stretching a film containing as a component a material whose intrinsic birefringence is negative in the vertical and horizontal directions, or a film to which a liquid crystalline material such as a nematic liquid crystal is applied. Examples of the material whose intrinsic birefringence is negative include resin compositions including acrylic resin and styrene-based resin, polystyrene, polyvinyl naphthalene, polyvinyl biphenyl, polyvinyl pyridine, polymethyl methacrylate, polymethyl acrylate, N-substituted maleimide copolymers, polycarbonates having a fluorene skeleton, and triacetyl cellulose (in particular, those having a low degree of acetylation).

Specific examples of the positive C plate 44 (and positive C plates 43 and 45, for example) include positive C plates available from ENEOS Corporation or Hayashi Telempu Corporation, and positive-C phase difference films available from Nippon Kayaku Co., Ltd.

In order to further improve the effect of increasing the viewing angle, the positive C plate 44 (and 43) preferably introduces a thickness direction phase difference Rth of from 150 to 270 nm. The Rth is more preferably from 160 to 250 nm, still more preferably from 170 to 240 nm.

The thickness of the positive C plate 44 (and 43) is preferably, for example, from 0.1 to 100 μm. The positive C plate having a thickness within this range can achieve a higher mechanical strength and better display uniformity. The thickness is more preferably from 0.1 to 80 μm, still more preferably from 0.1 to 50 μm. In the case where the positive C plate 44 (and 43) has a laminate structure, the total thickness of the laminate structure is preferably set within the range above. The thicknesses of the phase difference films may be identical to or different from one another.

The phase difference layer including a positive C plate (which corresponds to the second phase difference layer 42 in the present embodiment) may include an additional positive C plate (referred to as a second positive C plate) different from the above positive C plate. In this case, the second positive C plate is preferably positioned between a λ/2 plate and a polarizing plate. In the later-described Embodiment 3, a mode is described in detail in which the first phase difference layer 41 and the second phase difference layer 42 each include a first positive C plate and the first phase difference layer 41 further includes a second positive C plate.

The liquid crystal display device 1 of the present embodiment particularly preferably satisfies the following item (i) or (ii) in order to further improve the viewing angle characteristics and the contrast.

(i) The second phase difference layer 42 includes one positive C plate and the first phase difference layer 41 does not include a positive C plate.

(ii) The second phase difference layer 42 includes one positive C plate and the first phase difference layer 41 includes two positive C plates.

The present embodiment is described with a particular focus on the liquid crystal display device 1 satisfying the item (i) (e.g., see FIG. 9 and FIG. 10). The later-described Embodiment 3 is described with a particular focus on the liquid crystal display device 1 satisfying the item (ii).

<Polarizing Plate>

The first polarizing plate 51 is positioned closer to the back surface side than the first phase difference layer 41 is. The second polarizing plate 52 is positioned closer to the observation surface side than the second phase difference layer 42 is. The polarizing plates 51 and 52 may be circularly polarizing plates or linearly polarizing plates. Here, a linearly polarizing plate means a polarizing plate having a function of filtering unpolarized light (natural light), partially polarized light, or polarized light into polarized light (linearly polarized light) vibrating only in a specific direction and is distinguished from a circularly polarizing plate. In particular, the polarizing plates 51 and 52 are preferably linearly polarizing plates.

The polarizing plates 51 and 52 may also be absorptive polarizing plates or reflective polarizing plates. An absorptive polarizing plate has a function of absorbing light vibrating in a certain direction while transmitting polarized light (linearly polarized light) vibrating in a direction perpendicular to the certain direction. A reflective polarizing plate has a function of reflecting light vibrating in a certain direction while transmitting polarized light (linearly polarized light) vibrating in a direction perpendicular to the certain direction. In particular, absorptive polarizing plates are preferred, with absorptive linearly polarizing plates being particularly suitable.

Examples of the absorptive polarizing plates include polyvinyl alcohol films obtained by dying a polyvinyl alcohol film with an anisotropic material such as an iodine complex (or a dye) or adsorbing the anisotropic material on a polyvinyl alcohol film and stretching the material for alignment. Typically, for sufficient mechanical strength and moist heat resistance, each surface of a polyvinyl alcohol film is laminated with a protective film such as a triacetyl cellulose film for practical use. Examples of the reflective polarizing plates include a film including a laminate of multiple dielectric thin films, a film including a laminate of multiple thin films having different refractive indices, a nanowire grid polarizing plate, and a polarizing plate using selective reflection by cholesteric liquid crystal.

<Light Source>

The liquid crystal display device 1 preferably further includes a light source. In the present embodiment, the liquid crystal display device 1 further includes a light source 61 (also referred to as a backlight) closer to the back surface side than the liquid crystal layer 20 is (see FIG. 9). The light source 61 may be any light source that emits light, and may be of a direct-lit type, an edge-lit type, or any other type. The light source 61 preferably includes, for example, a light source such as a light emitting diode (LED), a light guide plate, and a reflective sheet, and may further include a diffusion sheet or a prism sheet.

<Preferred Settings>

Hereinafter, preferred optical axis settings of each optical film (i.e., polarizing plate and phase difference layer) are further described. The polarizing plate is an absorptive polarizing plate. The liquid crystal layer 20 is assumed to be a liquid crystal layer that has a monodomain structure and provides normally black display. The liquid crystal material constituting the liquid crystal layer 20 is a positive liquid crystal material. Since the slow axis angle of the positive C plate is in the film normal direction (i.e., 90° in the case where the alignment azimuth of liquid crystal molecules 21A defined by the first horizontal alignment film 140 is set to 0°), the study was performed in a mode with no positive C plate. The preferred settings are the same for the case of including a positive C plate.

Figure 14:
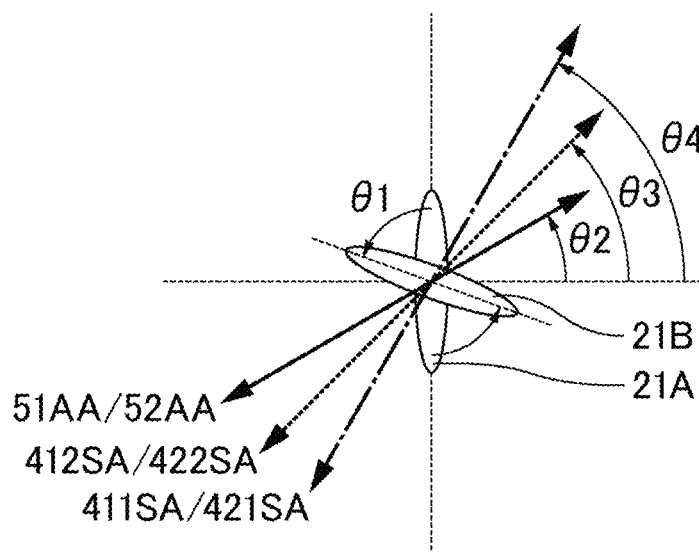
FIG. 14 is a plan view conceptually showing the relationship between the long axis direction of liquid crystal molecules 21 in a liquid crystal layer 20 during no voltage application and the optical axis of each optical film.

FIG. 14 is a plan view conceptually showing, in a liquid crystal display device 1 (see FIG. 9) including, in order from the back surface side toward the observation surface side, the first polarizing plate 51, the first phase difference layer 41, the first substrate 10, the liquid crystal layer 20, the second substrate 30, the second phase difference layer 42, and the second polarizing plate 52, the relationship between the long axis direction of liquid crystal molecules 21A in the liquid crystal layer 20 during no voltage application and the optical axes of optical films (i.e., the in-plane slow axes of the λ/4 plate and the λ/2 plate and the polarization axes of the polarizing plates). FIG. 14 shows, as the liquid crystal molecules 21, a liquid crystal molecule 21A near the first horizontal alignment film 140 and a liquid crystal molecule 21B near the second horizontal alignment film 340.

Figure 15:
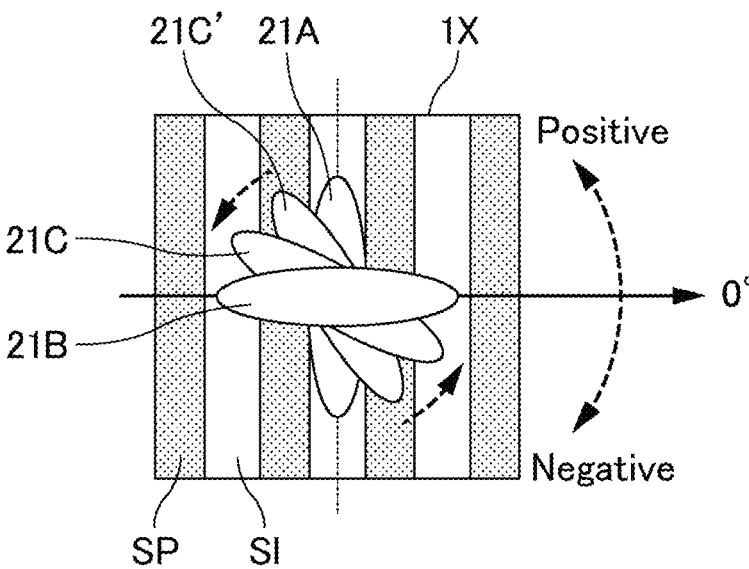
FIG. 15 illustrates the optical axis angle of an optical film.

Herein, the angles (e.g., twist angle, optical axis angle) are, unless otherwise specified, angles measured on the liquid crystal panel 1X taken as a clock face where the reference azimuth, i.e., a direction orthogonal to the extension directions of the multiple strip portions SP, is set as the 0° direction (3 o'clock direction) and the twist direction is positive (counterclockwise rotation) (see FIG. 15). FIG. 15 illustrates the optical axis angle of an optical film. A twist direction means, when the liquid crystal display device 1 is viewed from the observation surface side, the direction twisted from the alignment azimuth of the liquid crystal molecule 21A defined by the first horizontal alignment film 140 toward the alignment azimuth of the liquid crystal molecule 21B defined by the second horizontal alignment film 340. The liquid crystal molecule 21C is positioned between the liquid crystal molecule 21A and the liquid crystal molecule 21B.

The twist angle $\theta_1$ in the liquid crystal layer 20 during no voltage application is preferably 58.3° or greater and 89.9° or smaller. This increases the contrast ratio. For a further increase in contrast ratio, the twist angle $\theta_1$ is more preferably 70° or greater and 85° or smaller.

The angle ($\theta_2$ in FIG. 14) of the polarization axis 51AA of the first polarizing plate 51 is preferably from 83.4° to 91.4°. The angle is more preferably from 84.0° to 90.9°, still more preferably from 84.7° to 90.2°, particularly preferably from 85.5° to 89.3°.

The angle ($\theta_3$ in FIG. 14) of the in-plane slow axis 412SA of the first $\lambda/2$ plate 412 is preferably from −19.1° to −15.1°. The angle is more preferably from −18.8° to −15.4°, still more preferably from −18.5° to −15.7°, particularly preferably from −18.0° to 16.2°.

The angle ($\theta_4$ in FIG. 14) of the in-plane slow axis 411SA of the first $\lambda/4$ plate 411 is preferably from −80.0° to −72.2°. The angle is more preferably from −79.4° to −72.8°, still more preferably from −78.8° to −73.4°, particularly preferably from −77.9° to −74.3°.

Thus, the polarization axis 51AA of the first polarizing plate 51, the in-plane slow axis 412SA of the first $\lambda/2$ plate 412, and the in-plane slow axis 411SA of the first $\lambda/4$ plate 411 are preferably respectively at angles of from 83.4° to 91.4°, from −19.1° to −15.1°, and from −80.0° to −72.2°, more preferably respectively at angles of from 84.00 to 90.9°, from −18.8° to −15.4°, and from −79.4° to −72.8°, still more preferably respectively at angles of from 84.7° to 90.2°, from −18.5° to −15.7°, and from −78.8° to −73.4°, particularly preferably respectively at angles of from 85.5° to 89.3°, from −18.0° to 16.2°, and from −77.9° to −74.3°.

The angle ($\theta_4$ in FIG. 14) of the in-plane slow axis 421SA of the second $\lambda/4$ plate 421 is preferably from 62.1° to 67.1°. The angle is more preferably from 63.0° to 67.0°, still more preferably from 64.0° to 67.0°, particularly preferably from 64.5° to 66.0°.

The angle ($\theta_3$ in FIG. 14) of the in-plane slow axis 422SA of the second $\lambda/2$ plate 422 is preferably from 37.5° to 42.5°. The angle is more preferably from 38.0° to 42.0°, still more preferably from 39.0° to 41.0°, particularly preferably from 40.0° to 41.0°.

The angle ($\theta_2$ in FIG. 14) of the polarization axis 52AA of the second polarizing plate 52 is preferably from 19.5° to 26.5°. The angle is more preferably from 19.5° to 26.0°, still more preferably from 19.5° to 25.5°, particularly preferably from 20.0° to 23.7°.

Thus, the polarization axis 52AA of the second polarizing plate 52, the in-plane slow axis 422SA of the second $\lambda/2$ plate 422, and the in-plane slow axis 421SA of the second $\lambda/4$ plate 421 are preferably respectively at angles of from 19.5° to 26.5°, from 37.5° to 42.5°, and from 62.1° to 67.1°, more preferably respectively at angles of from 19.5° to 26.0°, from 38.0° to 42.0°, and from 63.0° to 67.0°, still more preferably respectively at angles of from 19.5° to 25.5°, from 39.0° to 41.0°, and from 64.0° to 67.0°, particularly preferably respectively at angles of from 20.0° to 23.7°, from 40.0° to 41.0°, and from 64.5° to 66.0°.

Figure 19:
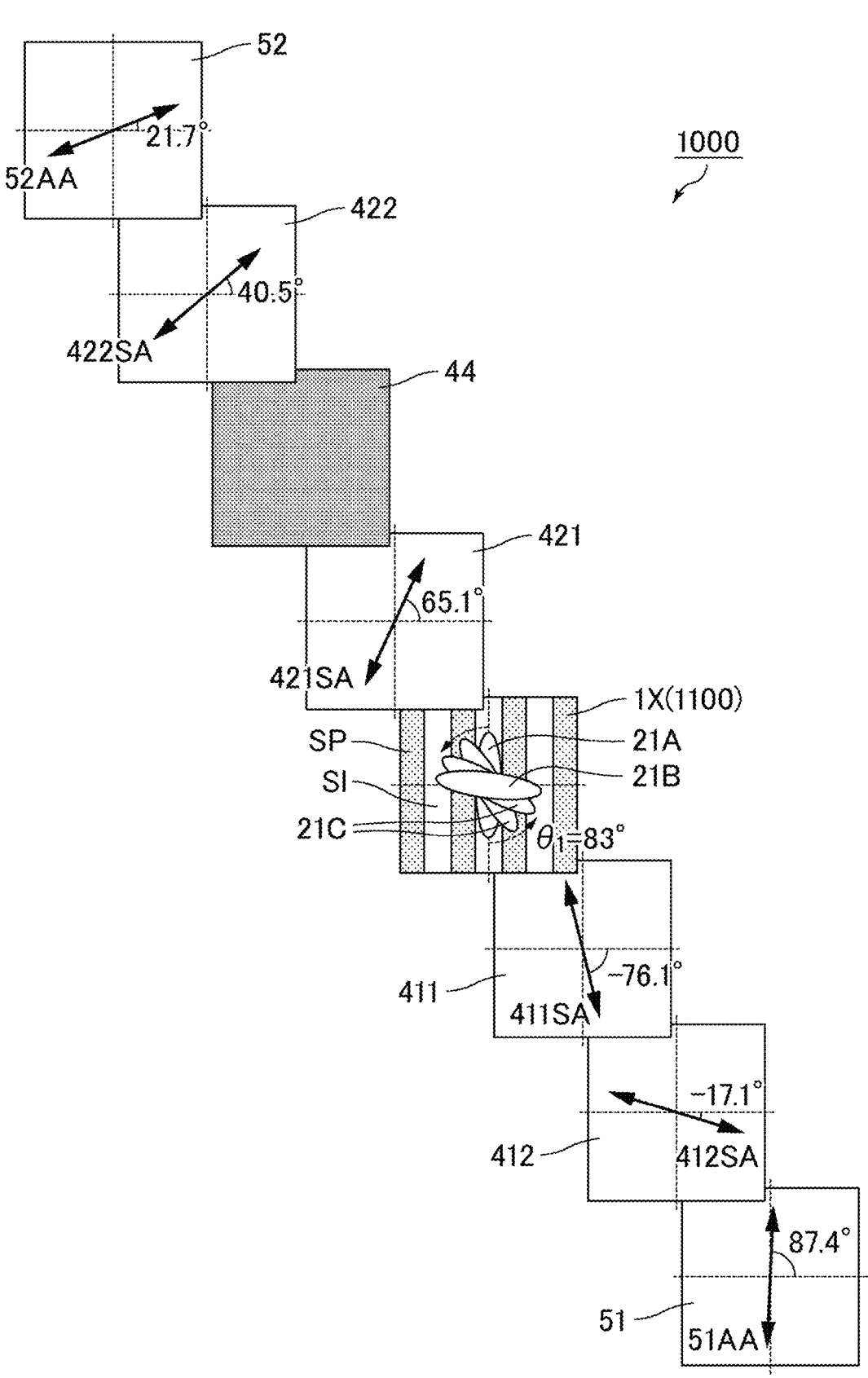
FIG. 19 conceptually shows the most preferred optical axis settings.

FIG. 19 shows the most preferred optical axis settings in terms of an increase in contrast ratio. FIG. 19 conceptually shows the most preferred optical axis settings. In FIG. 19, the $\lambda/4$ plates 411 and 421 introduce an in-plane phase difference Re of 140 nm, and the $\lambda/2$ plates 412 and 422 introduce an in-plane phase difference Re of 270 nm.

In the case of a change in slit angle, the polarization axis directions of the polarizing plates, the slow axis directions of the $\lambda/4$ plates, and the slow axis directions of the $\lambda/2$ plates are preferably changed in the same direction by the same angle.

Modified Example 1 of Embodiment 2

In Embodiment 2, the configuration was described in which the first electrode 121, which was the lower layer electrode, served as the common electrode CE, and the second electrode 122, which was the upper layer electrode, served as the pixel electrodes PE. Conversely, the second electrode 122 may serve as the common electrode CE and the first electrode 121 may serve as the pixel electrodes PE. In the present example, the second electrode 122 (upper layer electrode) serves as the common electrode CE, and the first electrode 121 (lower layer electrode) serves as the pixel electrodes PE (see FIG. 16).

Figure 16:
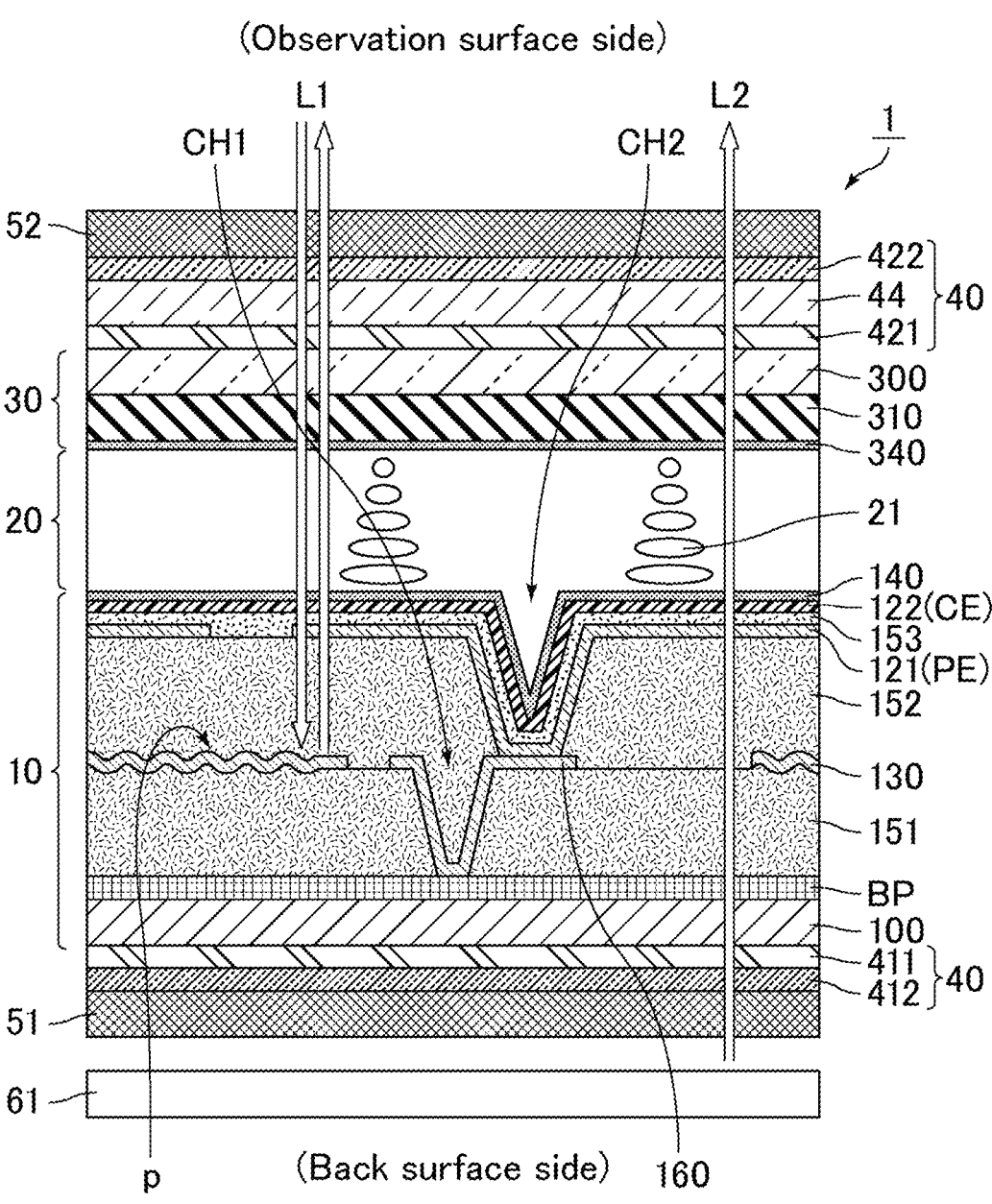
FIG. 16 is a schematic cross-sectional view of a liquid crystal display device 1.

FIG. 16 is a schematic cross-sectional view of a liquid crystal display device 1 of the present example. Also in the present example, for easy generation of a transverse electric field, at least the upper layer electrode (common electrode CE in the present example) is preferably a slit electrode. The lower layer electrode (pixel electrodes PE in the present example) may be a planar electrode, i.e., what is called a solid electrode, or may be a slit electrode. A liquid crystal display device 1 of the present modified example is particularly suitable as a comparatively high-resolution liquid crystal display device, i.e., a liquid crystal display device in which the area of each pixel P is comparatively small, as described above.

Embodiment 3

In the present embodiment, features unique to the present embodiment are mainly described, and the same features as those in Embodiments 1 and 2 are not described again. Embodiment 2 was described with a particular focus on the liquid crystal display device 1 in which only the second phase difference layer 42 included one positive C plate. The present embodiment is described with a particular focus on a liquid crystal display device 1 in which a first phase difference layer 41 includes two positive C plates and a second phase difference layer 42 includes one positive C plate (i.e., liquid crystal display device 1 satisfying the item (ii)). The liquid crystal display device 1 of the present embodiment is substantially the same as the liquid crystal display device 1 of Embodiment 2, except that the first phase difference layer 41 includes two positive C plates.

Figure 17:
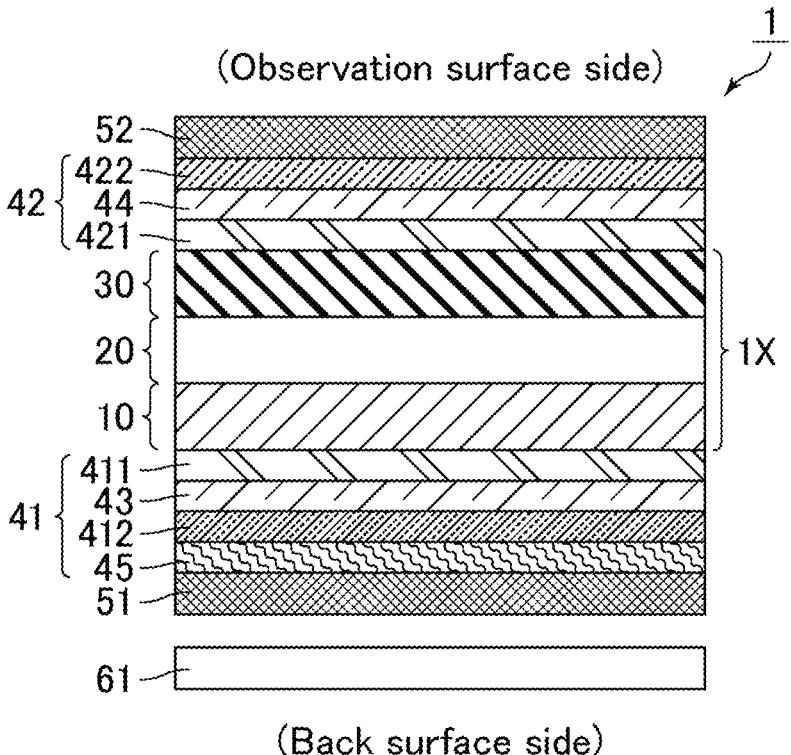
FIG. 17 is a schematic cross-sectional view of a liquid crystal display device 1.

FIG. 17 is a schematic cross-sectional view of a liquid crystal display device 1 of an example of the present embodiment. As shown in FIG. 17, the liquid crystal display device 1 includes, in order from the back surface side toward the observation surface side, a first polarizing plate 51, a first phase difference layer 41, a first substrate 10, a liquid crystal layer 20, a second substrate 30, a second phase difference layer 42, and a second polarizing plate 52. The first phase difference layer 41 includes a $\lambda/4$ plate 411, a $\lambda/2$ plate 412, a first positive C plate 43, and a second positive C plate 45.

The second phase difference layer 42 includes a λ/4 plate 421, a λ/2 plate 422, and a first positive C plate 44.

In order to further improve the viewing angle characteristics and the contrast, the first positive C plates 43 and 44 are each preferably positioned between a λ/4 plate and a λ/2 plate as described above, and the second positive C plate 45 is preferably positioned between a λ/2 plate and a polarizing plate. In the present embodiment, the first phase difference layer 41 preferably includes, in order from the back surface side, the second positive C plate 45, the λ/2 plate 412, the first positive C plate 43, and the λ/4 plate 411, and the second phase difference layer 42 preferably includes, in order from the back surface side, the λ/4 plate 421, the first positive C plate 44, and the λ/2 plate 422 (see FIG. 17).

The second positive C plate 45, as long as being a phase difference plate satisfying the relationship "nz>nx≈ny", may be the same as the first positive C plates 43 and 44 (e.g., having the same physical properties, the same thickness) or may be different from the first positive C plates 43 and 44. Yet, for an even better effect of increasing the viewing angle, the second positive C plate 45 preferably introduces a thickness direction phase difference Rth (absolute value) of from 50 to 130 nm. The Rth is more preferably from 70 to 120 nm, still more preferably from 80 to 115 nm.

The thickness of the second positive C plate 45 is, for example, preferably from 0.1 to 100 μm. With a thickness within this range, the second positive C plate 45 can exhibit higher mechanical strength and better display uniformity. The thickness is more preferably from 0.1 to 80 μm, still more preferably from 0.1 to 50 μm. In the case where the positive C plate 45 has a laminate structure, the total thickness of the laminate structure is preferably set within the above range. The thicknesses of the phase difference films may be identical to or different from one another.

Modified Example 1 of Embodiment 3

In Embodiment 3, the configuration was described in which the first electrode 121, which was the lower layer electrode, served as the common electrode CE and the second electrode 122, which was the upper layer electrode, served as the pixel electrodes PE. Conversely, the second electrode 122 may serve as the common electrode CE and the first electrode 121 may serve as the pixel electrodes PE.

Embodiment 4

In the present embodiment, features unique to the present embodiment are mainly described, and the same features as those in Embodiment 1 are not described again. A liquid crystal display device of the present embodiment differs from the liquid crystal display device of Embodiment 1 mainly in that it includes a light source closer to the observation surface side than the liquid crystal layer 20 is.

Figure 18:
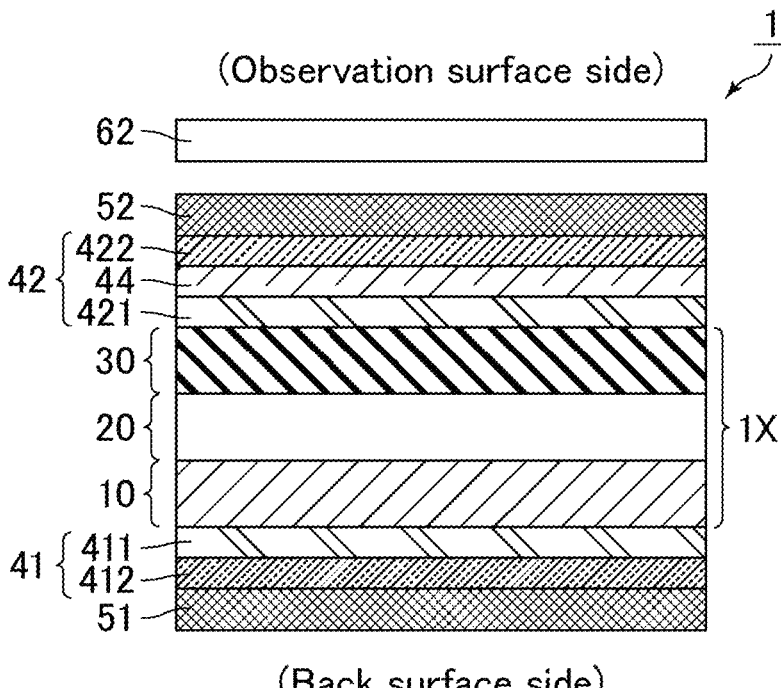
FIG. 18 is a schematic cross-sectional view of a liquid crystal display device 1.

FIG. 18 is a schematic cross-sectional view of an example of a liquid crystal display device 1 of the present embodiment. The liquid crystal display device 1 of the present embodiment further includes a light source 62 (also referred to as front light) closer to the observation surface side than the liquid crystal layer 20 is. The liquid crystal display device 1 is more preferably in a mode including, as shown in FIG. 18, in order from the back surface side toward the observation surface side, a first polarizing plate 51, a first phase difference layer 41, a first substrate 10, a liquid crystal layer 20, a second substrate 30, a second phase difference layer 42, and a second polarizing plate 52. Preferably, the first phase difference layer 41 includes a first λ/2 plate 412 and a first λ/4 plate 411, and the second phase difference layer 42 includes a first λ/2 plate 422 and a first λ/4 plate 421. At least one of the first phase difference layer 41 or the second phase difference layer preferably further includes a positive C plate 44. FIG. 18 shows an example in which the second phase difference layer further includes the positive C plate 44 as an example of the present embodiment.

The light source 62 (front light) may be any light source that emits light. The light source 62 is preferably one including, for example, a light source such as a light emitting diode (LED) and a light guide plate. Further including the light source 62, the reflective liquid crystal display device 1 can provide bright reflective display also in an environment where ambient light is insufficient.

The embodiments of the present invention have been described above. Each and every matter described above is applicable to the general aspects of the present invention.

Examples

The present invention is described in more detail below based on examples. The present invention is not limited to these examples. Hereinbelow, the polarizing plates 51 and 52 are absorptive polarizing plates. The voltage applied during white display is 5 V. The voltage applied during black display is 0 V (i.e., no voltage application).

Test Example 1

Assuming that a reflective liquid crystal display device 1 including a positive liquid crystal material would be used, changes in reflective mode efficiency with different slit angles were evaluated and analyzed through three-dimensional optical simulation. The simulation software "Shintech LCD Master3D" available from Shintech Optics was used.

In the present test example, the liquid crystal display device 1 was assumed to have a configuration in which a λ/4 plate 411, a λ/2 plate 412, and a polarizing plate 51 were disposed on the back surface side of a reflective liquid crystal panel 1X containing a positive liquid crystal material in the stated order from the liquid crystal panel 1X side, and a λ/4 plate 421, a λ/2 plate 422, and a polarizing plate 52 were disposed on the observation surface side of the liquid crystal panel 1X from the liquid crystal panel 1X side. The twist angle $\theta_1$ was 83° and the retardation dΔn of the liquid crystal layer 20 was 245 nm. The λ/4 plates 411 and 421 were uniaxial phase difference plates introducing a retardation Re of 140 nm. The λ/2 plates 412 and 422 were uniaxial phase difference plates introducing a retardation Re of 270 nm. The wavelength dispersions of these phase difference plates were each flat.

Figure 20:
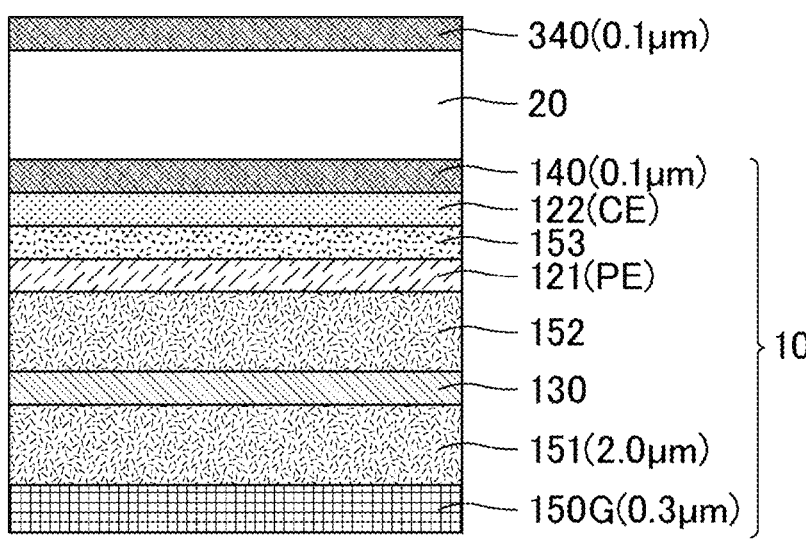
FIG. 20 is a schematic cross-sectional view of a liquid crystal panel 1X included in a device assumed in Test Example 1.
Figure 21:
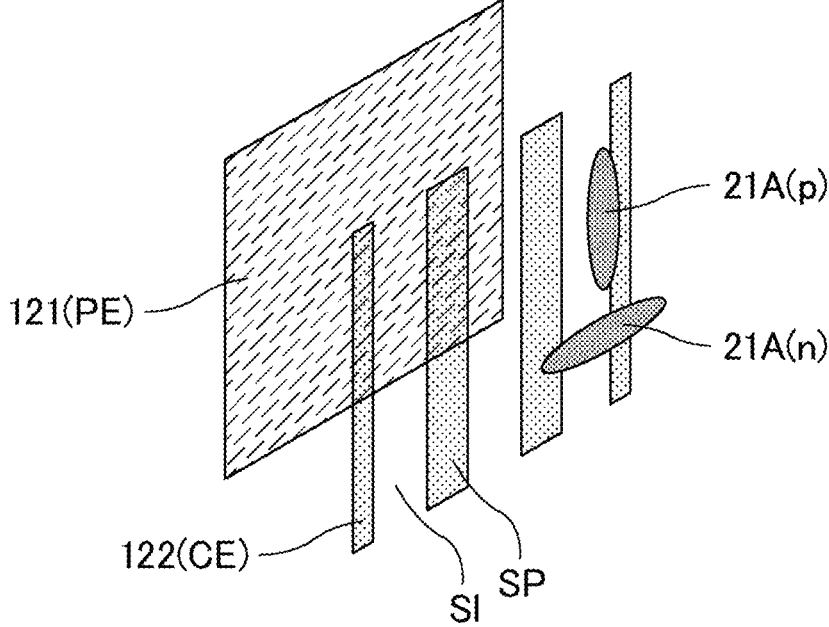
FIG. 21 is a schematic view conceptually showing an electrode structure with a pixel electrode PE and a common electrode CE when the slit angle is 0°.

In the liquid crystal panel 1X, pixel electrodes PE and a common electrode CE used to apply voltage to the liquid crystal layer 20 were disposed in the TFT substrate (first substrate) 10, and the common electrode CE, which was the upper layer electrode (second electrode 122), was a slit electrode including multiple strip portions SP and a slit S1 between adjacent two strip portions (see FIG. 20 and FIG. 21). The multiple strip portions SP linearly extended substantially parallel to one another in the identical directions and included no bent portion. The slit angle of the multiple strip portions SP was set at an angle of −10°, −7°, −4°, −2°, 0°, +2°, +4°, +7°, +10°, +12°, +14°, and +16°. For reference, FIG. 21 shows a case where the slit angle is 0°. The pixel electrodes PE, which were the lower layer electrode (first electrode 121), were each a solid electrode. Here, a liquid crystal layer having a monodomain structure (liquid crystal layer providing normally black display) was assumed to be used.

The ratio of the width L of one strip portion SP to the width S of one slit S1 (i.e., L/S condition) was L/S (μm) =2.2/4.1 in Test Example 1-1, L/S (μm)=1.6/3.0 in Test Example 1-2, and L/S (μm)=3.0/5.0 in Test Example 1-3.

FIG. 20 is a schematic cross-sectional view of the liquid crystal panel 1X assumed in the present example. FIG. 20 shows film thicknesses of some layers each in parenthesis after the reference sign representing the layer. FIG. 21 is a schematic view conceptually showing an electrode structure with a pixel electrode PE and a common electrode CE when the slit angle is 0°. FIG. 21 shows the alignment (i.e., initial alignment) of liquid crystal molecules 21A on the TFT substrate 10 side during no voltage application by the orientation of the positive liquid crystal molecule 21A (p).

In an actual simulation, for simplification of the condition settings, the slit angle was not changed but the pre-twist angle of the liquid crystal molecules 21 and the axis angles of the optical films were changed instead. Here, the twist angle $\theta_1$ was fixed at 83°. Specifically, using the axis settings of the optical film as a reference, the pre-twist angle of the liquid crystal molecules 21 and the axis angles of the optical films were rotated by the same angle as the slit angle. The optical films mean the polarizing plates 51 and 52 and the phase difference layers 41 and 42 (the λ/4 plates and λ/2 plates in the present example). The pre-twist angle of the liquid crystal molecules 21 is the initial alignment angle of the liquid crystal molecules 21A on the TFT substrate (first substrate) 10 side relative to the reference. The reference (0°) here is the 12 o'clock direction in a plan view of the liquid crystal panel from the observation surface side.

Figure 22:
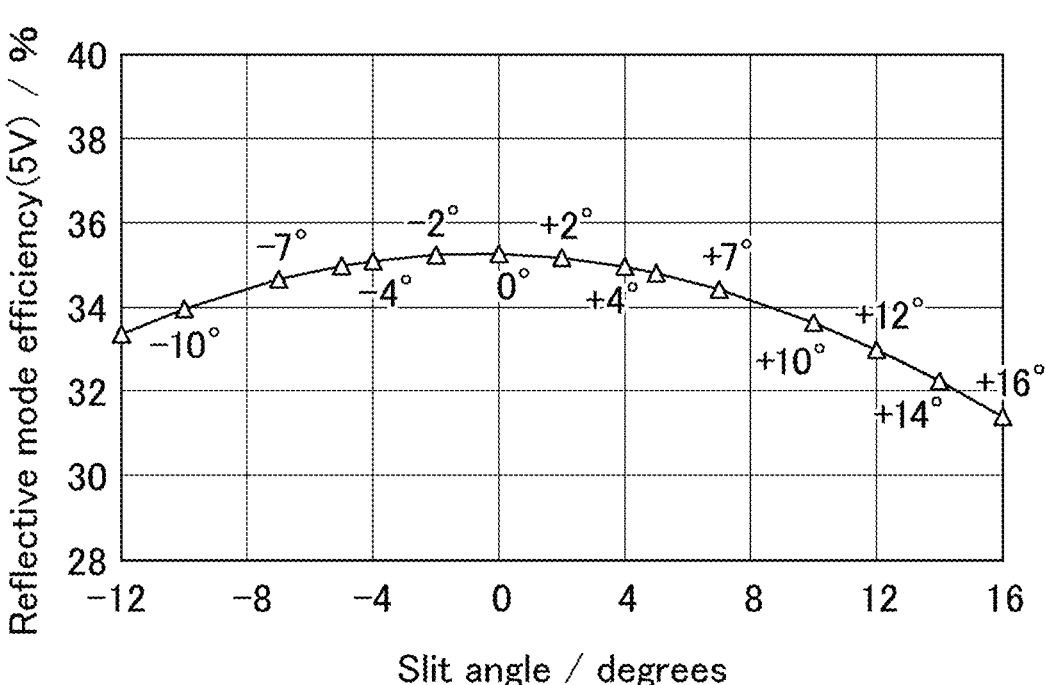
FIG. 22 is a graph showing the results of Test Example 1.
Figure 23:
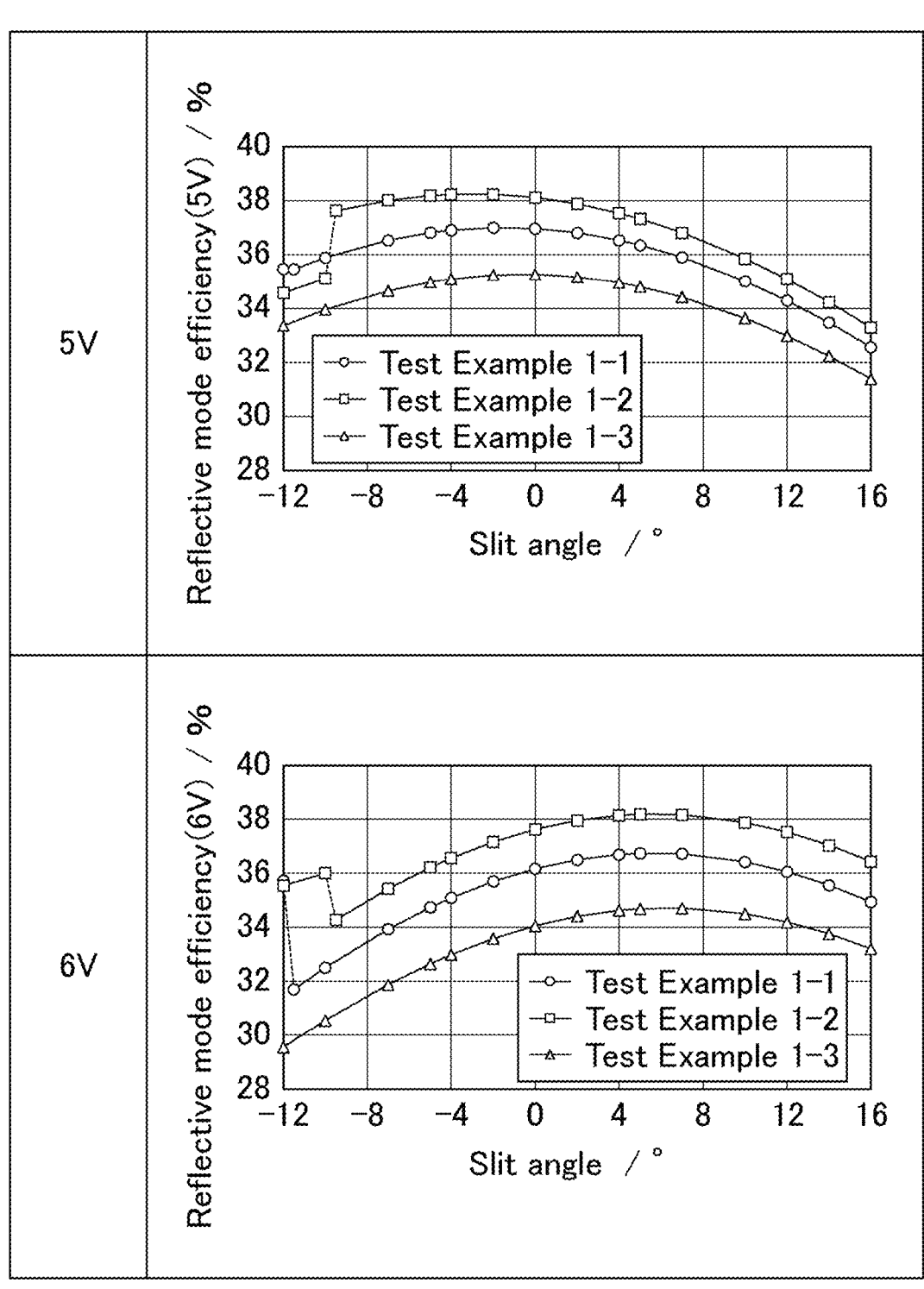
FIG. 23 includes graphs showing the results of Test Example 1.
Figure 24:
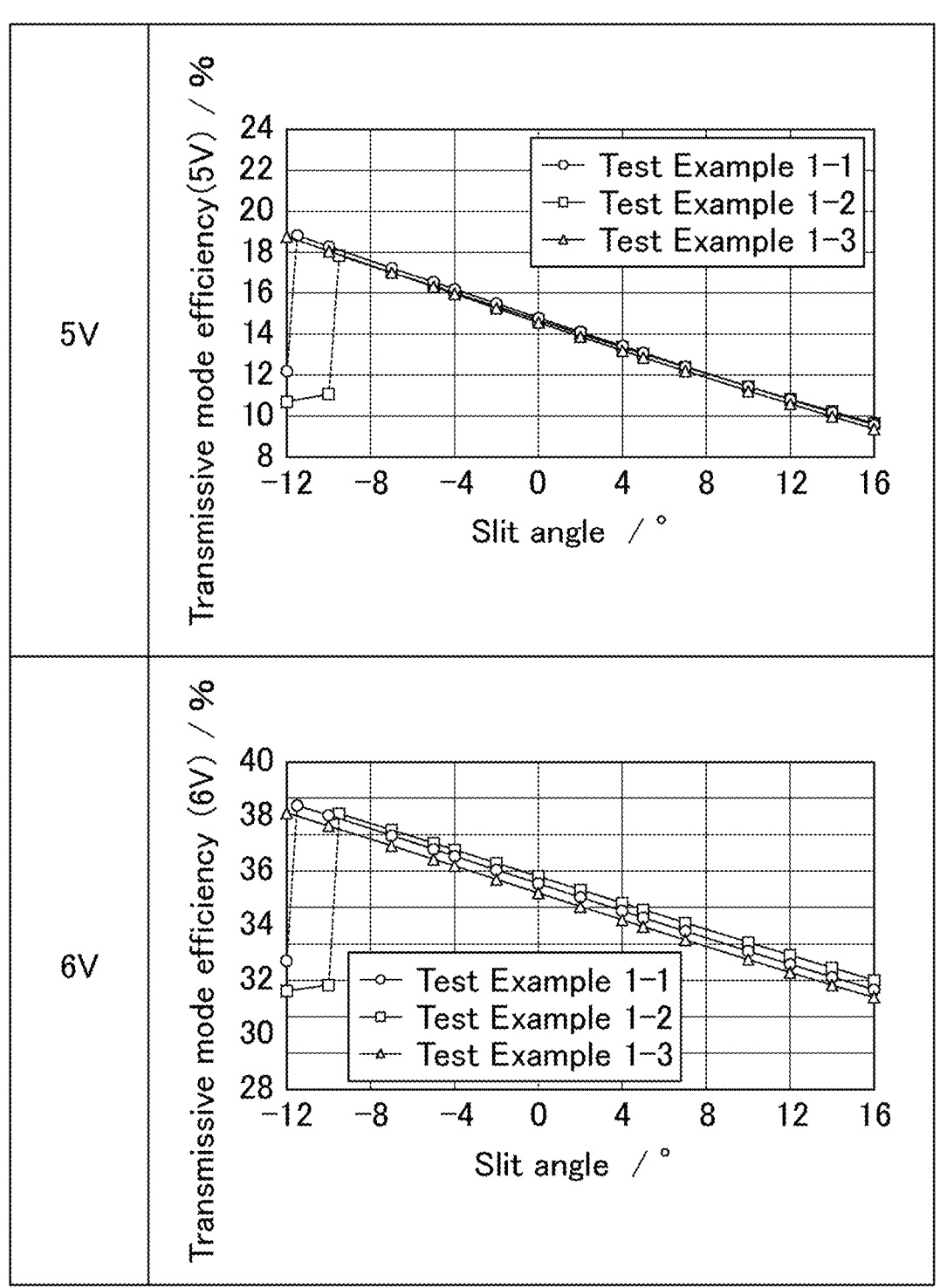
FIG. 24 includes graphs showing the results of Test Example 1.

The voltage was set at 5 V or 6 V. The average reflective mode efficiency or average transmissive mode efficiency was calculated for each slit angle from the luminance distribution. FIG. 22 to FIG. 24 show the results. The reflective mode efficiency and the transmissive mode efficiency were respectively calculated from the following formulas.

Reflective mode efficiency (%) = (luminance with front polarizing plate)/

(luminance without front polarizing plate)×100

Transmissive mode efficiency (%) =

(luminance with front polarizing plate)/

(luminance without front polarizing plate)×100

The front polarizing plate means the polarizing plate (i.e., second polarizing plate 52) positioned on the observation surface side of the liquid crystal panel 1X.

FIG. 22 to FIG. 24 are graphs showing the results of Test Example 1.

Specifically, FIG. 22 is a graph showing the reflective mode efficiency when a voltage of 5 V was applied to a liquid crystal display device of Test Example 1-3.

FIG. 23 includes graphs showing the reflective mode efficiency when voltage was applied to the liquid crystal display device of each of Test Example 1-1, Test Example 1-2, and Test Example 1-3. The upper graph (5V column) is when a voltage of 5 V was applied. The lower graph (6V column) is when a voltage of 6 V was applied.

FIG. 24 includes graphs showing the transmissive mode efficiency when voltage was applied to the liquid crystal display device of each of Test Example 1-1, Test Example 1-2, and Test Example 1-3. The upper graph (5V column) is when a voltage of 5 V was applied. The lower graph (6V column) is when a voltage of 6 V was applied.

FIG. 22 revealed that the reflective mode efficiency tends to decrease as the absolute value of the slit angle increases to greater than 2°. As described later, misalignment may occur when the slit angle is smaller than 0°.

When a vertical alignment (VA) mode test cell was used, the reflective mode efficiency was 37.2% (during 5 V voltage application) and the transmissive mode efficiency was 15.8%. In consideration of the mode efficiency values of the VA mode test cell, FIG. 23 and FIG. 24 show that the pitch of the slit electrode is particularly preferably 6.3 (μm) or less, and the L/S condition is particularly preferably 2.2/4.1 (i.e., 0.54/1) or less. Similarly, in consideration of the mode efficiency values of the VA mode test cell, the lower graph (6 V column) in FIG. 24 shows that the slit angle is particularly preferably 0° or greater and 4° or smaller.

The pitch of the slit electrode is the sum of the width of one strip portion SP and the width of one slit S1 and can be determined from "L+S".

Sample Example 1

A test cell 1000 was produced as follows.

Figure 25A:
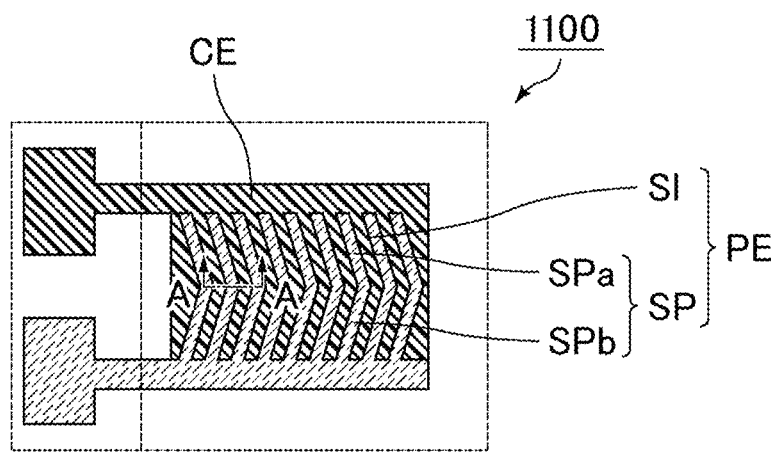
FIG. 25A is a schematic plan view showing the structure when a liquid crystal cell 1100 is viewed from front.
Figure 25B:
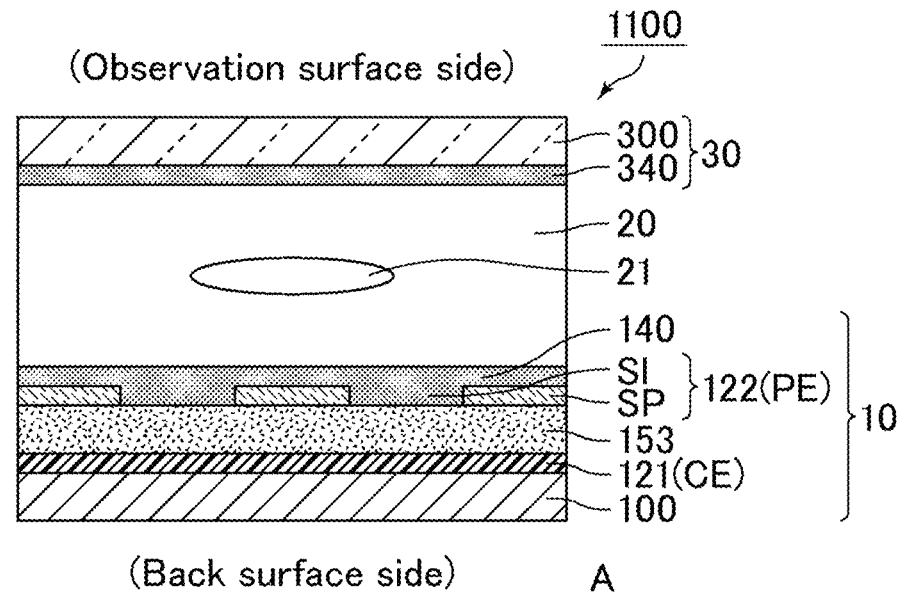
FIG. 25B is a schematic cross-sectional view taken along line A-A in FIG. 25A (A-A line cross-sectional view).

A liquid crystal cell 1100 used to produce the test cell 1000 includes, as shown in FIG. 25B, a first substrate 10, a second substrate 30, and a liquid crystal layer 20 between these substrates. FIG. 25A is a schematic plan view showing the structure when the liquid crystal cell 1100 is viewed from front. FIG. 25B is a schematic cross-sectional view taken along line A-A in FIG. 25A (A-A line cross-sectional view).

As shown in FIG. 25B, the first substrate 10 includes a glass substrate 100 and, on the glass substrate, a common electrode CE as the first electrode 121, a dielectric layer 153, pixel electrodes PE as the second electrode 122, and a first horizontal alignment film 140 in the stated order. The common electrode CE is formed from ITO and the common electrode CE has a thickness of 100 nm. The dielectric layer 153 is formed from silicon nitride (SiNx) and the dielectric layer 153 has a thickness of 300 nm. The pixel electrodes PE are formed from ITO and the pixel electrodes PE have a thickness of 100 nm. The pixel electrodes PE each include multiple strip portions SP and multiple slits S1. The width L of each strip portion SP is 3 μm. The width S of each slit S1 (pitch of adjacent two strip portions SP) is 5 μm. The L/S condition is thus 3/5. Each strip portion SP is bent in a dogleg shape. In other words, each strip portion SP includes a first portion SPa extending in a certain direction (first direction) and a second portion SPb extending in a direction (second direction) different from the first direction.

The second substrate 30, as shown in FIG. 25B, includes a glass substrate 300 and a second horizontal alignment film 340 on the glass substrate 300.

The thickness of the liquid crystal layer 20 (cell gap) is defined by plastic beads (not shown).

The alignment treatment performed on the first horizontal alignment film 140 and the second horizontal alignment film 340 was photoalignment treatment or rubbing treatment.

In the case of photoalignment treatment, a photolysis-type photoalignment film material was used. The photoalignment film material was applied by spin coating, and the thickness of the alignment film was 1000 Å (i.e., 100 nm). Unpolarized UV light emitted from a UV lamp unit was converted to polarized UV light using a wire grid polarizer, and the polarized UV light was applied to the alignment film to perform photoalignment treatment. The extinction ratio by the wire grid polarizer was 100:1. The wavelength of UV light effective for photoalignment was from 220 to 260 nm, and the irradiation energy was 300 mJ/cm². The alignment azimuth of the liquid crystal molecules was in the direction substantially orthogonal to the transmission axis azimuth of polarized UV light (particularly preferably the 90° direction).

In the case of rubbing treatment, a horizontal alignment film was formed and subjected to rubbing treatment with rubbing rollers (e.g., rollers wrapped with a cloth) to perform the alignment treatment. This led to a uniaxial alignment azimuth of the liquid crystal molecules. An alignment film material suitable for moving the liquid crystal molecules in the transverse electric field is a polyimide-based material. Also, a material that does not produce a pre-tilt by rubbing treatment is suitable. Such a material is commercially available. The liquid crystal molecules are aligned substantially parallel to the rubbing direction.

The retardation of the liquid crystal layer 20 in the liquid crystal cell 1100 having the above structure was first measured with a polarimeter ("AxoScan" available from Axometrics). Then, the cell thickness was measured with a cell gap measurement device ("Rets QC" available from Otsuka Electronics Co., Ltd.).

Figure 26A:
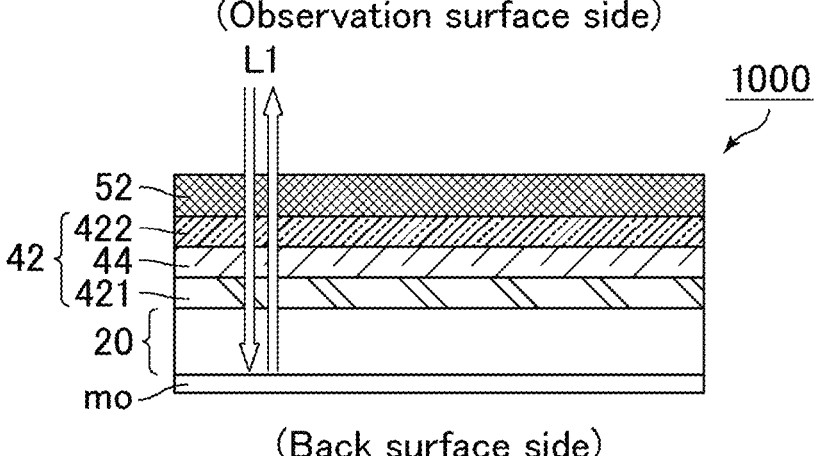
FIG. 26A is a schematic cross-sectional view of a test cell 1000 during reflective observation.

Subsequently, as shown in FIG. 26A, a λ/4 plate 421, a positive C plate 44, a λ/2 plate 422, and a polarizing plate 52 were attached in the stated order to the second substrate 30 side of the liquid crystal cell 1100 (adhesive layers are not shown). Thereafter, for reflective observation, verification was performed by putting one drop of matching oil mo on a reflector 130 having an irregular surface structure (MRS) for reduction of loss due to interfacial reflection, and placing the liquid crystal cell 1100 with the first substrate 10 side facing down on the reflector 130 (this corresponds to the test cell 1000 during reflective observation; see FIG. 26A). For transmissive observation, verification was performed by attaching a λ/4 plate 411, a λ/2 plate 412, and a polarizing plate 51 in the stated order to the first substrate 10 side of the liquid crystal cell 1100 (this corresponds to the test cell 1000 for transmissive observation; see FIG. 26B).

Figure 26B:
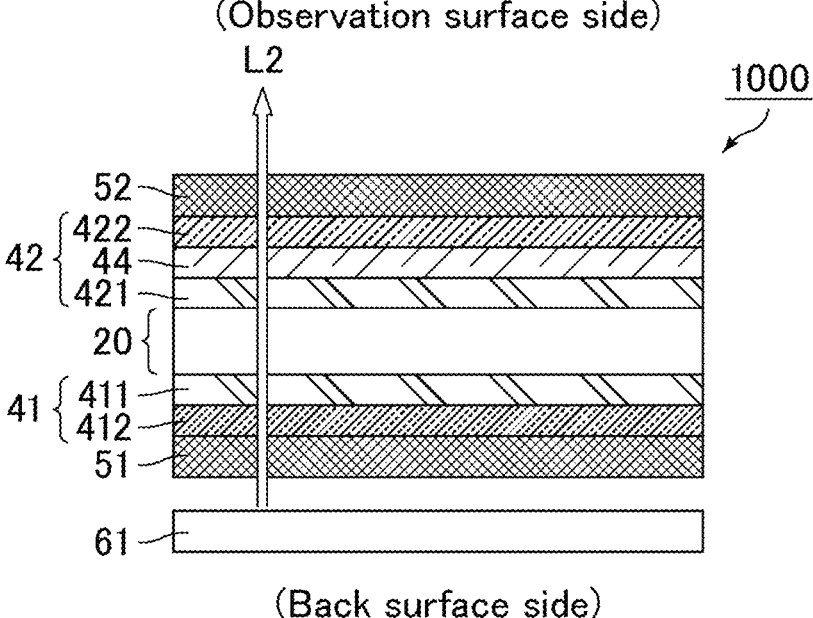
FIG. 26B is a schematic cross-sectional view of the test cell 1000 during transmissive observation.

FIG. 26A is a schematic cross-sectional view of the test cell 1000 for reflective observation. FIG. 26B is a schematic cross-sectional view of the test cell 1000 for transmissive observation. The polarizing plates 51 and 52 were "NPF-CRT1794KDUHC3" available from Nitto Denko Corporation. The λ/4 plates 411 and 421 were "NZF-UF01A" (retardation: 140 nm) available from Nitto Denko Corporation. The λ/2 plates 412 and 422 were "NZF-UF01A" (retardation: 270 nm) available from Nitto Denko Corporation. The axis conditions of each optical film are as shown in Table 1.

Voltage was applied to the pixel electrodes PE and the common electrode CE with a function generator ("AFG1022" available from Tektronix, Inc.) capable of applying a voltage of from 0 V to 10 V with a 30-Hz square wave. Unless otherwise specified, the reflectance was measured with a spectrophotometer ("CM-2600d" available from Konica Minolta Japan, Inc.), and the transmittance was measured with a spectroradiometer ("SR-UL2" available from Topcon Technohouse Corporation).

TABLE 1

| | | Unit | Sample Example 1 |
|---|---|---|---|
| Display mode | | — | TW-FFS |
| Front side optical film | Absorption axis angle of polarizing plate 52 | Degrees | 21.7 |
| | Slow axis angle of λ/2 plate 422 | Degrees | 40.5 |
| | Re of positive C plate 44 | nm | 200 |
| | Slow axis angle of λ/4 plate 421 | Degrees | 65.1 |
| Liquid crystal layer | Liquid crystal material | | Positive type |
| | dΔn | nm | 245 |
| | Director angle of liquid crystal molecules 21A | Degrees | 90 |
| | Twist angle | Degrees | 83 |
| Back side optical film | Slow axis angle of λ/4 plate 411 | Degrees | −76.1 |
| | Slow axis angle of λ/2 plate 412 | Degrees | −17.1 |
| | Absorption axis angle of polarizing plate 51 | Degrees | 87.4 |

In Table 1, the "front side optical film" means an optical film on the observation surface side of the liquid crystal panel 1X, and the "back side optical film" means an optical film on the back surface side of the liquid crystal panel 1X. The axis angle of each optical film is an angle measured in a plan view of the optical film from the observation surface side. Considering each optical film to resemble a clock face, the 3 o'clock direction was set at 0° and the angle was measured as positive in the counterclockwise direction.

Test Example 2

The slit angle of the first portion SPa and the slit angle of the second portion SPb in the test cell 1000 obtained in Sample Example 1 were set at the angles shown in FIG. 27 (Test Example 2-1 to Test Example 2-6). The relationship between the alignment of liquid crystal molecules and the polarization direction was examined for the test cell of each example. In the present example, the twist angle was fixed at +83°.

FIG. 27 shows the results of Test Example 2. FIG. 27 shows the slit angle of the first portion SPa in the SPa column of the slit angle, and the slit angle of the second portion SPb in the SPb column of the slit angle. The "liquid crystal alignment diagram" is an image diagram showing the relationship between the slit angles and the alignment direction of the liquid crystal molecules. In the "polarization direction" diagram, an angle provided to a dotted-line arrow indicates the polarization direction of polarized UV light used in photoalignment treatment for the second substrate 30, and an angle provided to a solid-line arrow indicates the polarization direction of polarized UV light used in photoalignment treatment for the first substrate 10 (i.e., TFT substrate including slit electrodes). The alignment direction of the liquid crystal molecules and the polarization direction are orthogonal to each other.

In the present example, an electrode whose multiple strip portions have a bent portion was used as a slit electrode (pixel electrode in the present example) to examine the first portion SPa and the second portion SPb in the slit electrode.

Test Example 3

In the present example, the mechanism of flow-induced misalignment was examined.

In Test Example 3-1, the test cell obtained in Test Example 2-2 was used as the test cell to examine alignment defects. In Test Example 3-2, only the portion with the first portion SPa (slit angle was) 0° of the test cell obtained in Test Example 2-5 was used as the test cell to examine alignment defects.

Figure 28A:
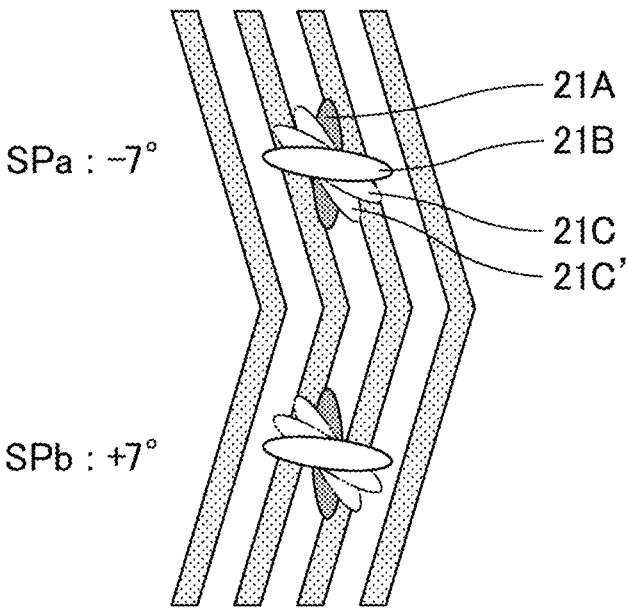
FIG. 28A is an image diagram showing the examination results of Test Example 3-1.
Figure 28B:
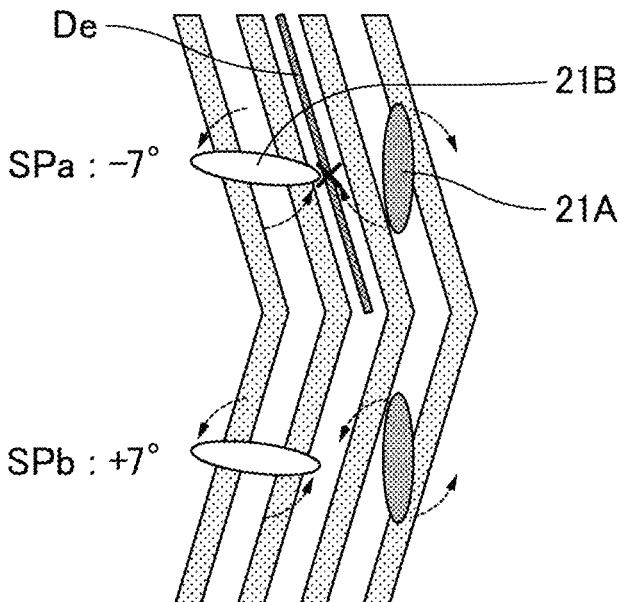
FIG. 28B is an image diagram showing the examination results of Test Example 3-1.
Figure 28C:
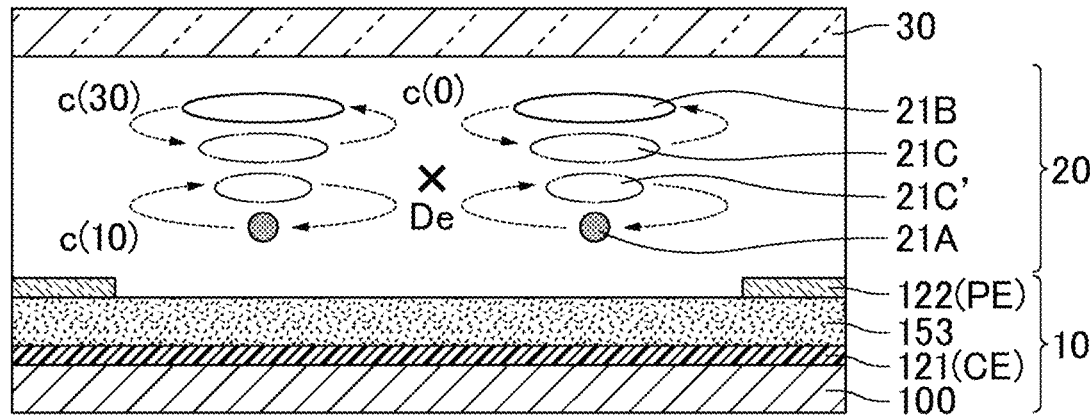
FIG. 28C is an image diagram showing the examination results of Test Example 3-1.
Figure 29A:
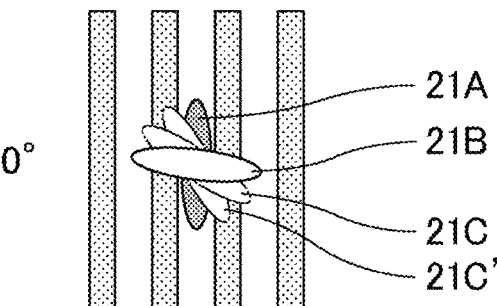
FIG. 29A is an image diagram showing the examination results of Test Example 3-2.
Figure 29B:
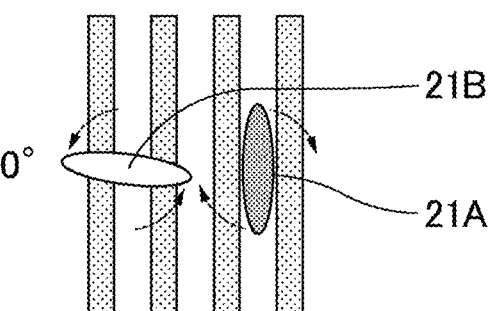
FIG. 29B is an image diagram showing the examination results of Test Example 3-2.
Figure 29C:
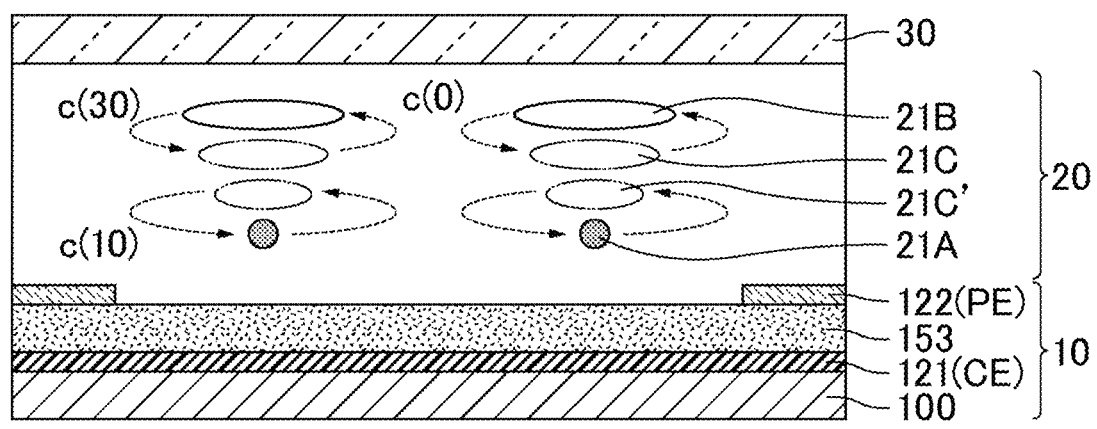
FIG. 29C is an image diagram showing the examination results of Test Example 3-1 and Test Example 3-2.

FIG. 28A, FIG. 28B, FIG. 28C, and FIG. 29C are image diagrams showing the examination results of Test Example 3-1. FIG. 28A shows the alignment of liquid crystal molecules during no voltage application to the test cell. FIG. 28B shows the alignment of liquid crystal molecules during 5 V voltage application to the test cell. FIG. 28C is a cross-sectional view of a portion with the first portion SPa in the test cell shown in FIG. 28B. FIG. 29C is a cross-sectional view of a portion with the second portion SPb in the test cell shown in FIG. 28B.

As shown in FIG. 28B and FIG. 28C, when a voltage of 5 V is applied to the test cell, in the portion with the first portion SPa, the rotation direction of the first substrate 10 side liquid crystal molecules 21A is opposite to the rotation direction of the second substrate 30 side liquid crystal molecules 21B, so that a linear defect De occurs in the boundary between liquid crystal domains with different rotation directions. In FIG. 28C, the reference sign c (30) indicates the rotation direction of the second substrate 30 side liquid crystal molecules 21B. The reference sign c (10) indicates the rotation direction of the first substrate 10 side liquid crystal molecules 21A. The liquid crystal molecules 21C' and the liquid crystal molecules 21C are positioned near substantially the middle between the first substrate 10 and the second substrate 30. As shown in FIG. 28B, the portion where the rotation directions of the liquid crystal molecules mismatch (e.g., near the part X) occurs in the liquid crystal layer 20, and an alignment defect (discontinuous point) occurs near the part X (see the reference sign De). For example, immediately after application of a white voltage of 5 V (for example, 0.5 seconds after the white voltage application), an alignment defect can occur. Observation of the portion with the alignment defect using a crossed Nicols polarizing microscope ("BX51" available from Olympus Corporation) results in perception of the alignment defect as a dark line (e.g., in FIG. 30, see the portion surrounded by the dashed line). An alignment defect is a transitional defect and the alignment would be stable about 1 second after the occurrence of the alignment defect.

In contrast, as shown in FIG. 28B and FIG. 29C, in the portion with the second portion SPb, the rotation direction of the first substrate 10 side liquid crystal molecules 21A and the rotation direction of the second substrate 30 side liquid crystal molecules 21B match, so that no alignment defect occurs.

FIG. 29A, FIG. 29B, and FIG. 29C are image diagrams showing the examination results of Test Example 3-2. FIG. 29A shows the alignment of liquid crystal molecules during no voltage application to the test cell. FIG. 29B shows the alignment of liquid crystal molecules during 5 V voltage application to the test cell. FIG. 29C is also a cross-sectional view of the test cell shown in FIG. 29B.

As shown in FIG. 29B and FIG. 29C, in the test cell used in Test Example 3-2, the rotation direction of the first substrate 10 side liquid crystal molecules 21A and the rotation direction of the second substrate 30 side liquid crystal molecules 21B match, so that no alignment defect occurs.

Test Example 4

Figures 31, 32A:
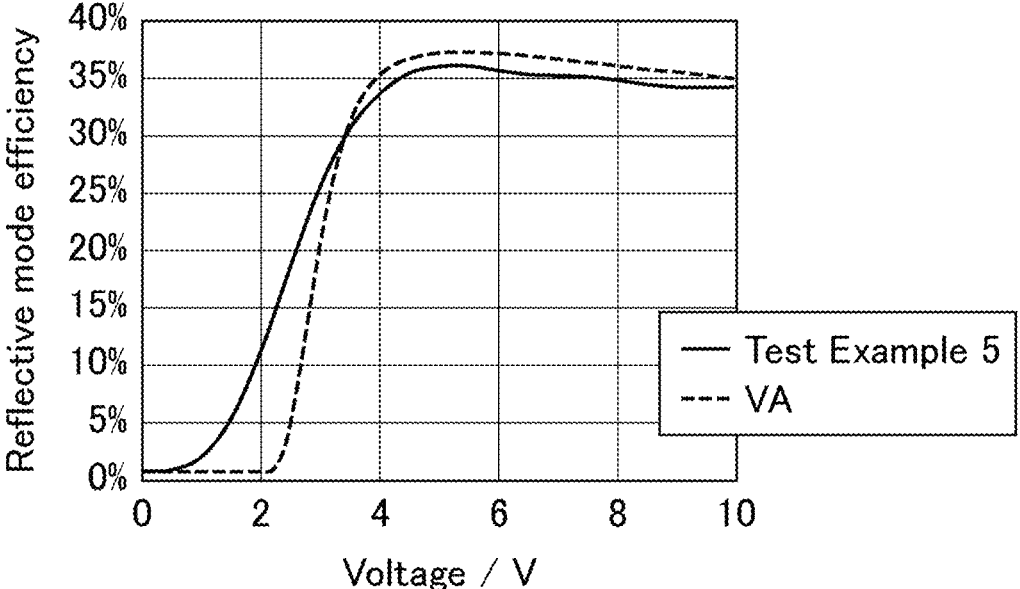
FIG. 31 is an image diagram during voltage application in Test Example 4.
FIG. 32A is a graph showing the results of Test Example 5.

The change in the alignment of liquid crystal molecules was observed when the voltage applied to the test cell obtained in each of Test Example 2-1 to Test Example 2-6 was increased from a state with no voltage applied to 5 V. The observation was performed using a crossed Nicols polarizing microscope ("BX51" available from Olympus Corporation). The image diagram when the voltage was applied in the present example is shown in FIG. 31. FIG. 31 is an image diagram during voltage application in the present example.

In the present example, an electrode whose multiple strip portions have a bent portion is used as a slit electrode (pixel electrodes in the present example) to examine the first portion SPa and the second portion SPb in the slit electrode. Test Example 4-1 to Test Example 4-6 are each an example in which the alignment of liquid crystal molecules was observed with a focus only on the portion with the first portion SPa in the test cell obtained in each of Test Example 2-1 to Test Example 2-6. Test Example 4-7 to Test Example 4-12 are each an example in which the alignment of liquid crystal molecules was observed with a focus only on the portion with the second portion SPb in the test cell obtained in each of Test Example 2-1 to Test Example 2-6. FIG. 30 shows the results.

FIG. 30 shows the results of Test Example 4 (see Test Example 4-1 to Test Example 4-12). In FIG. 30, the reference sign "x" means that an alignment defect (also referred to as a flow-induced misalignment) was perceived, and the reference sign "○" means that no alignment defect was perceived.

As shown in FIG. 30, in Test Example 4-1 and Test Example 4-2, misalignment occurred in the entire bright pixel having a relatively high light transmittance. In Test Example 4-3 and Test Example 4-4, misalignment occurred in the bright pixel with a relatively high light transmittance (in FIG. 30, see the portion surrounded by the dashed line). In contrast, in Test Example 4-5 to Test Example 4-12, no misalignment was observed. Thus, a slit angle of 0° or greater and 16° or smaller was found to sufficiently reduce or prevent occurrence of alignment defects.

Test Example 5

Figure 32B:
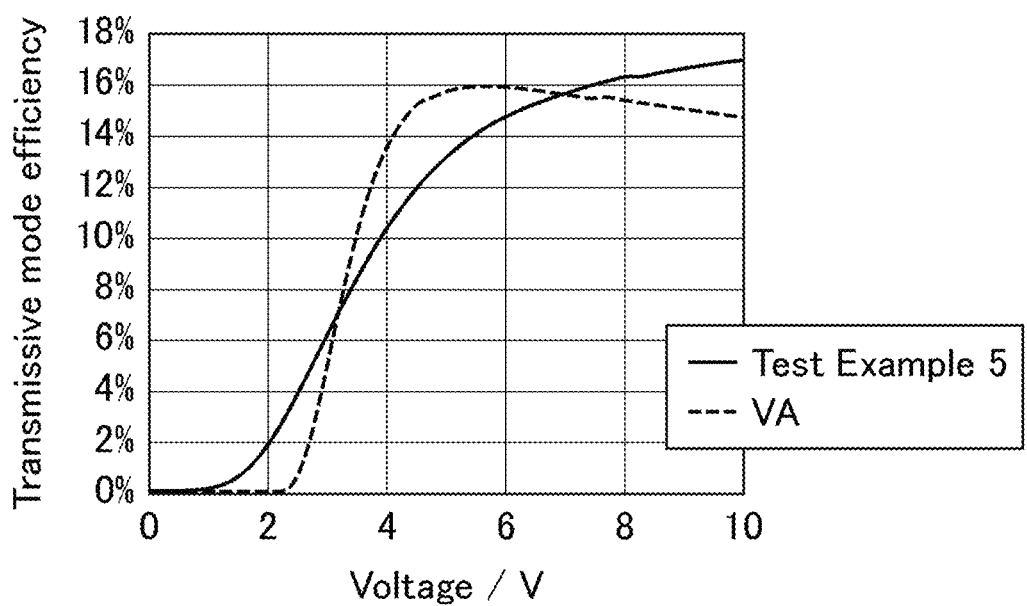
FIG. 32B is a graph showing the results of Test Example 5.
Figure 33:
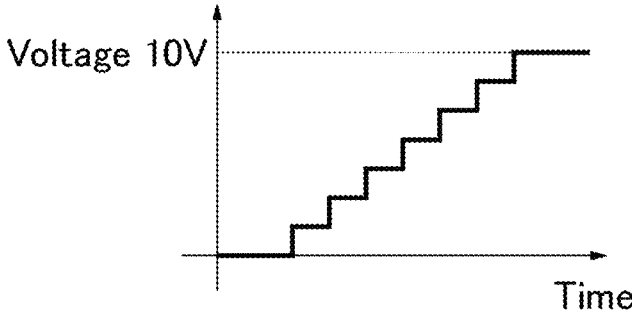
FIG. 33 is an image diagram during voltage application in Test Examples 5 and 6.

The reflective mode efficiency and the transmissive mode efficiency were evaluated when the voltage applied to the test cell obtained in Test Example 2-5 was gradually increased from the state with no voltage applied. The voltage was set in increments of 0.5 V from 0 V to 10 V. FIG. 32A and FIG. 32B show the results. FIG. 32A and FIG. 32B are graphs showing the results of the present example. FIG. 32A and FIG. 32B show the data in the case of using a VA mode test cell as well. An image diagram of the voltage application in the present example is shown in FIG. 33. FIG. 33 is an image diagram during voltage application in the present example.

Test Example 6

Figure 34A:
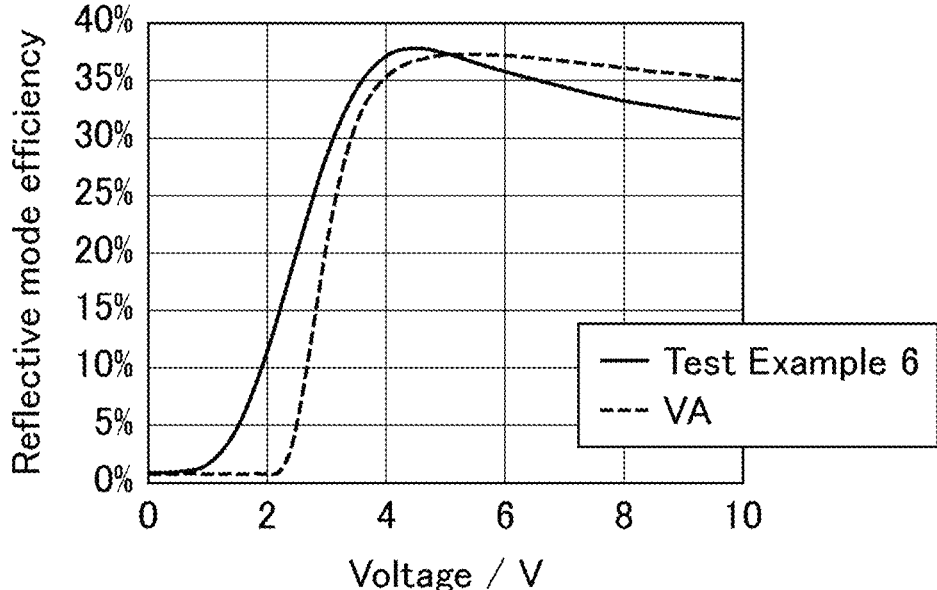
FIG. 34A is a graph showing the results of Test Example 6.
Figure 34B:
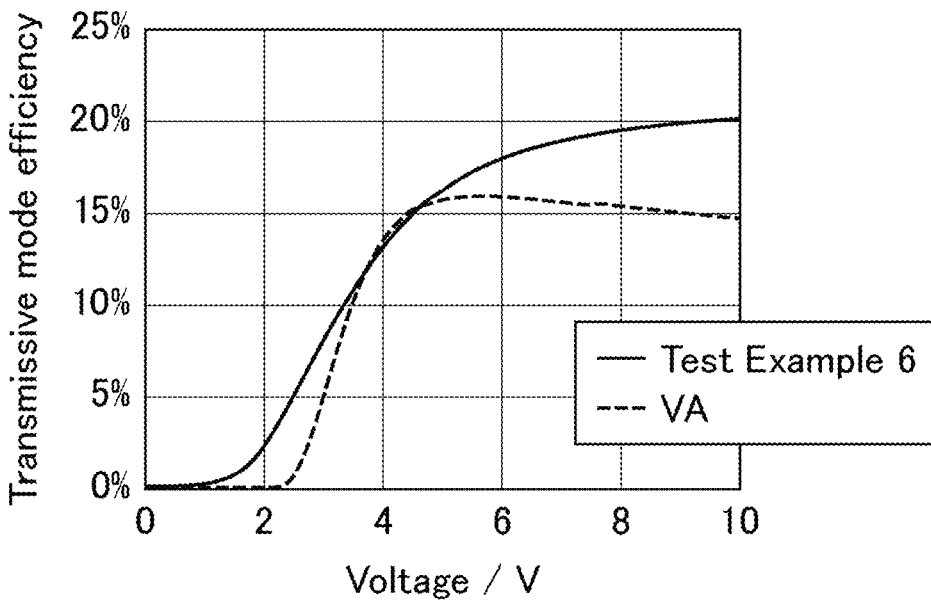
FIG. 34B is a graph showing the results of Test Example 6.

The reflective mode efficiency and the transmissive mode efficiency were evaluated when the voltage applied to the test cell obtained in Test Example 2-2 was gradually increased from the state with no voltage applied. The voltage was set in increments of 0.5 V from 0 V to 10 V. FIG. 34A and FIG. 34B show the results. FIG. 34A and FIG. 34B are graphs showing the results of the present example. FIG. 34A and FIG. 34B show the data in the case of using a VA mode test cell as well. FIG. 33 is also an image diagram during voltage application in the present example.

Test Example 7

Figure 35:
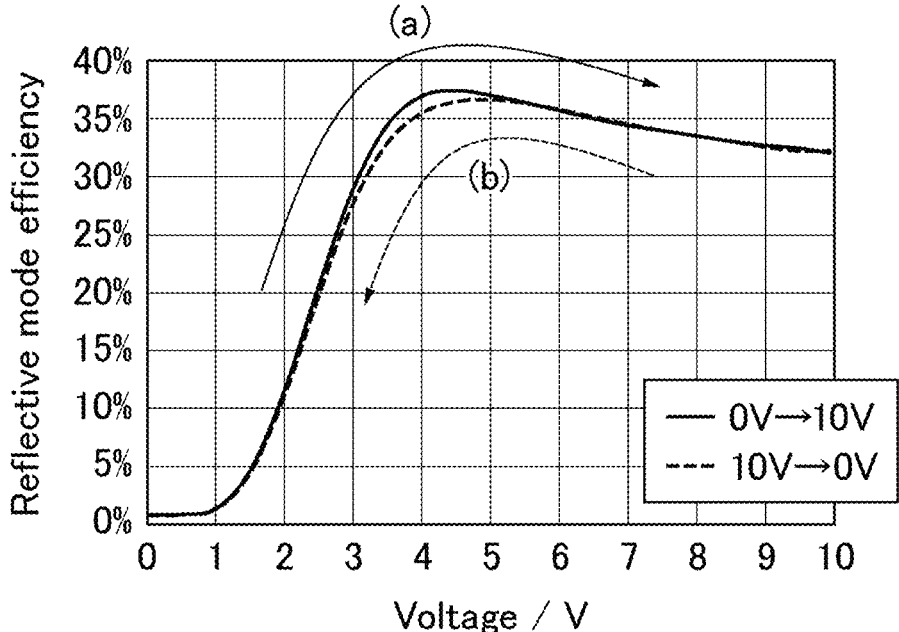
FIG. 35 is a graph showing the results of Test Example 7.
Figure 36:
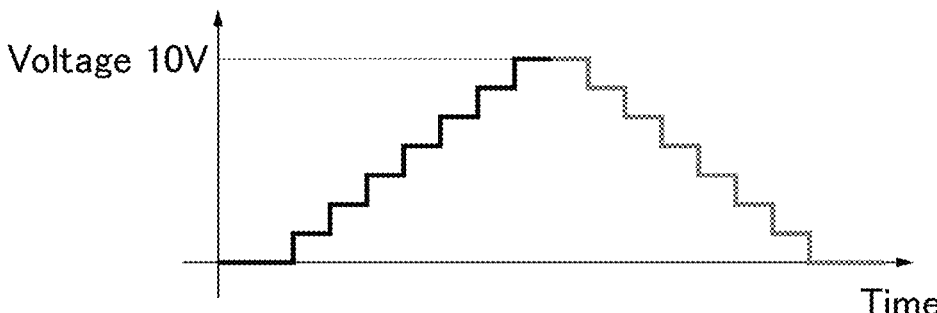
FIG. 36 is an image diagram during voltage application in Test Example 7.

The reflective mode efficiency was evaluated when the voltage applied to the test cell obtained in Test Example 2-2 was gradually increased from the state with no voltage applied and when the voltage was gradually decreased from 10 V. FIG. 35 shows the results. FIG. 35 is a graph showing the results of the present example. FIG. 35 shows the data in the case of using a VA mode test cell as well. FIG. 36 is an image diagram during voltage application in the present example.

FIG. 35 revealed that the reflectance was lower at a voltage of 5.5 V or lower during the voltage decrease than during voltage increase. This suggests that the alignment defect occurred around 5.5 V during voltage decrease. In FIG. 35, the reference sign (a) means voltage increase and the reference sign (b) means voltage decrease.

Sample Example 2

A test cell 1000' for transmissive observation was produced as in Sample Example 1, except for use of no positive C plate 44.

Test Example 8

Figure 37:
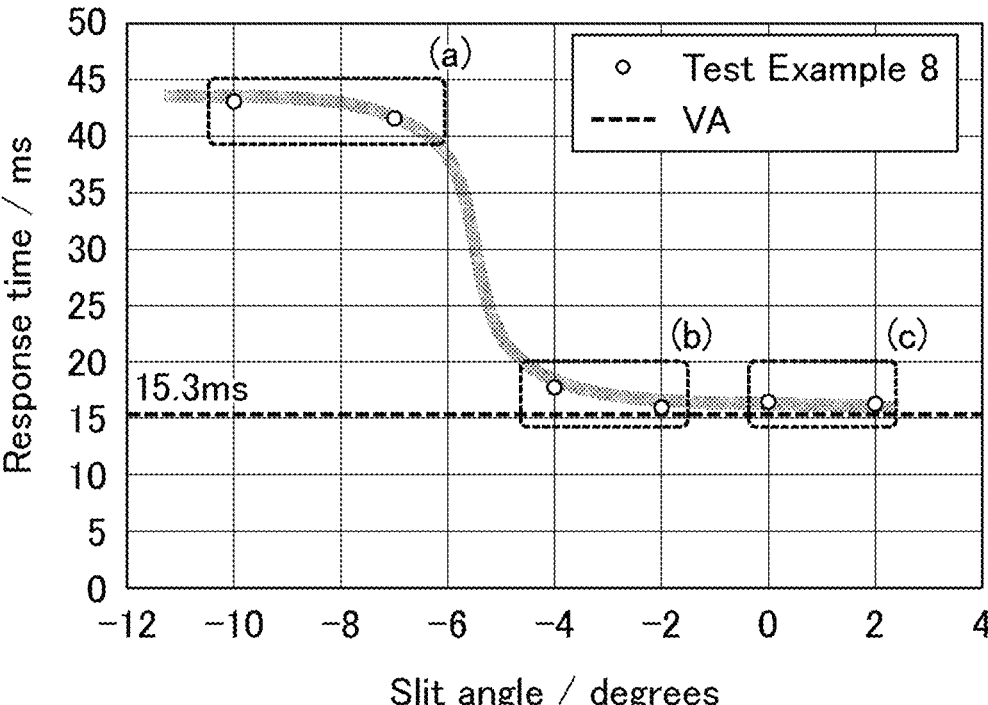
FIG. 37 is a graph showing the results of Test Example 8.
Figure 38:
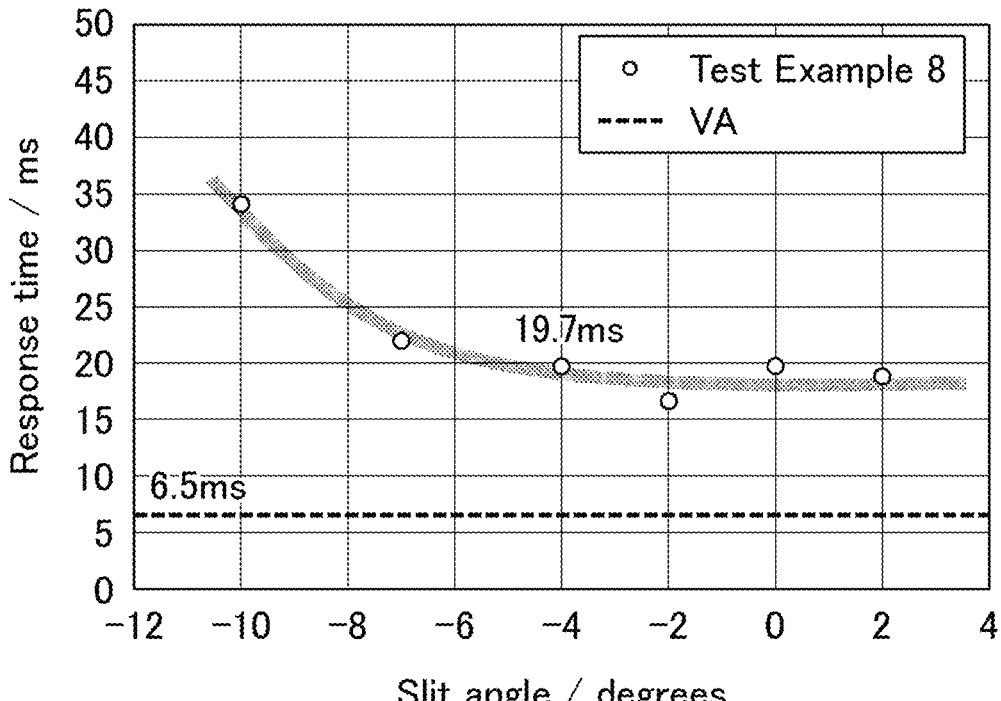
FIG. 38 is a graph showing the results of Test Example 8.

The slit angle of the first portion SPa and the slit angle of the second portion SPb in the test cell 1000' obtained in Sample Example 2 were set at the angles shown in FIG. 27 (see Test Example 2). The twist angle was fixed at +83°. The thus-obtained test cells were used to evaluate the relationship between the slit angles and the response time. FIG. 37 and FIG. 38 show the results.

FIG. 37 and FIG. 38 are graphs showing the results of Test Example 8. FIG. 37 is a graph evaluating the rise response time when the voltage was increased from a state with no voltage applied to 5 V (0 V+5 V). FIG. 38 is a graph evaluating the fall response time when the voltage was decreased from 5 V to the state with no voltage applied (5 V+0 V). FIG. 37 and FIG. 38 show the data in the case of using a VA mode test cell as well. In the case of using a VA mode test cell, the rise response time was 15.3 milliseconds (ms), and the fall response time was 6.5 milliseconds (ms).

In the present example, since an electrode whose multiple strip portions have a bent portion was used as a slit electrode (pixel electrodes in the present example) for convenience of experiment, each test cell includes a first portion SPa and a second portion SPb with different slit angles. Thus, the response time plotted in FIG. 37 and FIG. 38 is the average of the response time of the liquid crystal in the first portion SPa and the response time of the liquid crystal in the second portion SPb.

Also in the present example, the response time (milliseconds) is obtained by calibrating a response time taken for the normalized luminance ratio in the response waveform to change from 0.1 to 0.9 with the reference liquid crystal retardation dΔn (245 nm).

FIG. 37 shows that the rise response time was about 15 milliseconds (ms) or shorter in the range where the slit angle was −2° or greater, i.e., it tended to be saturated at −2° or greater. In FIG. 37, misalignment occurred in the ranges (a) and (b), but no misalignment occurred in the range (c).

FIG. 38 shows that the fall response time was about 20 milliseconds (ms) or shorter in the range where the slit angle was −4° or greater, i.e., it tended to be saturated at −4° or greater.

Test Example 9

The VA mode test cell used in Test Examples 5 to 8 is, for example, a test cell 2000 produced as described below.

Figure 39A:
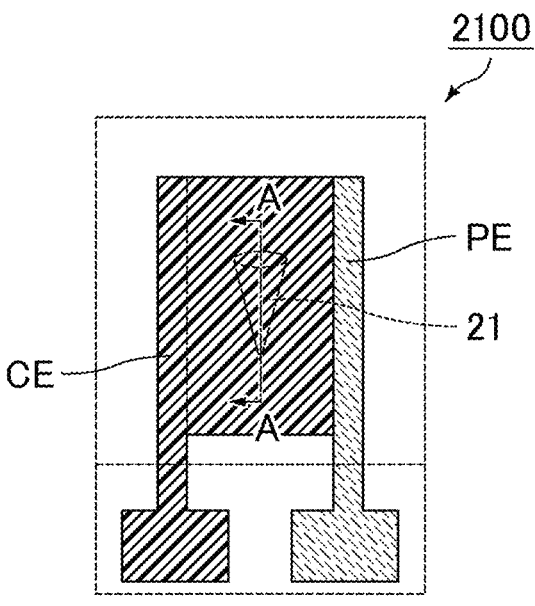
FIG. 39A is a schematic plan view showing the structure when a test cell 2000 (and a liquid crystal cell 2100) is viewed from front.
Figure 39B:
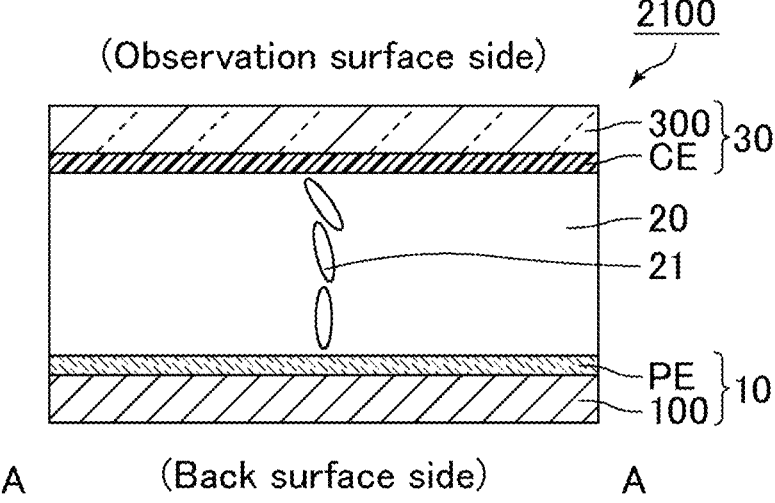
FIG. 39B is a schematic cross-sectional view taken along line A-A in FIG. 39A (A-A line cross-sectional view).

A liquid crystal cell 2100 used to produce a test cell 2000 includes, as shown in FIG. 39B, a first substrate 10, a second substrate 30, and a liquid crystal layer 20 disposed between these substrates. FIG. 39A is a schematic plan view of the structure when the test cell 2000 (and the liquid crystal cell 2100) is viewed from front. FIG. 39B is a schematic cross-sectional view taken along line A-A in FIG. 39A (A-A line cross-sectional view).

The first substrate 10 includes a glass substrate 100 and, on the glass substrate 100, pixel electrodes PE and a first vertical alignment film (not shown) in the stated order. The second substrate 30 includes a glass substrate 300 and, on the glass substrate 300, a common electrode CE and a second vertical alignment film (not shown) in the stated order. Only the second vertical alignment film disposed on the observation surface side among the vertical alignment films has been subjected to photoalignment treatment. The alignment azimuth of liquid crystal molecules 21 defined by the first vertical alignment film is in the 90° direction (pre-tilt angle is) 88.4°.

Figure 40:
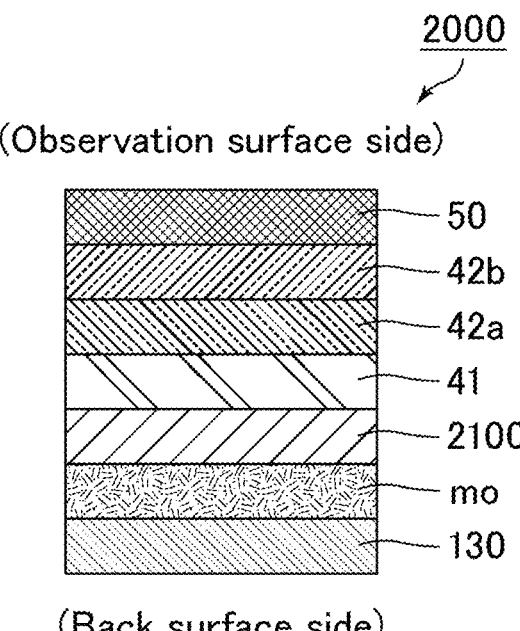
FIG. 40 is a schematic cross-sectional view of the test cell 2000.

As shown in FIG. 40, a λ/4 plate 41, a first λ/2 plate 42a, a second λ/2 plate 42b, and a polarizing plate 50 were attached in the stated order to the second substrate 30 side of the liquid crystal cell 2100 (adhesive layers are not shown). The polarizing plate 50 was "NPF-CRT1794KDUHC3" available from Nitto Denko Corporation. The λ/4 plate 41 was "NZF-UF01A" (retardation: 110 nm) available from Nitto Denko Corporation. The λ/2 plates 42a and 42b were "NZF-UF01A" (retardation: 260 nm) available from Nitto Denko Corporation.

Thereafter, one drop of matching oil mo was put on a reflector 130 having an MRS, and the liquid crystal cell 2100 was placed with the first substrate 10 side facing down on the reflector 130. Thus, the test cell 2000 was produced. FIG. 40 is a schematic cross-sectional view of the test cell 2000.

Figure 41:
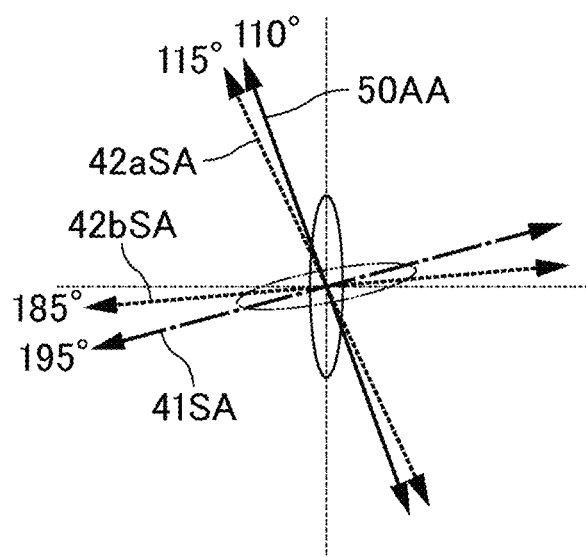
FIG. 41 conceptually shows the optical axis settings in Test Example 9.

The test cell 2000 uses a liquid crystal material whose anisotropy of dielectric constant is negative, and the display mode thereof is the VA mode. The optical axis settings (initial settings) and specifications are shown in Table 2 and FIG. 41. FIG. 41 conceptually shows the optical axis settings in Test Example 9. In Table 2, "CH" (chirality) indicates the twist angle of the liquid crystal molecules 21 between the upper and lower substrates (i.e., between the first substrate 10 and the second substrate 30).

TABLE 2

|  | Unit | Test Example 9 |
| --- | --- | --- |
| Liquid crystal material | — | Negative type |
| Birefringence of liquid crystal material (589 nm) | — | 0.0932 |
| Δε | — | −4.2 |
| Display mode | — | VA |
| CH | Degrees | −110 |
| Polarization axis angle of polarizing plate | Degrees | 110 |
| Slow axis angle of λ/2 plate 42b | Degrees | 185 |
| Slow axis angle of λ/2 plate 42a | Degrees | 115 |
| Slow axis angle of λ/4 plate | Degrees | 195 |

Figure 42:
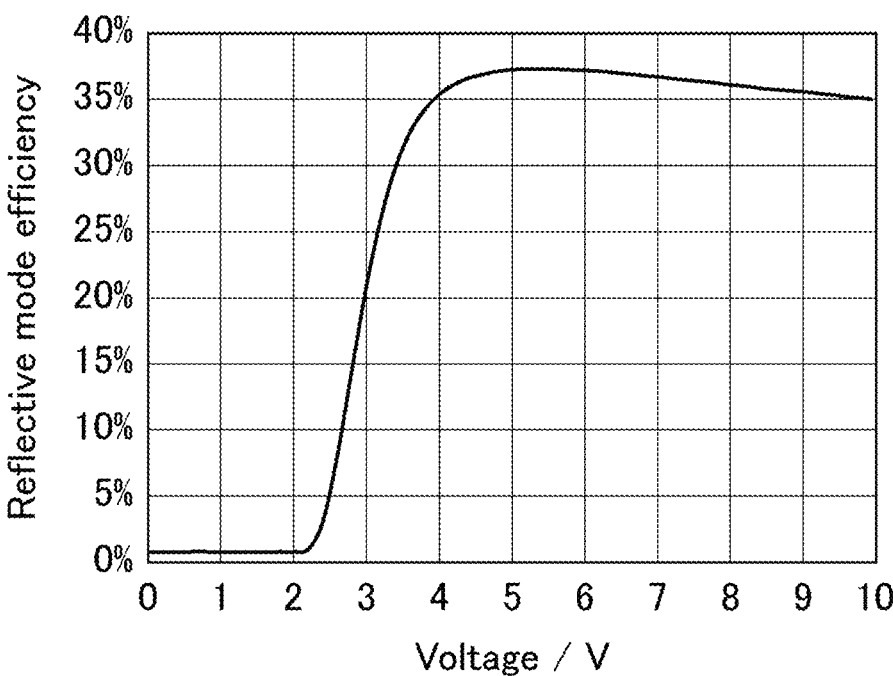
FIG. 42 is a graph showing the results of Test Example 9.

The reflective mode efficiency was evaluated when the voltage applied to the test cell 2000 was gradually increased from the state with no voltage applied. The voltage was set in increments of 0.5 V from 0 V to 10 V. FIG. 42 shows the results. FIG. 42 is a graph showing the results of the present example.

FIG. 42 shows that the reflective mode efficiency during no voltage application was 0.8%, the reflective mode efficiency during voltage application (5 V) was 37.2%, and the contrast (5 V/0 V) calculated as the ratio between these efficiency values was 48. Utilizing a vertical electric field, a VA mode liquid crystal display device is not easily used as an in-cell touch panel.

The embodiments of the present invention described above may be combined as appropriate within the spirit of the present invention.

REFERENCE SIGNS LIST

1: liquid crystal display device
1X: liquid crystal panel
10, 30: substrate
20: liquid crystal layer
21, 21A, 21B, 21C, 21C': liquid crystal molecule
40: phase difference layer
41: λ/4 plate
42, 42a, 42b: λ/2 plate
41SA, 42SA: in-plane slow axis
50, 51, 52: polarizing plate
50AA: polarization axis
61, 62: light source
100, 300: support substrate
121, 122: electrode
130: reflective layer
140, 340: horizontal alignment film
150G: gate insulator
151, 152: interlayer insulating layer
153: dielectric layer
160: contact electrode
310: color filter layer
BP: backplane circuit
CE: common electrode
PE: pixel electrode
CH1, CH2: contact hole
De: alignment defect
DR: display region
FR: non-display region
GL: gate line
SL: source line
p: protrusion
P: pixel
Rf: reflective region
Tr: transmissive region
S1: slit
SP: strip portion
SPa: first portion
SPb: second portion
TC: touch line contact portion
TD: touch driver
TL, TL1, TL2: touch line
TX: touch sensor electrode

What is claimed is:

1. A liquid crystal display device, comprising:
a first polarizing plate;
a second polarizing plate;
a first phase difference layer;
a second phase difference layer;
a first substrate;
a second substrate opposite the first substrate;

a liquid crystal layer between the first substrate and the second substrate; and a plurality of pixels, wherein:

the first substrate includes a reflective layer which reflects light, a first electrode and a second electrode which are capable of generating a transverse electric field in the liquid crystal layer, and a first horizontal alignment film in contact with the liquid crystal layer, at least one of the first electrode or the second electrode includes a plurality of strip portions and a slit between two adjacent strip portions among the plurality of strip portions, the plurality of strip portions, in each of the plurality of pixels, linearly extending substantially parallel to one another in identical directions, and including no bent portion, the second substrate includes a second horizontal alignment film in contact with the liquid crystal layer, the liquid crystal layer includes liquid crystal molecules, that have a positive anisotropy of dielectric constant and that are in a twist alignment during no voltage application, an alignment direction of liquid crystal molecules near the first substrate, during the no voltage application, lies at 0° or greater and 16° or smaller when the identical directions, in which the plurality of strip portions extends, are set as a reference direction at 0°, the first polarizing plate, the first phase difference layer, the first substrate, the liquid crystal layer, the second substrate, the second phase difference layer, and the second polarizing plate are disposed in this stated order from a back surface side of the liquid crystal display device, the first phase difference layer includes a first λ/2 plate and a first λ/4 plate, the second phase difference layer includes a second λ/2 plate and a second λ/4 plate, and at least one of the first phase difference layer or the second phase difference layer further includes a positive C plate.

2. The liquid crystal display device according to claim 1, wherein the plurality of strip portions includes no cutout.

3. The liquid crystal display device according to claim 1, wherein the identical directions in which the plurality of strip portions extends are identical at least in adjacent pixels, among the plurality of pixels, or in a display region.

4. The liquid crystal display device according to claim 1, wherein the second phase difference layer includes the positive C plate, and the first phase difference layer does not include the positive C plate or includes two positive C plates.

5. The liquid crystal display device according to claim 1, wherein the first λ/2 plate and the first λ/4 plate are positioned in this stated order from the back surface side, the second λ/2 plate and the second λ/4 plate are positioned in this stated order from an observation surface side of the liquid crystal display device, the first λ/2 plate and the second λ/2 plate provide substantially a same first in-plane phase difference (Re1), and the first λ/4 plate and the second λ/4 plate provide substantially a same second in-plane phase difference (Re2).

6. The liquid crystal display device according to claim 4, wherein the first $\lambda/2$ plate and the first $\lambda/4$ plate are positioned in this stated order from the back surface side, the second $\lambda/2$ plate and the second $\lambda/4$ plate are positioned in this stated order from an observation surface side, the first $\lambda/2$ plate and the second $\lambda/2$ plate provide substantially a same first in-plane phase difference (Re1), and the first $\lambda/4$ plate and the second $\lambda/4$ plate provide substantially a same second in-plane phase difference (Re2).

7. The liquid crystal display device according to claim 1, wherein the positive C plate is positioned between the first $\lambda/2$ plate and the first $\lambda/4$ plate, or between the second $\lambda/2$ plate and the second $\lambda/4$ plate, or between both (i) the first $\lambda/2$ plate and the first $\lambda/4$ plate and (ii) the second $\lambda/2$ plate and the second $\lambda/4$ plate.

8. The liquid crystal display device according to claim 4, wherein the positive C plate is positioned between the first $\lambda/2$ plate and the first $\lambda/4$ plate, or between the second $\lambda/2$ plate and the second $\lambda/4$ plate, or between both (i) the first $\lambda/2$ plate and the first $\lambda/4$ plate and (ii) the second $\lambda/2$ plate and the second $\lambda/4$ plate.

9. The liquid crystal display device according to claim 1, wherein a twist angle of the liquid crystal layer during the no voltage application is 58.3° or greater and 89.9° or smaller.

10. The liquid crystal display device according to claim 1, wherein the plurality of strip portions has a ratio (L/S) of 0.4/1 to 0.7/1, where L represents a width per strip portion in a plan view and S represents a width per slit in the plan view.

11. The liquid crystal display device according to claim 1, wherein the liquid crystal layer is in a single domain alignment.

12. The liquid crystal display device according to claim 1, further providing display in a normally black mode.

13. The liquid crystal display device according to claim 1, wherein one of the first electrode and the second electrode, that corresponds to pixel electrodes, is provided, respectively, in the plurality of pixels, while the other one of the first electrode and the second electrode, that corresponds to a common electrode, includes a plurality of segments, each being capable of functioning as a touch sensor electrode, and the first substrate includes a plurality of touch lines, each being connected to a corresponding one of a plurality of touch sensor electrodes, including the touch sensor electrode.

14. The liquid crystal display device according to claim 1, further comprising a light source.

15. The liquid crystal display device according to claim 1, wherein each of the plurality of pixels includes a reflective region for providing display by reflecting the light using the reflective layer, and a transmissive region for providing display by transmitting the light.

16. The liquid crystal display device according to claim 5, wherein each of the plurality of pixels includes a reflective region for providing display by reflecting the light using the reflective layer, and a transmissive region for providing display by transmitting the light.

\* \* \* \* \*